United States Patent
Kametani et al.

(10) Patent No.: US 6,647,465 B2
(45) Date of Patent: Nov. 11, 2003

(54) REALTIME PARALLEL PROCESSOR SYSTEM FOR TRANSFERRING COMMON INFORMATION AMONG PARALLEL PROCESSORS TO A CACHE MEMORY SYSTEM

(75) Inventors: Masatsugu Kametani, Tsuchiura (JP); Kazuhiro Umekita, Tsuchiura (JP); Terunobu Funatsu, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 09/915,381

(22) Filed: Jul. 27, 2001

(65) Prior Publication Data

US 2002/0035671 A1 Mar. 21, 2002

(30) Foreign Application Priority Data

Sep. 20, 2000 (JP) .......................................... 2000-290343

(51) Int. Cl.[7] .............................................. G06F 12/00
(52) U.S. Cl. ........................................ 711/131; 711/141
(58) Field of Search ................................ 711/131, 147, 711/148, 149, 150, 151, 152, 153, 141

(56) References Cited

U.S. PATENT DOCUMENTS 5,522,058 A * 5/1996 Iwasa et al. ................. 711/145
5,659,714 A * 8/1997 Yoshida ....................... 711/211

* cited by examiner

*Primary Examiner*—Kevin Verbrugge
(74) *Attorney, Agent, or Firm*—Antonelli, Terry, Stout & Kraus, LLP

(57) ABSTRACT

A CPU system having a built-in cache memory system in which a write-only port for coherence control from the common system side and an access port from the CPU side are isolated through a multi-port configuration of the cache memory system inside CPU. A common memory on the common side too, uses a 2-port system structure with the CPU system in the form of a broadcast type connection form.

7 Claims, 30 Drawing Sheets

CONSTITUTED BY 4 TRANSISTORS
(WE GENERATES A SET OF OWE &
$\overline{OWE}$ FOR READ)

TRI-STATE BUFFER SYSTEM

MULTIPLEXER SYSTEM

CASE WHERE WENi IS USED

CASE WHERE WEN-ALL IS USED

TYPE A (EXTERNAL BUS ISOLATION TYPE)

TYPE HAVING A PLURALITY OF EIF IN INDEPENDENT EXTERNAL BUS AND CAPABLE OF COPING WITH PLURALITY OF COMMON BUSES

TYPE FURTHER ISOLATING LACAL BUS INTO READ BUS AND WRITE BUS BY INDEPENDENT EXTERNAL BUS

TYPE INCLUDING A PLURALITY OF CACHE MEMORY SYSTEM SETS BY INDEPENDENT EXTERNAL BUS

EXAMPLE OF
32bit ×1word=1line BLOCK

EXAMPLE OF (32bit×1word)×4=1line BLOCK TYPE

REALTIME PARALLEL PROCESSOR SYSTEM FOR TRANSFERRING COMMON INFORMATION AMONG PARALLEL PROCESSORS TO A CACHE MEMORY SYSTEM

BACKGROUND OF THE INVENTION

This invention relates to a parallel processor. More particularly, this invention relates to architecture of a real time parallel processor system for transferring common information among parallel processors to a cache memory system of each processor and utilizing the common information, and method of constituting each constituent means into LSI architecture.

The specifications of the patent applications Ser. Nos. 08/701,789 and 09/165,200 filed by M. Kametani on Aug. 26, 1996 and Oct. 2, 1998 and published as U.S. Pat. Nos. 5,960,458 and 6,161,168 on Sep. 28, 1999 and Dec. 12, 2000, respectively, disclose a shared memory system.

An example of a general-purpose multi-processor such as a main frame that includes a common main memory having a caching function of common information can be cited as a principal prior art technology.

U.S. Pat. No. 5,604,882 and JP-A-9-185547 disclose primarily coherence control means of common information on a cache memory of each processor element that constitutes a multiprocessor. The references describe a system for nullifying a directory (in a tag memory) for cache memory of each corresponding processor when the content of the common main memory is changed, and a method for directly exchanging replace information among cache memories.

JP-A-1-145746 and JP-A-7-13863 describe a system which uses RAM having two ports for a cache memory and a tag memory, monitors a write cycle in which a common main memory system connected to a common bus (or a system bus) is re-written, and re-writes the cache memory by use of the information of the write cycle through the other port in parallel with the cache memory access of the processor that is executed by use of one of the ports.

These prior art technologies are based on the premise that one common main memory system on the common bus is directly shared by a plurality of processors. The common memory system is generally used for residence of an OS common to each processor, sharing of status information for common control and information transfer among the processors.

When coherence control is executed in accordance with the prior art technologies, a high real time communication capacity capable of quickly communicating and converting large quantities of information among processors is necessary so that even when common information is incessantly changed in response to information generated by other processors and in response to external real time information, each processor can handle large quantities of common information on the real time basis. In a multi-processor of the type for which a high-speed processing capacity is required and in which processors are densely coupled, or in a high-speed real time parallel processor which is required to exhibit quick response and to execute a processing at a predetermined high processing speed, a critical problem develops to keep such performance. In other words, a replace operation of common information frequency occurs from a common memory system to a cache memory system in such a high-speed system, and large quantities of re-write processing of internal information of the common memory system occur from each processor, too. Therefore, conflict occurs on the common bus or between the common bus and a monitor bus of the common bus write information due to these access operations, thereby inviting a critical problem of the loss of the processing capacity (about overhead) such as a temporary stop of the operation of the processor, a remarkable drop of the overall operation speed and an irregular occurrence of the extreme drop of performance that impedes to keep real time performance. To keep real time performance, therefore, it is generally more suitable in many cases not to cache the common information in such a system.

The prior art technologies using a cache memory and a tag memory of RAM having 2 ports may seem capable of avoiding the conflict. However, when the number of times of the replace operations from the main memory through the common bus increases as in the problem discussed hereby, this increase synergistically affects the replace operations by other processors, so that the common bus monitor operation for keeping coherence is relatively neglected and a large drop of efficiency occurs.

In other words, it is mainly when the processor primarily executes the processing using the cache memory (a processing primarily directed to process data on the cache memory in a main frame, a work station, a personal computer, etc) that the effect can be obtained. The effect at this time remains only that the cache memory access conflict can be avoided between the processor side and the common bus monitor side. Therefore, the prior art does not yet relate to the technology for securing sufficient real time performance.

To achieve a higher operation speed, it is essential to fabricate each constituent means into LSI architecture, but the prior art examples do not describe a technology satisfying such a requirement.

SUMMARY OF THE INVENTION

It is an object of the present invention to provide a processor system having by far higher performance than the prior art systems, that solves the problems described above, prevents the drop of performance resulting from various address conflicts, can shorten latency and has high cost performance owing to LSI architecture.

The problems described above can be solved by a processor connected to at least one processor through a common bus, for executing cache control, comprising CPU; a cache memory; a tag memory connected to the cache memory, for holding address information of cache data; a resource for holding data common to at least one processor; a write port provided to the resource and connected to the common bus; and a comparator for comparing address information of the tag memory with an access address from the CPU and outputting coincidence information to the cache memory; wherein a local bus for gaining access to the resource from the processor is connected to a read port provided to the resource.

The cache memory may have a write/read port connected to an internal bus from the CPU and a write port for accepting the common data from at least one processor through an external bus connected to the common bus.

The comparator described above includes a first comparator connected to the tag memory, for comparing the access address from the CPU with the address information of the tag memory and giving an enable signal for activating the write/read port of the cache memory; and a second comparator connected to the tag memory, for comparing the access address from at least one processor with the address information of the tag memory, and giving an enable signal for activating the write port of the cache memory, wherein the first and second comparators are operable in parallel with each other by one reference clock.

In a system wherein a plurality of processors exist and each processor executes a parallel processing or a distributed processing while exchanging information among them by a common system for holding common information among the processors, the present invention relates to means, systems and methods for executing coherence control of the common information between cache memories of the processors while the information inside the common system is replaced into, and processed by, a cache memory system inside the processor.

DESCRIPTION OF THE EMBODIMENTS

Figure 1:
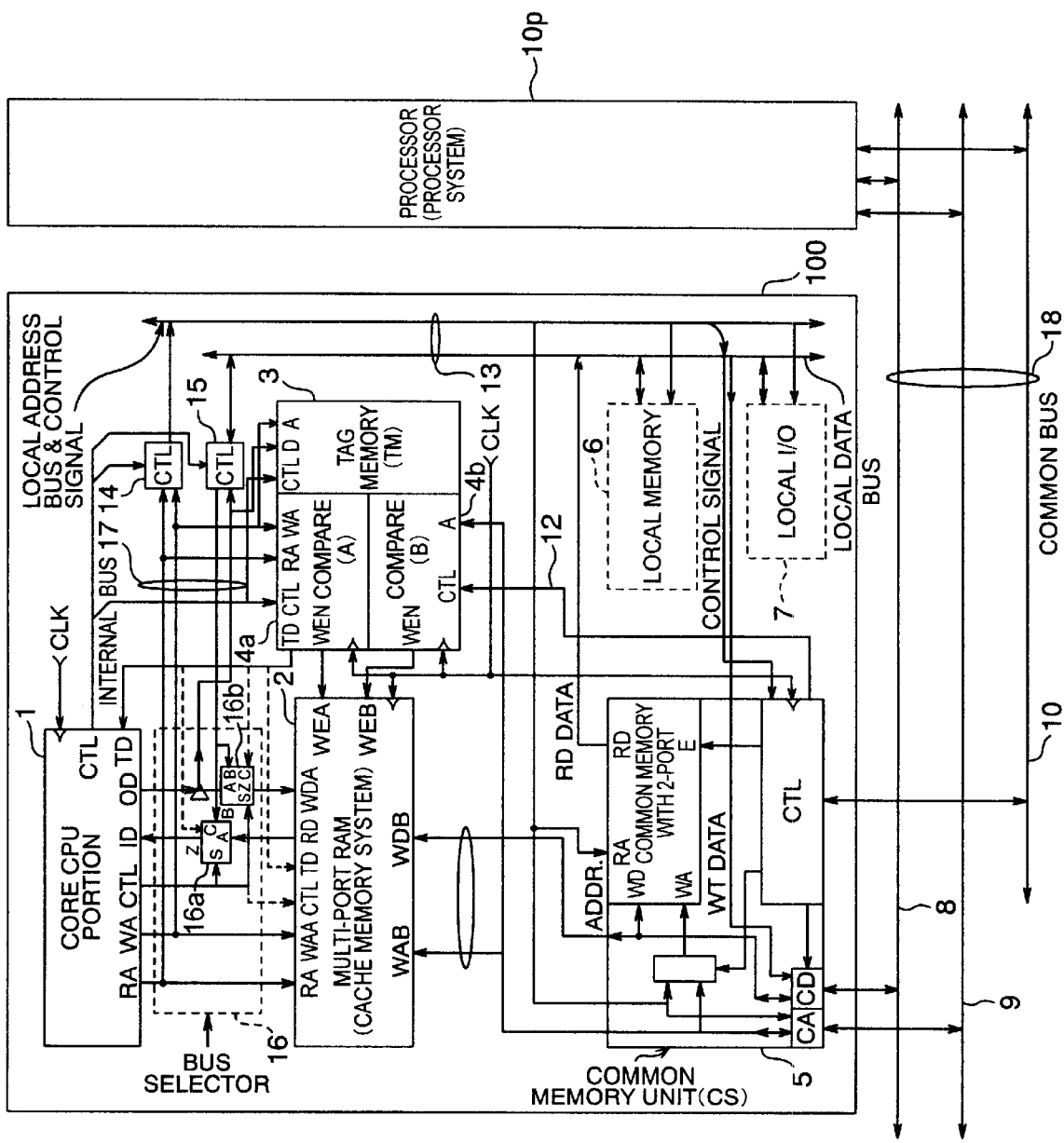
FIG. 1 shows a construction of a 2-port cache memory system.

FIG. 1 shows an embodiment of the present invention. A basic construction of a system as the premise of the present invention mainly includes a core CPU 1 including an operation unit, a sequencer, a register file, etc, a cache memory system 2 comprising high-speed memories for copying or replacing a part of information that should exist in a resource inclusive of a main memory system (this operation will be called "cache replace operation") and making an access speed from CPU higher than a resource access speed when the processing is executed, a tag memory (TM) 3 for holding address information of the information existing on the cache memory system, a comparison circuit (CMP) 4 for comparing the address information of TM 3 with access address information (the address to which CPU is to gain access at present or the address that is given from outside) and for judging whether or not the data (information) as the object of the processing corresponds to that of the cache memory system 2, a common system 5 (that is called "CS: (Common System)" and is resources in general such as shared memory systems and shared I/O systems) as one of the resources of CPU for sharing the processing information with other processing unit $10p$ (which may be plural), and a common bus system 18 for exchanging common information among processing units without contradiction, such as a common address bus 9, an arbiter (arbitration of access conflict to the common system) line 10, and so forth.

To gain access to the resource from the core CPU 1, the embodiment shown in FIG. 1 employs the construction in which each internal bus 17 to address/data/control (CTL) is subjected to switching control by bus controllers 24 and 25 to execute input/output operations from and to the outside. In other words, a local bus 13 including a local address bus (including the control line) and a local data bus is open to outside, and access to a local memory (LM), a local I/O (L I/O), the resource (CS), etc, can be executed through this local bus 13.

The first great feature of this embodiment is that the local bus described above is directly connected to a read bus RD data of the common system (CS) 5 (used in combination with a common memory unit having two independent read and write ports of a broadcast system existing in each processing unit in FIG. 1). Separately from the read bus RD data, the local bus includes a common information external bus (EIF) 11 for sending changed common information and the address information, which corresponds to the changed common information and at which the changed data on CS exists when the change of the common information to CS is changed (mainly the change from other processing units), to the cache memory system 2 and to the comparison circuit 4. Therefore, the access from CPU to the resource can be made independently of the cache replace operation as the transfer operation from other processing unit to the cache memory system and independently of the information transfer operation from CS to the cache to keep coherence that is necessary at the time of the change of the common information on CS. Consequently, the drop of processing capacity due to access competition can be prevented.

The second feature of this embodiment is as follows. In order to directly write the information on the external bus 11 to the cache memory system 2 in such a fashion as to correspond to the external bus 11 that transfers the common information from the common bus to the cache 2, this cache memory system is constituted into a multi-port memory system so that a common information access through dedicated write ports (comprising WAB: write access B, WDE: write data B, WEB: write enable B) and a CPU access through the ports (comprising WAA: write address A, WDA: write data A, WEA: write enable A, RA: read address, RD: read data) corresponding to the access from the core CPU side can be made in parallel with each other.

The comparison circuit 4 independently generates access authorization information controlling the access to these two ports (mainly control signals WEA, WEB representing that a write access is possible). In other words, the comparison circuit 4 includes two comparators 4a and 4b. The comparator 4a directly compares at a high speed the information of the address to which access is made at present with the information inside the cache tag memory TM, judges whether or not they are coincident, and generates coincidence information (that renders WENi active) when they are coincident. On the other hand, when the information on CS is changed, the comparator 4b executes a direct high-speed comparison processing of the address information on the common information bus 11 and the information inside TM in response to this change, and generates likewise the coincidence information. The access control to the cache memory system is executed in response to the coincidence information.

Two comparison circuits A and B process in parallel these two kinds of coincidence information in synchronism with one reference clock. Moreover, the cache memory system employs the independent port structure as described above. Therefore, this system can accomplish the construction that does not fundamentally generate the conflict between the access from CPU and the access from the common system (CS) side and provides small latency. (A detailed example of timing control will be explained elsewhere).

To further clarify the necessity of the present invention, the essential problems in the multi-processor system when caching and utilizing the common information will be considered in the following paragraphs (a) to (d). First, the operation of the cache memory system, the CPU access operation and the information re-write operation of the common system will be discussed about protocols of the case where these operations operate in association with one another, and concrete problems will be also examined. Incidentally, the paragraph (d) deals with concrete problems in a processing system of the type that involves large quantities of real time communication and uses common information by caching, as typified by a real time parallel processor having the most critical problems.

(a) The access is first gained to the resource when CPU executes the information processing. With the access to the external resource, the comparator (CMPA) 4a checks whether or not that information exists on the cache memory. When the coincidence information is active (when the data exists on the cache memory), necessary information is read or written by gaining access to the address on the corresponding cache memory system in response to the coincidence information. When the coincidence information is not active (when the data does not exist on the cache memory), bus controllers 14 and 15 work the local bus 13 to gain direct access to the external resource and to read or write the necessary information.

(b) When the necessary information does not exist on the cache memory system in the paragraph (a), the access is then made to the eternal resource. When the information is to be replaced onto the cache memory and to be processed (generally, whether or not given information is to be transferred to the cache memory in response to the address is determined in advance), the information on the address or the address block in which the information exists is written into the memory of the corresponding address of the tag memory (TM). At the same time, bit information (OA (output address)-EN bit) representing that the tag memory address is effective is rendered active, and the information that is read with the access to the external resource or the information to be written is copied or replaced (duplicated) in parallel into the address or the address block of the cache memory system corresponding to the tag memory address. Depending on systems, however, there are many cases where the replace operation to the cache memory system and the write operation into the tag memory are possible only at the time of the read operation. The write operation includes a system (write-back system) that first executes the write operation to the cache memory and then transfers the information from the cache memory to the resource when the information is thereafter used outside, and a system (write-through system) that copies the information to the cache memory system in parallel with the write operation to the resource.

(c) When other processing unit changes the common information on CS when there is the possibility of the existence of the information on the common system (CS) on the cache memory system, too, it becomes necessary for all the processing units 10p, that replace the common information to the cache memory and execute the processing, to change the corresponding information (common information) of their private cache memory to the correct information, or to nullify the corresponding address information on the tag memory (TM) in the address or the address block on the caches memory in which the information exists (to render OA-EN inactive). The operation of keeping consistency of the information on the cache memory (to keep the information on the cache memory of these processors under the matching state without contradiction) is called "coherence control" of the cache memory. This is the function that is particularly important and indispensable in a multi-processor system of the type that processes by caching the information of the common system. In most of the conventional multiprocessor systems, coherence control is executed by "partial flash" that changes the corresponding invalid/effective bits of the tag memory TM to the invalid state, or "full flash" that nullifies once the cache memory as a whole. When the flash processing is executed, the data nullified must be directly loaded again from the common memory system CS to the cache memory when the data is used next. In this way, the correct information is replaced and coherence of the information can be maintained.

(d) When coherence control is executed by using the prior art technologies, the common information is incessantly changed in response to the information generated by other processors and in response to the external real time information, and the following problems develop. First, a high real time communication capacity is necessary so that large quantities of information communication/information change can be quickly executed among processors each capable of handling large quantities of common information on the real time basis. In a multi-processor system in which processors are densely coupled to satisfy the requirement for a high-speed processing capacity and in a high-speed real time parallel processor which is required to exhibit quick response and to execute processing at a predetermined high processing speed, large problems occur to keep such performance. In such a high-speed system, the replace operation of the common information frequently occurs from the common system to the cache memory system, and large quantities of re-write processing of the information inside the common system from each processor occur, too. Therefore, conflict of the access operations on the shared bus or between the shared bus and the monitor bus of the common bus write information is likely to result in the critical loss of the processing capacity (relating to the overhead) such as the temporary stop of the processor or the irregular and remarkable drop of the overall operation speed and the extreme drop of performance. To keep real time performance in such systems, therefore, it is more suitable in many cases not to cache the common information.

The cause of the conflict problem in the parallel processor for which high real time performance is required as described in the paragraph (d) can be grasped as the following three technical problems on the basis of the prior art technologies.

(1) conflict between the access from the CPU side to the cache memory system and the access from the CS side to keep coherence control;

(2) conflict between the access from the CPU side to the tag memory and the access from the CS side to keep coherence control; and (3) conflict between the external resource access by CPU to the local bus (external general-purpose bus) or to the common bus through the local bus (or to the system bus), particularly the cache replace operation from the common system (CS) to the cache memory system inside each processor (cache line fill), and the access from the CS side through the local bus to keep coherence control, and conflict among the access by other processors to CS (particularly the read access inclusive of cache replace) and the cache replace operation and the CS access operation for keeping coherence control.

The problems (1) and (2) are the problems encountered in the coherence control for directly changing and controlling the common data held on the cache memory. Unless these problems are avoided, the processing speed in each processor of the parallel processor system in which large quantities of common information are exchanged on the real time basis remarkably drops due to the access conflict overhead, and it is believed meaningless to transfer the information inside the common system to the cache memory system and to process the information. (Processing performance, particularly real time performance, might be kept at a higher level without transferring the information to the cache memory system).

The problem (3) is the problem such as the temporary stop of CPU because ordinary CPU has one set of external buses, and when the external buses are used in common, the changed common address and the data information sent from the CS side to keep coherence control compete with the external access from CPU on the external buses. The problem may be not so great if full flash is merely executed. However, to finely manage/control the information on the corresponding cache memory, it is necessary to always monitor whether or not the content of the common system (CS) is re-written. In a system handling large quantities of common information at a high speed, conflite frequently occurs and remarkably lowers the processing capacity. Even when the monitor bus is independently disposed for this purpose, the parallel operation with the access to CS cannot be substantially made in the prior art construction as described already.

Turning back again to FIG. 1, the present invention solves the problem (3) by the first feature and the problems (1) and (2) by the second feature. These features will be hereinafter explained in detail.

Figure 2:
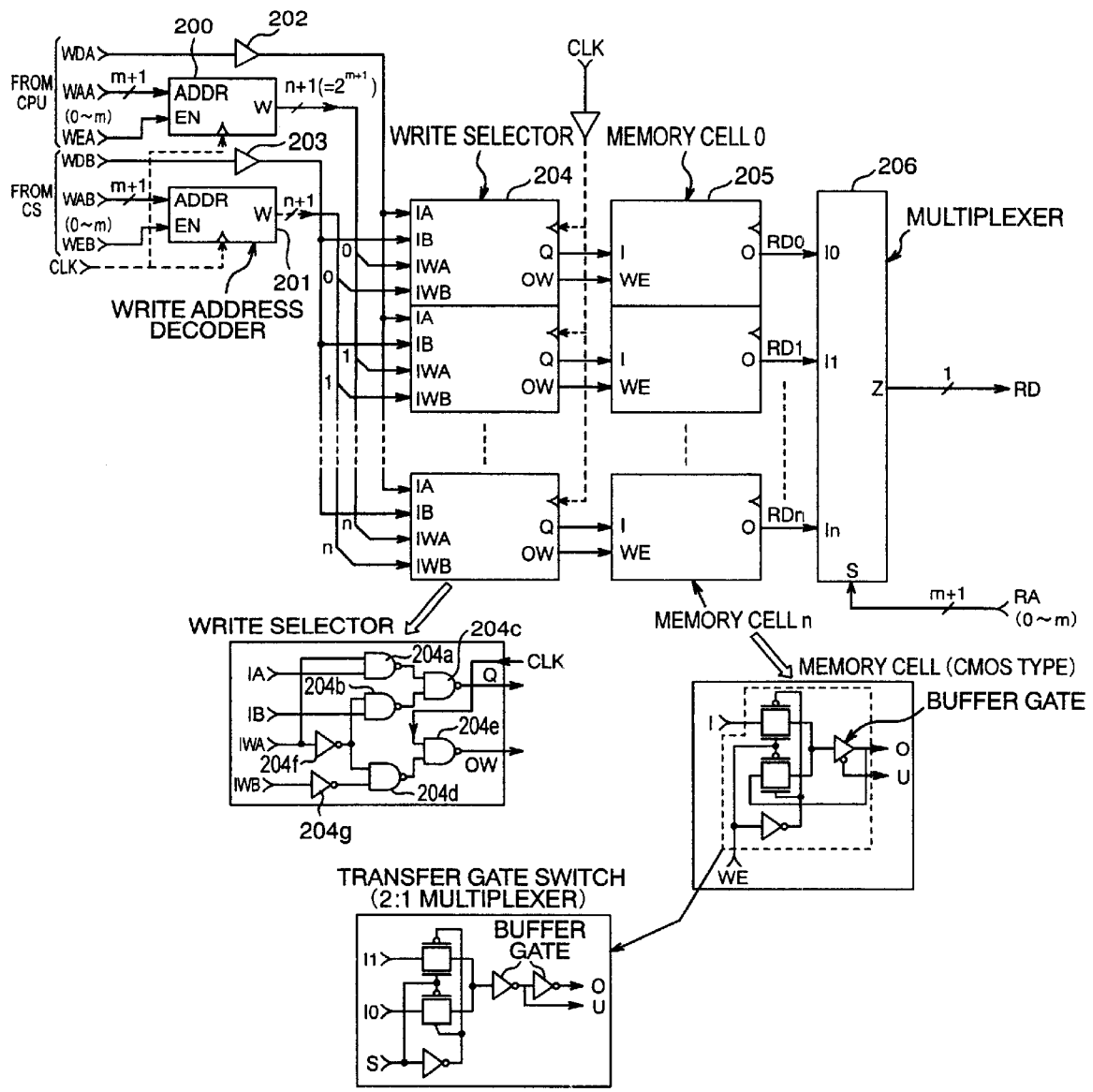
FIG. 2 shows a construction of a multi-port memory unit (1 bit×(n+1) words) and a structural example of a memory cell unit.
Figure 10:
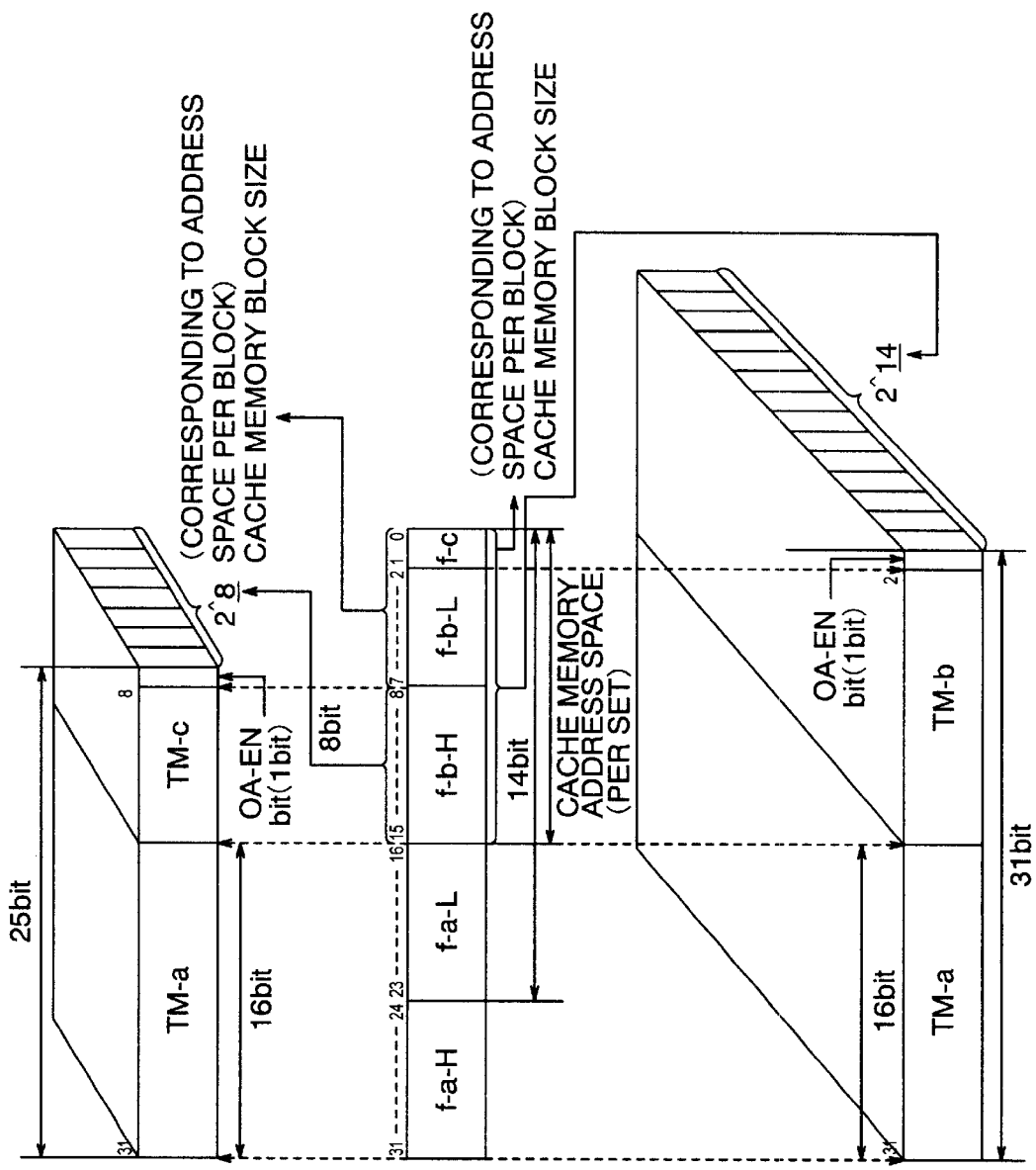
FIGS. 10A and B show an example of the relation between a physical address space and a tag memory unit construction and a relation between a cache address space and the construction of the tag memory unit.

FIG. 2 shows a basic construction of the memory unit portion of the multi-port cache memory system 2 shown in FIG. 1. To simplify the explanation, the drawing shows a memory system construction of 1 bit×(n+1) words and a construction of 1-bit memory cell. When CPU stores the data in the cache memory in the cache memory system, the size and the construction of the memory block that replace the data by one transfer processing are generally defined. This data unit is called a "cache line block", and each of these blocks is serially defined and managed by the address. The operation of replacing the data block to be cached afresh by CPU and the operation of storing the data in other data block is called "cache line fill" (a processing for filling a cache line block). When the content in the cache line block stored once in the cache memory is read or written, the access can be made directly to the address at which the target data exists. When the data is stored in other data block, the physical address itself, in which the data of the cache memory should originally exist, is changed. Therefore, the replace operation (cache line fill) is executed in the cache line block unit. For this reason, the construction of the tag memory TM that manages the physical address of the data existing in the cache memory and the address of the cache memory greatly depends on the construction of the cache line block. (FIG. 10 shows a structural example of TM). This construction will be explained later in detail.

The memory unit shown in FIG. 2 includes a memory cell 205 for latching the data signal of the input I by the write enable WE (for passing at Hi to output to O and latching and holding at the fall timing in this embodiment) and outputting the data to O, a multiplexer 206 for selecting the output of one of n+1 memory cells by a selector S (by inputting the address from CPU), a write selector 204 so disposed as to correspond to each memory cell and having the function of re-constituting the write port into two independent ports, a write decoder 200 for decoding the address from a write port A as the first write port and write enable WEA, selecting and deciding to which memory cell the data is to be written, and generating a write signal (W) corresponding to each memory cell, and a write decoder 201 for similarly decoding the address and write enable WEB from the write port B as the second write port and generating a write signal (W) corresponding to each memory cell. The write data WDA to the write port A is inputted to the input IA for the port A of the write selector 204 (through a buffer 202 in this embodiment), and the write data WDB for the write port B is inputted to each input IB for the port B of the write selector 204 (through a buffer 203 in this embodiment). Each write selector 204 receives at IWA the corresponding one of the write signals (W) for the port A from the write decoder 200 so outputted as to correspond to each memory cell, and similarly receives at IWB the corresponding one of the write signals for the port B. Only when these signals are active, each write selector generates an active OW signal at the write input WE of the corresponding memory cell, and a write processing of the data to be stored in the outputting memory cell from the Q output of the write selector to the I input of the memory cell is executed in match with this timing.

A structural example of the write selector 204 is shown at the lower part of FIG. 2. The write selector in this embodiment comprises gate circuits 204a to 204g (AND, NAND, NOT=inverter). Reference numerals 204a to 204 represent the selectors of the IA input and the IB input constituted by the NAND gate. The selector has a logic such that when IWA=1, IA is outputted to Q and when IWA=0, IB is outputted to Q. The inverter 204f unconditionally keeps the output of the NAND gate 204b 1 when IWA=1, and outputs the information of IA to Q through the NAND gates 204a and 204c (equivalent to two stages of inverters in this case). When IWA=0, on the contrary, the gate circuit 204a unconditionally outputs 1 and the inverter 204f outputs 1. Therefore, the information of IB is outputted to Q through the NAND gates 204b and 204c. When either IWA or IWB is 1 (active), the corresponding inverters 204f and 204g output 0 and the NAND gate 204d unconditionally outputs 1. In consequence, the AND gate 204e outputs the active level of 1 to OW in response to the Hi level state of the clock. In this embodiment, the memory cell operates in such a fashion that when OW (WE at the input stage of the memory cell) is Hi, the memory cell passes the input information of I to 0, latches the information inside the memory cell at the edge at which OW falls to Lo (in synchronism with the timing at which the clock changes from the Hi level to the Lo level), and keeps outputting the information to O until OW next shifts to the Hi level. The lower part of FIG. 2 illustrates a structural example of a CMOS type high-speed memory cell using a transfer gate circuit. The transfer gate switch combines a P type transistor and an N type transistor as shown in the drawing, controls the gate signal as a selector and can constitute a high-speed switch (with a delay time of transistor 1 to 2 stages+$\Delta\alpha$). The transfer gate switch has the feature that a hazard does not occur in the output stage at the time of switching so long as the input is under the stable state (a the level of 1 or 0). Therefore, when the output of the normal inversion stage is fed back to IO and WE (OW at the output stage of the write selector) is inputted to the selector S, the information of I is passed to the O output when I1=I and WE1=1. When WE1 is changed to 0 at the timing at which I1 =I is kept, the O =I information output fed back to the IO input is continuously outputted to O, the latch loop is formed, and the information is latched. This memory is a high-speed CMOS memory in which the information passes with a delay of [delay of buffer of output stage+$\Delta\alpha$ (several to dozens of psec). However, a considerably large number of transistors such as seven to eight transistors are necessary. FIGS. 1 to 14 show examples of transistor saving type memory cells, though they have a low operation speed.

Figure 3:
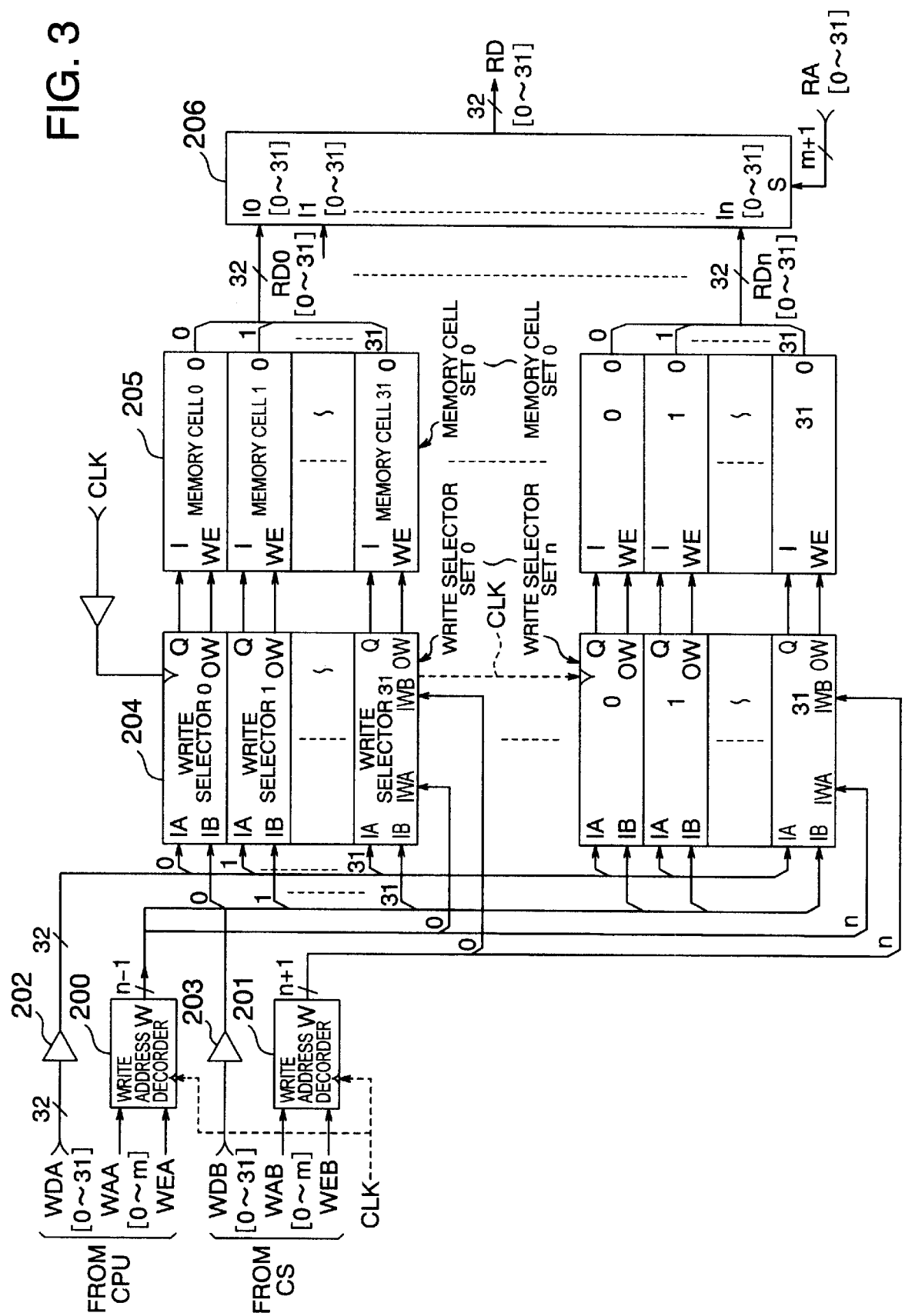
FIG. 3 shows a structural example of a multi-port memory unit having a 32-bit×(n+1) word construction.

FIG. 3 shows a structural example of a 32 bit×(n+1) word type multi-port memory unit. In this memory unit, 32 write selectors and 32 memory cells are arranged in parallel, and they are called "write selector set" and "memory cell set", respectively. Further, (n+1) sets of these write selector sets and memory cell sets are prepared, respectively. Each write selector set and each memory cell set may well be regarded as the write selector and the memory cell in the memory unit having the 1-bit×(n+1) structure shown in FIG. 2. IWA, IWB and CLK are inputted (through buffer gates in this embodiment) as the signals used in common among the write selector sets to each write selector set 0 to n. WDA0 to 31 and WDB0 to 31 to be inputted to IA and IB are inputted as the signals that are common among the write selector sets but are so allocated as to correspond to the write selectors 0 to 31, respectively.

Incidentally, each memory cell 0 to 31 in each memory set receives Q and OW output (write enable output) at I and WE inputs in this structural example. To reduce the number of gates, however, it is also possible to employ the construction in which one circuit is disposed as a circuit associated with the common signals IWA, IWB and CLK for each write selector set, and the OW output from this common circuit is connected in common to the WE input of each memory cell inside the corresponding memory cell set.

For example, the gates 204d to 204g inside the write selector 204 are provided as the common circuit to only the write selector 31, and the write selectors 0 to 31 are for only the gates 204a to 204c (only the Q output), and only one OW output is outputted from the common circuit. This construction can reduce the number of gates corresponding to the gates 204d to 204g. When selector isolation (a construction that isolates S and SN and omits an inverter) of a transfer gate switch (a transfer gate switch not having a buffer gate may be used, too) is used in place of the gates 204a to 204c, minimum about four transistors can constitute the write selector. The number of transistors can be reduced when open-drain and open-collector type transistors are used (means used for the memory cells shown in FIGS. 11 to 14). The output from each memory cell 0 to 31 of each memory cell set selects one of the memory cell sets 0 to n by using a multiplexer that selects 32 bit×(n+1)⇒32 bit×1, and the selected data is outputted as one 32-data (RD0 to 31). Incidentally, this multiplexer select signal S uses RA0 to m (a part of the address from CPU) in the same way as in FIG. 2.

In the multi-port memory units shown in FIGS. 2 and 3, the supply of the write data, the address and write enable from the common system (CS) side is assumed to be made to the B port (WDB, WA, WEB), and the supply of the write data, the address and write enable from the CPU side is assumed to be made to the A ports (WDA, WAA, WEA). In this embodiment, when the access from the common system side to the same memory cell or the same memory cell set competes with the access from the CPU side due to the internal construction of the write access selector 204 (as WEB and WEA become active at the same timing), WEA becomes 1 and the IA side (A port side) inside the write selector is unconditionally selected and is outputted to Q. In consequence, higher priority is assigned for the write access on the A side, that is, the CPU side. When priority is assigned for the CS side, the inputs to WEB and WEA for the write selector may well be replaced. Since the data from the CS side is generally the past data (time-wise), it is general to assign higher priority for the CPU side and the present embodiment employs this system.

Figure 21:
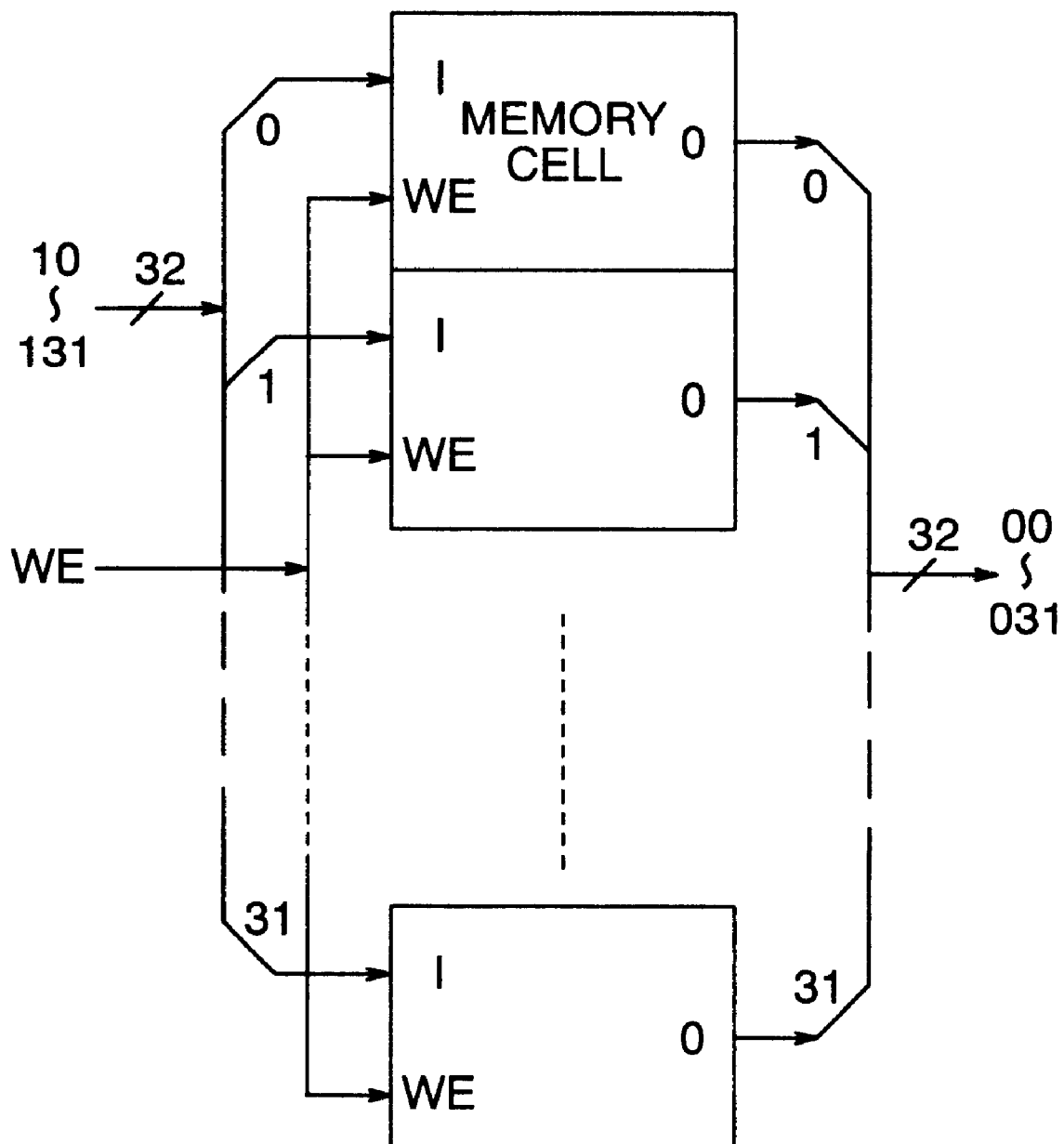
FIG. 21 shows a structural example of a cache memory line block.
Figure 22:
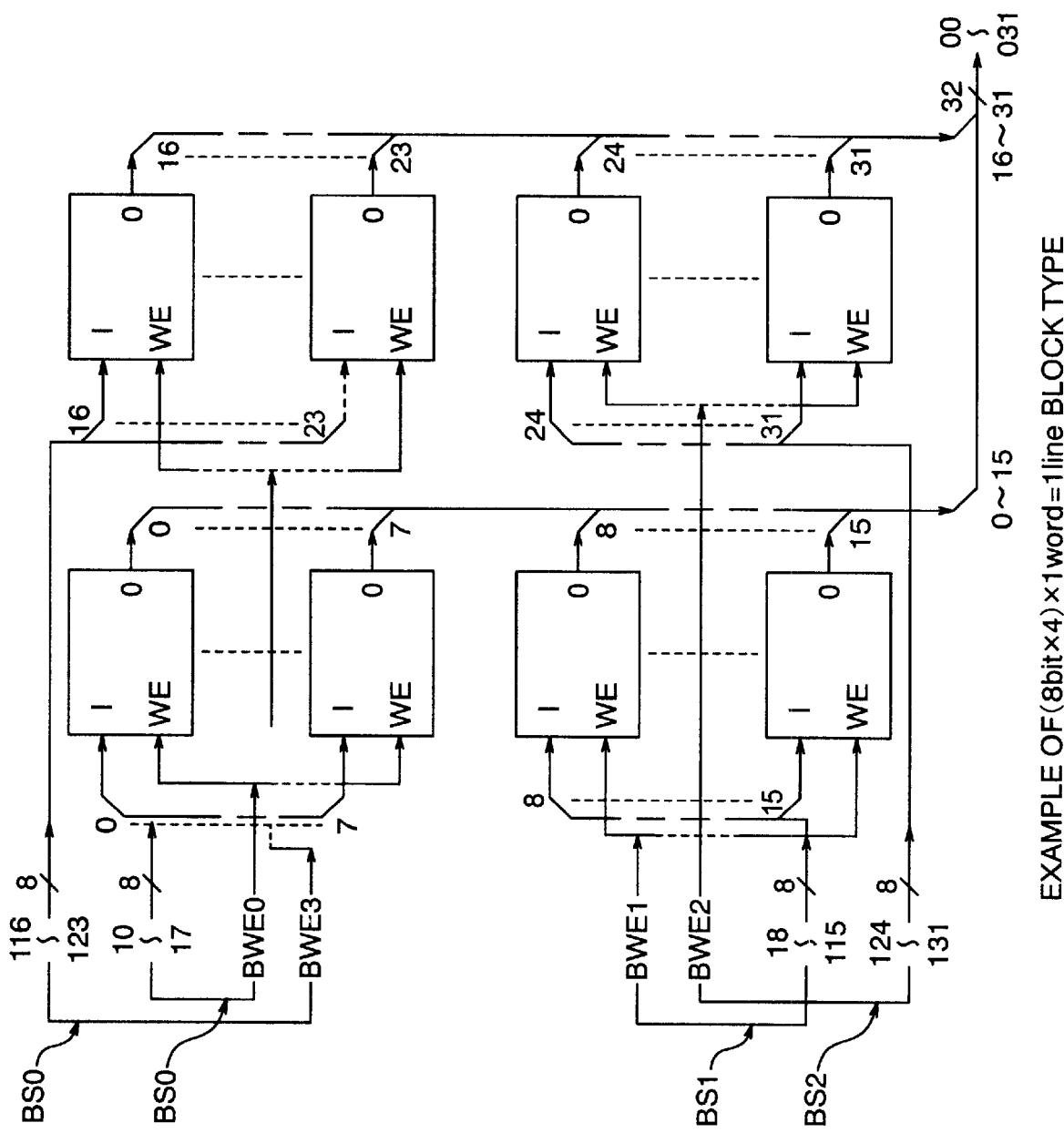
FIG. 22 shows another structural example of a cache memory line block.
Figure 24:
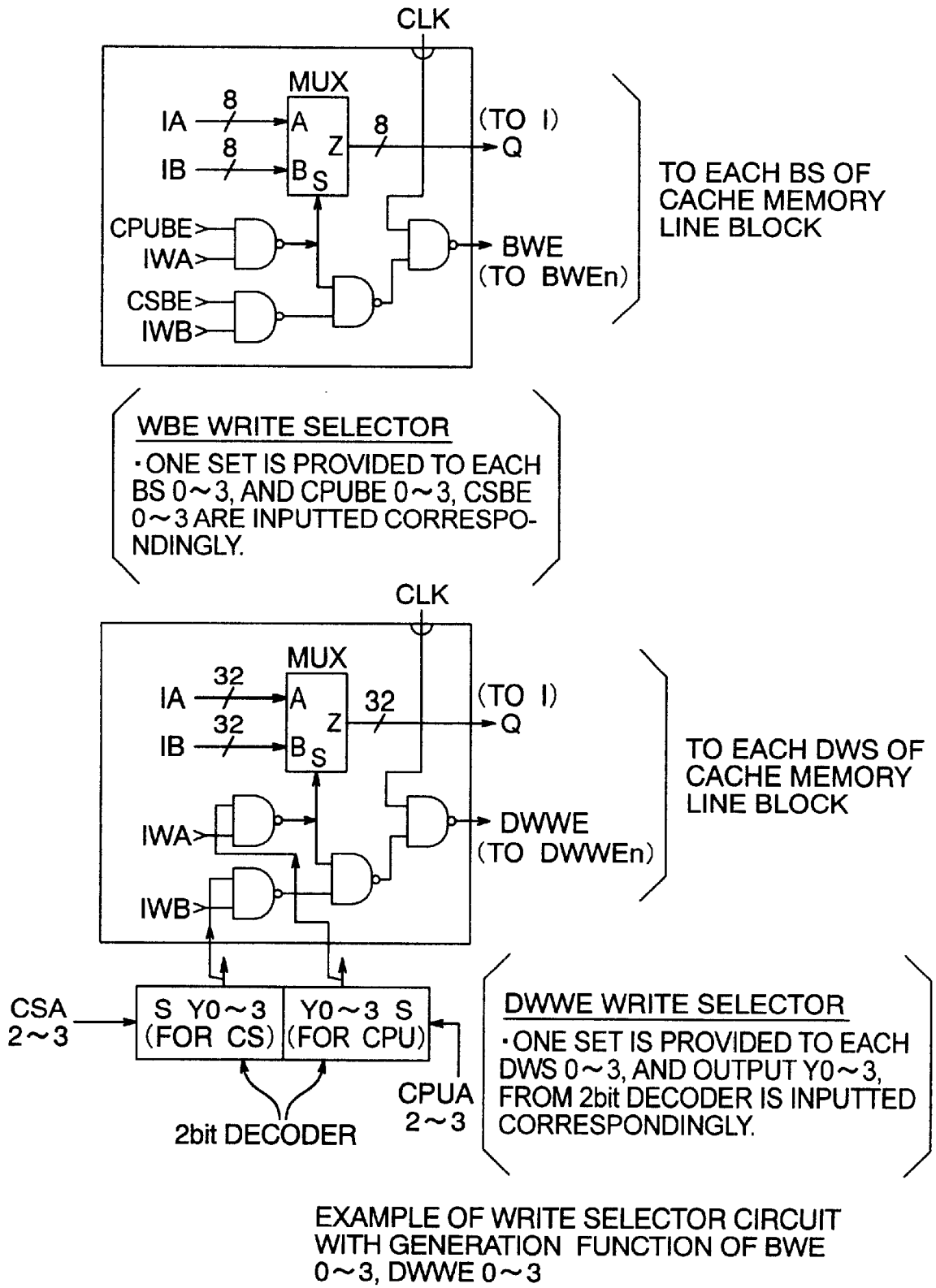
FIG. 24 shows another structural example of a cache memory line block.

In FIG. 3, 32-bits are handled as one data to form one cache line block. As to the data that is once cached, however, there occurs the case depending on the system where only a part of the data such as only one byte of the 32-data is to be re-written at the timing of ordinary re-write access (for the access from the CPU side or the CS side) not involving the cache line file. To accomplish the access in the byte unit (8 bits), for example, byte enable signals (BE0 to BE4) may be generated in such a fashion as to correspond to four byte data contained in the 32-data and may be transferred to the cache memory system as one of the signals of the control signals and the address signals from the CS side or the CPU side. The byte write enable signal BWE to be directly given to the memory cell set may be regarded as the signal that is generated in response to each BE and permits re-write of the corresponding byte data when it is active (active=1 in this embodiment). Incidentally, it is advisable to generate BWE0 to 3 by calculating AND between byte enable signal BE0 to 3 generated with the address information from CPU or CS and write enable WE inside, or immediately before, the cache memory system. FIG. 21 shows the construction of a memory line block corresponding to FIG. 3. FIG. 22 shows the construction of a memory line block capable of dividing the inside of the 32-data into four byte data and capable of re-writing by write enable. The upper part of FIG. 24 shows an example of a circuit for generating the byte write enable signal (BWE) to the memory cell set inside the write selector by use of byte enable (CPUBE) from CPU and byte enable (CSBE) from CS.

Next, in connection with the access timing when write from CS and read from CPU occur at the same timing to the same byte data in the same cache line block or inside its block, a method for accomplishing the system capable of exchanging the data without conflict and contradiction will be explained. Incidentally, it will be assumed that the access timing from CPU to the cache memory system, the write access timing from CS to the cache memory system and the operation timing in general such as the operation timing of the cache memory system and the tag memory are basically in synchronism with one clock (CLK).

The memory cell shown in FIGS. 2 and 3 outputs the input data in synchronism with the Hi state of CLK when WE is at the active level, and latches and holds the data at the fall timing of CLK as already described. Assuming that the CPU side reads out the data by using one cycle from the rise of CLK to its next rise, it is preferred that the output from the memory cell is stably outputted during this cycle. It is believed better, therefore, if the construction is so made as to output any stable information at the transmission timing of the memory cell. Assuming that the information from the common system (CS) side is sent with one cycle from the rise of CLK to its next rise as the defined cycle in the same way as on the CPU side, the latch circuit shown in FIG. 4 (that transmits information when CLK is Lo and latches and holds it at the rise) receives these information at the pre-stage of the cache memory system or between the cache memory system and the common system. In this instance, the control circuit of the cache memory system and the latch function of the memory cell operate in the interlocking arrangement and when viewed from the read port on the CPU side, a function of a flip-flop can be achieved that uses the rise of CLK as the timing at which the data is defined. As a result, the condition described above can be satisfied.

Figure 7:
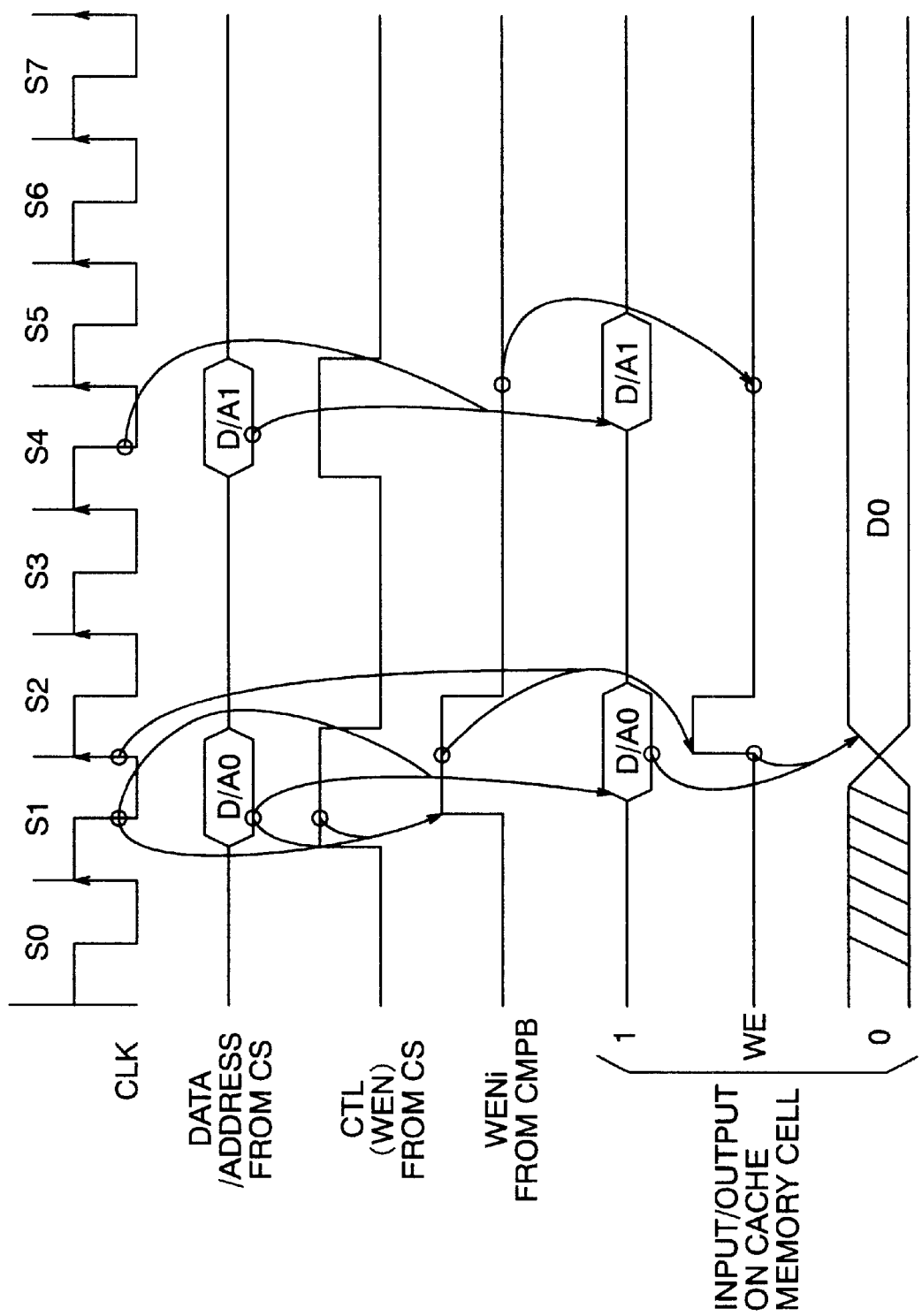
FIG. 7 shows a coherence control basic operation timing of a cache memory system.

FIG. 7 shows a timing example. Initially, the information of the data/address D/A0 is sent with WEN at the state S1 from CS to the cache memory system, and the comparison circuit (CMP) generates WENi as the comparison incidence information in response to A/A0. This represents that the data to be changed exists in the cache line block of the cache memory system corresponding to i. Write enable WE corresponding to the cache memory cell is generated at the Hi state of CLK in response to this WENi. On the other hand, the data/address (D/Ao) from CS is given through the latch circuit shown in FIG. 4 to the cache memory system and to the input I of the cache memory cell inside this system in the shifted form from the center timing of S1 to the center timing of S2. Therefore, when the data/address is latched at WE in the memory cell or the memory cell set (corresponding to i), it is outputted at the timing O in FIG. 4 and is defined at the leading edge of S2. In other words, a stable value can be always outputted in synchronism with the rise edge of the clock. When such a synchronization system is employed, the CPU side does not read unstable information (under the meta-state) even when the write access from the CS side and the read access from the CPU side are freely executed. Consequently, coherence control and access control can be made without any conflict at all. Incidentally, the write access control from the CPU side to the write port A can be made in the same way as that from the CS side.

The tag memory (TM) as address block memory means for judging whether or not the object cache line block exists on the cache memory system, the comparison circuit (CMP), and their functions and control will be explained next in association with the coherence control described above.

Figure 5:
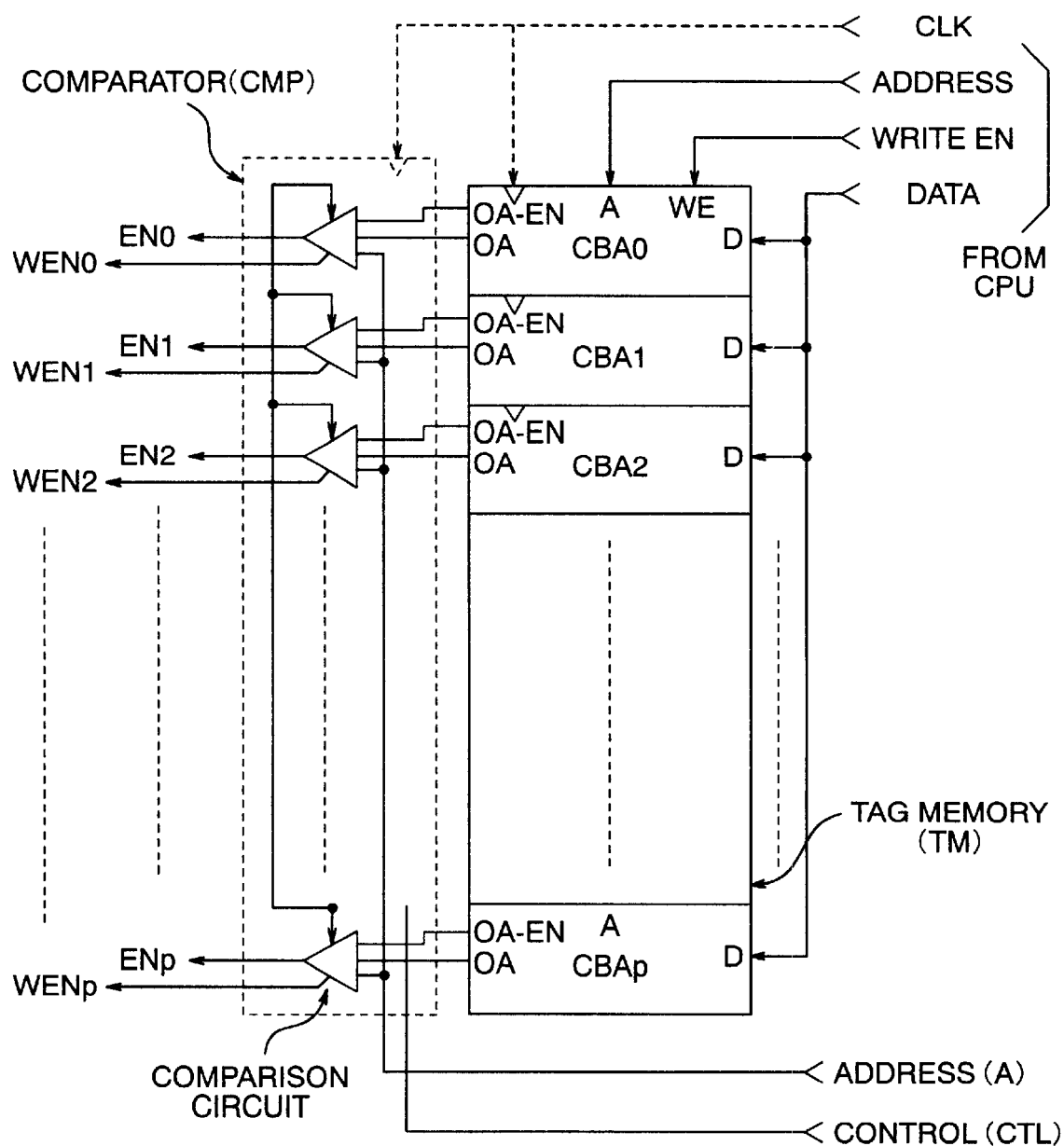
FIG. 5 shows a structural example of a tag memory and a comparison circuit.

FIG. 5 shows the basic constructions of the tag memory (TM) and the comparison circuit (CMP). TM has memory means CBA0 to p corresponding to the cache line block. These memory means store the physical address information corresponding to the information (the information of the cache block) to be replaced to the cache memory system at the time of the resource access from CPU. When the physical address space is 4 G bytes and 32-bit 1 line block, for example, high order 30 bits of the physical address of the line block, in which the data to be cached exists, are stored in the corresponding CBA, and the bit (OA-Enbit) representing that this CBA is effective is rendered active (=1 in this embodiment) if the replace to the cache memory system occurs during the execution of the access to the source by CPU (ordinarily, the read access). In this embodiment, the physical phase of an arbitrary cache line block can be stored in an arbitrary CBA. Therefore, if one free space exists in CBA, cache replace is possible, and TM and the cache memory can be utilized without waste. If no free space exists in CBA, CBA at any place is re-written (replace must be given up in some cases depending on an algorithm) in accordance with a suitable algorithm (a cache replace algorithm). If possible, memory means (used for storing time history and re-writing CBA holding the oldest information) may be further provided in parallel so as to improve the functions of the algorithm. When it is desired to flash a specific line block of the cache memory system, OA-Enbit of corresponding CBA may be rendered inactive. Control means may further be prepared for rendering at one time all OA-Enbit inactive to execute full flash. A comparator is disposed as the comparison circuit (CMP) in such a fashion as to correspond to each CBA in TM. The comparator compares the memory address output OA from each CBA with the access address A from CPU or CS, and checks whether or not the line block of the physical address to which access is to be made exists on the cache memory system. When the line block exists, the comparator outputs the enable signal ENi. Incidentally, the signals CTL (such as WEN) and CLK are used for timing control and synchronization in the comparison circuit (CMP) and TM.

The write operation of the access physical information at the time of cache replace from CPU to the tag memory (TM) is generally executed in the form synchronized with the clock (CLK) through the information lines such as the address (A), the data, write enable (EN), and so forth, from CPU. For example, the write operation is executed in the following sequence in the case of an ordinary CPU system that executes the cache replace only at the time of the read access to the resource.

a) When the block of the access physical address is the area to be cached when the read access of CPU is made, the present information of TM is compared with the physical address information from CPU.

b) When any comparison coincidence information (ENi) is active, the access is directly made to the cache-in block (i) on the cache memory system corresponding to CBAi, and no access is made to the external resource. If none of ENi are rendered active, the physical address block holding the information as the object of the read address is handled as one line block, and all the information inside this block are replaced (cache line filling) to the cache line block at any position of the cache memory system. Further, the physical address information is written into corresponding CBA, and corresponding OA-EN is rendered active (=1). To which cache line block the information is to be replaced depends on the replace algorithm and on the construction of TM, and the like.

c) The write access from CPU to the cache memory system, that is necessary for cache line fill, is executed in parallel with the write access from CS by utilizing the write port A in this embodiment. Therefore, a bus and access control means for cache line fill are separately prepared from the ordinary access bus from CPU, and cache line fill is executed by switching the function.

d) Even when the write access is executed from the CS side to the cache memory system through the write port B while the cache line fill processing from CPU is executed, the port A priority function of this embodiment assigns a higher priority for the access from the CPU side. Even when cache line fill from the CPU side is executed during the access from the CS side, the information is merely over-written. Therefore, the operation devoid of contradiction can be expected in either case. When control is made so that corresponding OA-Enbi is turned OFF at the starting point of cache line fill and is again turned ON at the point of completion of cache line fill, the write access from the CS side can be prevented from occurring in the line block during cache line fill for at least this OFF/ON period.

As described above and shown in FIG. 1, the comparison circuit (CMP) is independently equipped with CMPA for comparing the physical address at the time of access from the CPU side with the stored physical address information from TM, and CMPB for comparing the physical address information from the CS side with the stored physical address information from TM, and can execute in parallel these two comparison processing.

CMPA works during the cache replace (cache line fill) operation and at the time of the normal cache read access as described above. However, CMPB is a comparison circuit that works at the time of the write access from the CS side to the cache memory system, that is, a dedicated comparison circuit for coherence control. Incidentally, CMPA, too, may be regarded as exhibiting substantially similar functions to the functions of CMPB at the time of the write access from CPU to the cache memory system. Hereinafter, the structure of the comparison circuit (CMP) portion on the CS side will be primarily explained and at the same time, the control timing of the access from the CPU side to the cache memory and the access from the CS side to the cache memory will be described.

Figure 6:
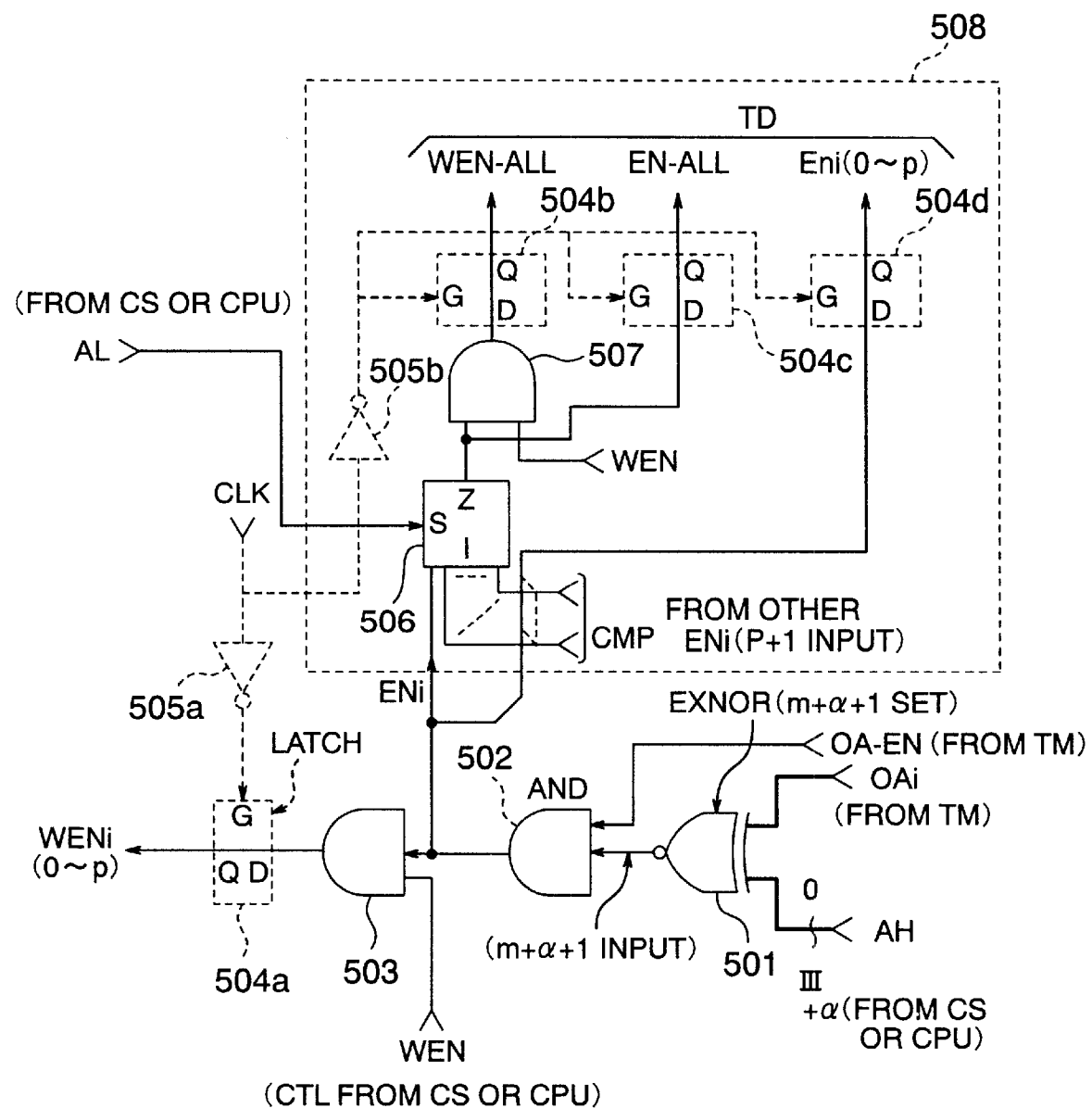
FIG. 6 shows a structural example of a comparison circuit.

FIG. 6 shows a structural example of the comparison circuit (CMP). EXNOR 501 (that outputs 1 when the logic of two bits is the same) is carried out between the physical address information OA from CBA of TM and the physical address AH of the access object (corresponding to the field of the physical address recorded to CBA) for each bit. Next, AND 502 (that outputs 1 when all the bits are 1) calculates the result for each bit and the OA-EN bit from corresponding CBA. Further, AND 503 calculates AND with write enable (WEN) from CS and generates WENi. In this embodiment, the latch 504 latches the clock (CLK) by using the timing trigger inverted by an inverter 505a, and outputs WENi.

Figure 4:
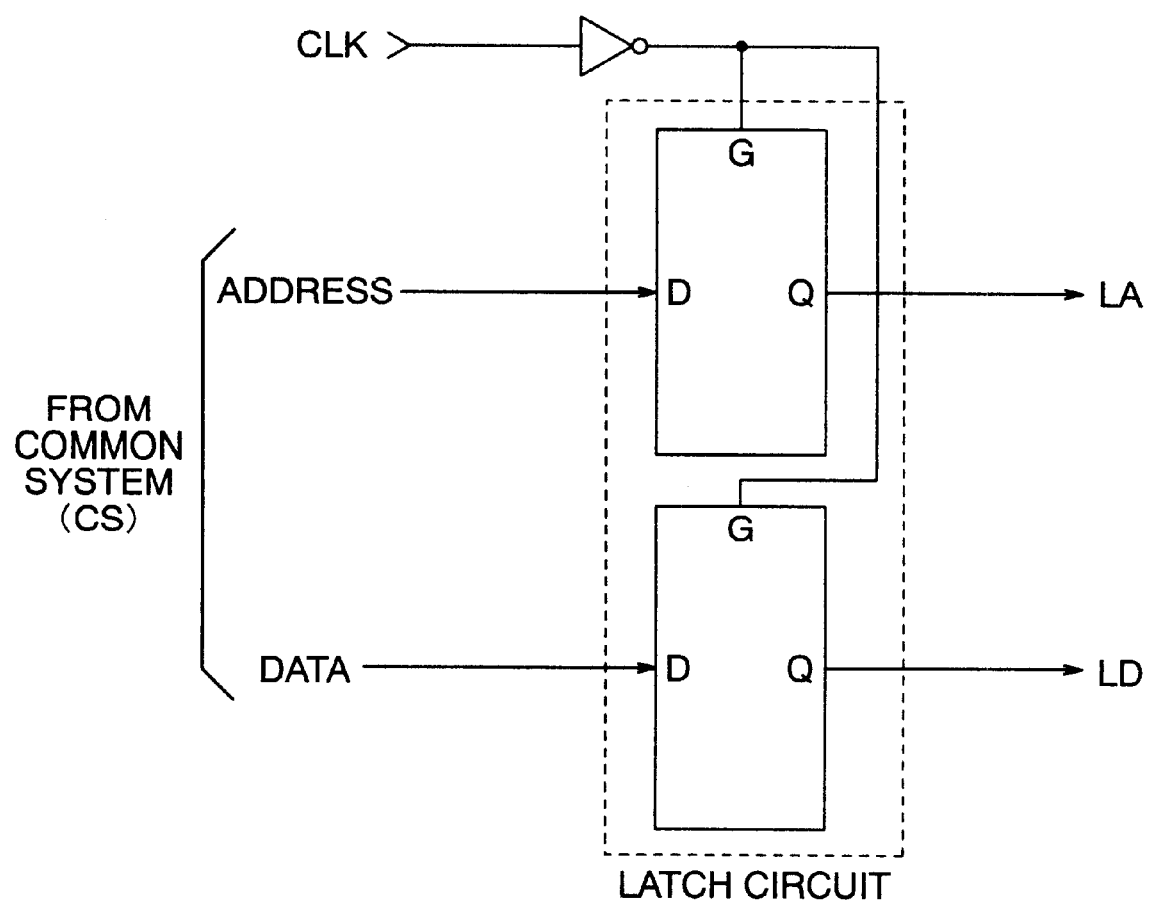
FIG. 4 is a circuit diagram of a latch circuit for information from a common system.

As shown in FIG. 7, the latch 504a is provided with the operation of shifting WENi given from MPB to the cache memory system from the fall timing of the clock (CLK) to the next rise timing, and is caused to play the role of establishing matching between the timing after the address information from CS passes through the latch circuit (D/Ax shown in FIG. 7-I) and the timing of WENi, as explained already with reference to FIG. 4. (P+1) sets of such comparison circuits are prepared in such a fashion as to correspond to each CBA in TM as shown in FIG. 5.

Incidentally, reference numeral 508 denotes an addition circuit for processing the information to be sent to the CPU side. Assuming that p basic circuit portions of CMP paired by 501 and 502 exist outside in such a fashion as to correspond to each CBA, the information (TD) associated with TM to be displayed on the CPU side and CMP are generated from the output ENi from 502 and p EN from 502. WEN-ALL is outputted in the following way. A selector 506 (which may be replaced by an OR circuit for calculating merely OR of each EN when CBA holds all the bits of the physical address of the line block) selects ENi corresponding to CBAi as the access object of each EN (ENi generated from the output OAi from CBAi corresponding to the lower order physical address AL=1) by means of the physical address AL=i. The WEN-ALL is calculated AND of the selected ENi with the WEN signal by AND 507, and the latch 504b is used to shift the timing of the WEN-ALL in the same way as the latch 504a.

EN-ALL is the output obtained by omitting the AND (AND507) processing by WEN and thereafter executing the processing in the same way as WEN-ALL, and ENi (0 to p) is obtained by directly outputting each EN signal (if necessary, the timing shift similar to that of 504a is executed by using the latches 504c and 504d in either case). TD gives the control information that is particularly important for the comparison circuit CMPA for CPU to CPU. For example, the control information is utilized as the information for judging whether or not the access to the cache memory is possible or whether or not the access is to be directly made to the external source and the bus control at the time of the read access from CPU, for the similar judgment and the bus control at the time of the write access, for the control at the time of the cache replace processing, and so forth. In the coherence control basic operation timing shown in FIG. 7, WENi, that is displayed as write enable from CS, corresponds to WENi that is gated (AND 503) by WEN generated from CMPB and to which the timing shift is applied. This WENi may well be regarded as corresponding to WEB (on the B port side) used for the write access from the CS side in FIGS. 1, 2 and 3.

The access can be achieved by using similar signals and similar signal timing as in the ordinary write access operation interlocked with the cache memory system from the CPU side. The access from the CS side occurs in the state S1. Since the object line block exists on the cache memory system and WENi becomes active, the access is latched and outputted by the cache memory at the leading edge of S2 in accordance with the timing control described already. The write access from the CS side similarly occurs in the state S3. Since WENi from CMPB is not active (since the object line block does not exist on the cache memory system) in this instance, the data and the address information D/A1 given to the cache memory are neglected, hence the data output O from the cache memory system does not change (the data D0 latched at the leading edge of S2 is held).

Figure 9:
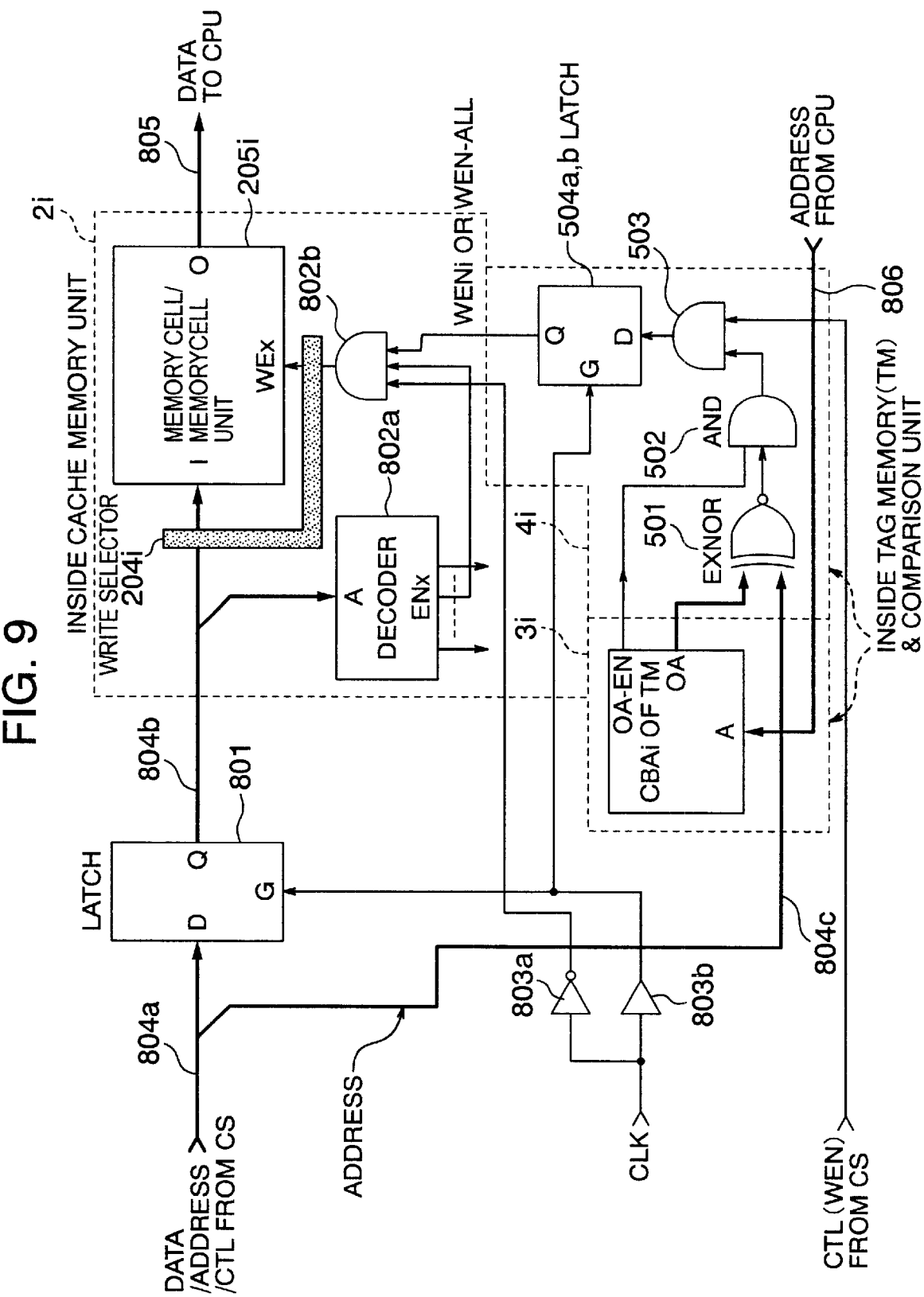
FIG. 9 is an overall schematic view of a write bus and a control circuit from a common system.

FIG. 9 is an overall schematic view of the write bus from the common system (CS) to the cache memory system and the control circuit. To simplify illustration, FIG. 9 specifically shows one cache line block (that is called "i") and a corresponding circuit block.

First, this embodiment employs the construction in which the data/address information and the control information 804a from CS are separately transferred through a bus 804b extending into the cache memory unit 2 through the latch circuit 801 shown in FIG. 4 and a bus 804c extending into the comparison circuit (CMP) 4. (The construction in which information 804b after latching are all used can be employed depending on the system). In the bus extending to the comparison circuit, the comparison circuit 4i shown in FIG. 6 compares the output address information OA of CBAi inside corresponding TM with the address information from CS, and generates WENi or WEN-ALL latched by the latches 504a and 504b for the write decoder 201 inside the cache memory system or the directly corresponding write selector 204i. The latches 504a and 504b exhibit the same function as that of the latch 801 as already described.

Here, whether WENi is directly used or WEN-ALL is used depends on the construction of the tag memory (TM) and its format, too. When WEN corresponding to at least each CBA is independently used (when WENi is directly used), CBA must hold the physical address information of the line block in all the bits. This point will be described later in detail.

FIG. 9 shows the write logic bus to the memory cell or the memory cell set 205i of the corresponding cache memory line block by directly using WENi. This embodiment uses WENi corresponding to each of (p+1) cache memory line blocks. The gate 802b carries out AND between the inversion signal (by 803a) and if necessary, the lower order address decoding result ENx (that may well be considered as the address decode inside the cache line block and in this case, ENx is assumed to become active in the sense that the write unit data x as the object inside the cache line block is selected) of the write address decoder 802a (that may be considered as the type obtained by decoding only the address information by the write address decoder 201) and WENi for each WENi, and gives the result to the WE input of the memory cell/memory cell set 205i for each WENi.

Here, the write bus from the CPU side to the memory cell set 205i is omitted for the sake of simplification. Therefore, the write enable input WE and the data input I of 205i directly input the output of the gate 802b and the data bus 804b from the latch 801. In practice, however, they are inputted to IB (B port) of the write selector 204i and its output reaches 205i (the CPU side uses the A port) as already described. The data output 805 to CPU is outputted from O of each memory cell/memory cell set 205i. Thereafter, the multiplexer means 206 selects the information of the necessary memory cell/memory cell set in response to the address information from CPU and the CPU side receives the information (read access). The basic timing of each access operation is shown in FIG. 7.

Next, the memory font (content) of each CBA (cache block address) inside the tag memory (TM) will be explained. As described already, CBA records the physical address information of the data block stored in the cache line block on the corresponding cache memory system (that exists in the address space to which access can be made from CPU), generally the leading physical address value of the data block. Depending on systems, a system may be possible that manages the cache memory system by the logical address space. To gain access to the external resource, however, conversion from a logical address to a physical address occurs when the external information is transferred from the logical address to the cache memory, and conversion from a physical address to a logical address occurs when the information of the cache memory is transferred to an external resource.

Conversion and management between such physical address and physical address is called "management", and large-scale general-purpose CPU includes MMU (memory management unit) that executes such management for overall access control in many cases. To simplify the explanation, it is assumed hereby that such an access control is executed by the physical address information for the cache memory unit system and for the access to the external resource.

FIG. 10 shows the structural relation of the physical address and the cache address space with the tag memory structure. This embodiment is based on the following assumption. The physical address space shown at the center is 32 bit (unit data is byte=8 bits), that is, the data quantity is 4 G bytes. The common address space is 24 bits (data quantity=16 M bytes). The cache memory address space is 16 bits (data quantity=64 K bytes). The ratio of these spaces can be freely selected in accordance with the system. In other words, it is a design matter.

It is also assumed in this embodiment that the physical address space of 4 G bytes is all the object of caching (can be handled by replacing them on the cache memory). However, to execute or not to execute partial caching in accordance with the instruction from the CPU side, control information that makes caching inactive or status bit information is given when the access is made, or is to be made, to the address space portion that is not cached. More concretely, the replace operation and the access operation to the cache memory system are inhibited when the information described above is active. Here, control is made in such a fashion as to transfer the large space of 4 G bytes to the small cache memory address space of 64 K bytes so that the accesses as many as possible occur on the cache memory system and in this way, the operation speed of the CPU system can be improved by reducing the external access operation (generally requiring 2 to 4 times that of the cache memory access).

The most troublesome problem is handling of the data on the common system (CS) (the common address space). Since re-write occurs not only from the private processor but also from other processors, the access from the CS side concentrates on the cache memory system in the high-speed system and renders the problem for high efficiency of the system as described already. As to the information on the CS side contained in the information that has already been replaced and used by CPU on the cache memory, when re-write from other processors occurs, the present application ideally employs the direct changing system through the external data bus 11 for the common system from the CS side. However, it is to be noted that the structure inside TM and the format of CBA, etc, can be designed independently of the re-write system from the CS side and the problem of the access bus.

FIG. 10A shows the case of one cache line block=one data as the premise in FIGS. 2 and 3 as an example of the CBA structure inside TM. Since one data is 32 bits, the number of CBA that is necessary corresponds to f-b-H:f-b-L=14 bits of the cache memory address space, that is, for 16 K data. In the example shown in FIG. 10A, CBA has a bit width to store all the physical address information of 30 bits (TM-a:TMb=f-a-H:f-a-L:f-b-H:f-b-L) existing in the cache memory block corresponding to each CBA (cache memory block is believed to correspond to CBAi) and OA-ENbit representing that CBA is effective or invalid, that is, 31 bits in total.

In this case, the lower 2 bits (f-c) of the physical address need not particularly be stored due to he definition of 4 bytes=1 data block (32 bits). When the necessity of the operation in the byte unit (8 bits) occurs inside one data block, the CPU side or the CS side generates byte enable BE0 to BE3 corresponding to each byte data in the one data and sends it to the cache memory system. Then, the access control that makes the write processing effective for only the active bytes may be executed in the data unit (32 bits in this case) inside the cache line block.

In the example shown in FIG. 10A, all the physical address information of the cached data block are stored. Therefore, an arbitrary data block on the physical address space can be quickly replaced and handled in the one data unit to the cache line block corresponding to arbitrary CBA. If the free space exists in any CBA, the replace processing can be immediately executed. Even when all CBA are in use, it is possible to replace the data block by re-writing any CBA (that is selected generally by determining a rule, though it can be selected arbitrarily; it is general to select the line block having low frequency of use and replaced before a certain predetermined time). Therefore, utilization efficiency of the cache memory system becomes the highest and real time performance (response) is high in response to the former. On the other hand, the example shown in FIG. 10A has the disadvantages that memory means having a large width of 31 bit/CBA is necessary for several cache line blocks (14 bits=16 K data bocks in this example), and a large memory capacity for TM substantially equivalent to the size of the cache memory is necessary. Therefore, the concept of the CBA format shown in FIG. 10B has generally a wider application in many cases.

In FIG. 10B, the cache line block is 8 bits by address, that is, 256 bytes=64 data (1 data=32 bits), and the memory structure and the access sequence inside the block are so defined as to directly correspond to the lower order 8 bits (f-b-L:f-c). Therefore, the physical address information to be stored in CBA needs be only 25 bits, that is, 24 bits for TM-a:TM-e=f-a-H:f-a-L:f-b-H, and OA-ENbit. (Lower order 8 bits, i.e. f-b-L:fc, need not be stored due to the definition of 256 bytes=1 data block). Further, the number of CBA needs be only the number corresponding to f-b-H, that is, 8 bits=256. Therefore, the capacity of TA is about 1/80 of FIG. 10A in terms of the total bit number.

The construction of FIG. 10B can be said as having high efficiency in the same way as in FIG. 10A in that an arbitrary physical address can be replaced and used for each CBA. However, as many as 64 data must be subjected at one time to the line fill processing in replacing one cache line block. This replace operation is likely to hinder other access of CPU, to temporarily stop CPU and to lower real time performance (response performance) owing to the overhead such as exclusion of the external access and the transfer of unnecessary information. Therefore, it is generally necessary to limit the data number inside the cache line block to about 4 to about 16, and this method can be judged rather effective in consideration of processing efficiency.

Next, a modified example of the example shown in FIG. 10A may be the one that limits the physical address information stored in CBA to only TM-a=f-a-H:f-a-L. The cache memory structure shown in FIGS. 2 and 3 is based on the present system as the premise. The present system can be regarded as the format devoid of the TM-b portion by regarding that the f-b-H:f-b-L portion primarily coincides with the number of CBA. Therefore, each data block on the physical address space can store its physical address information f-a-H:f-a-L in only specific CBA that corresponds to the address f-b-H:f-b-L of the data block. Hence, freedom of the cache memory system drops considerably. On the other hand, corresponding CBA and the cache line block inside the cache memory system can simply make judgment by only the information f-b-H:f-b-L. In consequence, the judgment processing becomes simple when only a rule for judgment as to whether cache line fill is made in practice or the previous information is kept valid is determined.

The concept of storing only the TM-a portion in CBA likewise holds for the format (b). In the system for storing only TM-a in CBA, the capacity of TM decreases by the decrement of the number of bits of CBA (4 bits in FIG. 10A and 8 bits in FIG. 10B with the number of CBA remaining unchanged), and the system can be accomplished with smaller TM.

In the system for storing TM-a+OA–ENbit of the format in CBA shown in FIGS. 10A and 10B, only one CBA to be replaced by itself and only one cache line block exist as viewed from each data block on the physical address space. The possibility becomes greater in this case that the cache replace occurs more frequently to the same cache line block. As a result, the information that is replaced on purpose must be immediately discarded in some cases, and efficiency cannot be said satisfactory from the aspect of real time performance.

Therefore, the cache memory system and a plurality of sets of TM and CMP are prepared, and a plurality of sets of associative memory type cache memory systems are constituted under the state such that a plurality of sets of CBA and cache line blocks are prepared as viewed from each data block. In this way, the problem described above can be solved. In a plurality of sets of cache memory systems, when the access is made to the data block i on the physical address space to be cached, each corresponding set of CBAi is selected and the physical address information is compared. If any set is empty, the replace processing is executed for the corresponding cache line block i. If no set is empty, a simple rule is employed to execute the cache replace processing by replacing the data block that is replaced most previously and replacing a new data block as the object, or excluding CBAi having low access frequency and replacing a new data block as the object, or combining them together.

This system can prevent the concentration of the replace processing on the same CBA (can disperse the concentration to a plurality of sets of CBA), and can therefore keep real time performance at a relatively high level (the greater the number of sets, the better). From the common system (CS) side, a plurality of sets of cache memory systems, TM and CMP merely exist in parallel, and no change is necessary at all from the aspect of the access control. However, the same number of sets of CMP on the CS side is necessary in parallel.

According to the examination given above, it is generally believed practical from the aspects of processing efficiency, real time performance and the memory capacity to constitute a cache line system in which 1 cache line block=about 4 data and CBA inside TM is only TM-a+0A−ENbit in the format shown in FIG. 10B, and to prepare in parallel about four sets of such cache line systems.

Incidentally, whether WENi (or ENi) explained with reference to FIG. 6 or WEN-ALL (or EN-ALL) is used is decided in the following way. In the formats 10A and 10B of CBA inside TM shown in FIG. 10, all EN can be used when the physical address information TM-a:TM-b is held (WENi (or ENi) is used when an arbitrary physical address is held in arbitrary CBA). When only TM-a is held, however, WEN-ALL (or EN-ALL) generated by using the lower order physical address f-b-H:f-b-L (in the case of 10A) or f-b-H (in the case of 10B) as AL must be used.

For, the portion corresponding to TM-b is implicitly regarded as being equivalent to AL and is omitted in this case and since TM-a alone cannot render the corresponding WENi (or ENi) active, a processing for determining which EN is effective and for selecting EN in response to AL is necessary (the function corresponding to the selector 506). Generally, CBAi corresponds to AL=i, and when the selector 506 selects EN corresponding to AL, object ENi can be taken out. Eventually, WEN-ALL (or EN-ALL) so obtained becomes the enable signal representing whether or not the data of the object physical block exists in the cache memory system. Here, WEN-ALL is the access control signal for only the write port and EN-AL is the access control signal common to the read port and the write port.

Figure 8:
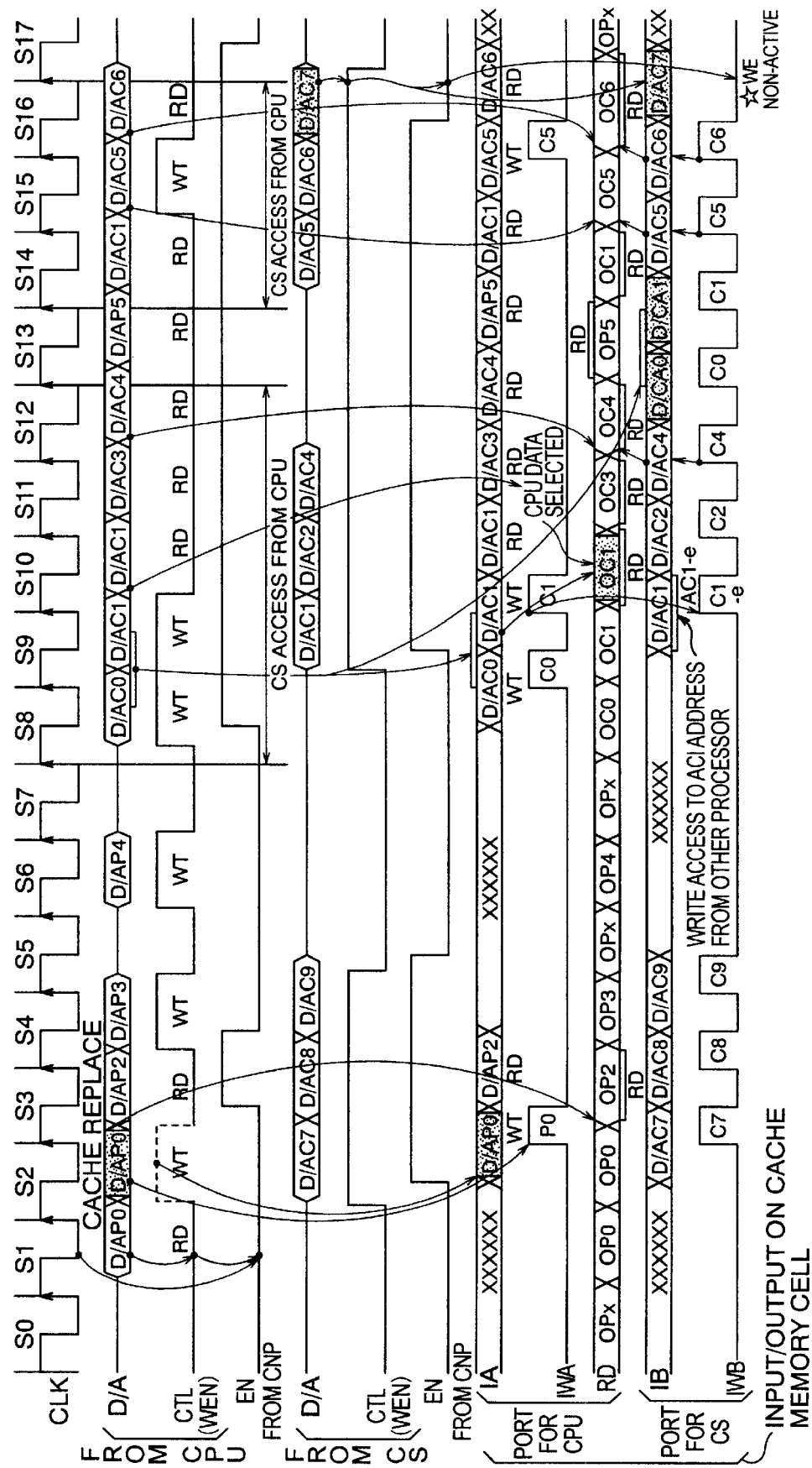
FIG. 8 shows an example a cache memory access timing when an access from a CPU side and an access from a CS side compete with each other.

Next, the access operation timing from the CPU side and from the CS side to the cache memory system will be explained with reference to FIG. 8. symbol D/APn represents the local address/data dedicated to CPU (processor) and D/ACn does the common address/data on CS. The uppermost stage of the chart represents the information (D/A, CTL=write enable, etc, EN=coincidence signal from CMP) from the CPU side. The second stage represents the timing of the information (similar to the uppermost stage) from the CS side. The lower stage represents the data input I (only the data D should originally be displayed, but D/Axx is displayed to represent corresponding address information) at the write selector connected to the memory cell (or the cell set) inside the cache memory system, and the timing of the write control signal IW, in such a fashion as to correspond to the write ports on the CPU side and on the CS side, respectively (IWA=CPU side and IWB=CS side).

Incidentally, the port on the CPU side is A and the port on the CS side is B. Further, IW is described at the timing of the WE signal (the signal the timing of which is in conformity with the former half of CLK) given to the memory cell (or memory cell set) to clarify the latch timing. Since the read ports, too, exist at the ports on the CPU side, the timing of RD (read data) obtained by selecting the output O from the memory cell (cell set) by the address from CPU and outputting it is also shown. Incidentally, it is hereby assumed that the timing between the data and the address is handled at the same timing at the generation stage and the port stage of the memory. It is assumed further that the port on the CPU side uses the common address information in both write and read operations.

First, CPU executes at S1 the RD access to D/AP0 as the external data/address to be cached. Since the coincidence signal EN from CMP on the CPU side is not active (Lo=0), the access to the external resource (such as the local memory) is immediately executed by sensing the coincidence signal EN in the latter half phase of S1. At the next step S2, the object data D/AP0 is read out from the external resource, the data bus is switched to the bus connecting the data input I.F. of the external local bus to the write port on the CPU side, and D/AP0 is sent to the I input of the write port.

On the other hand, write enable for cache replace is generated as the control signal at S2, and IWA is generated at the write port on the CPU side irrelevantly to EN from CPU. Then, the data D/AP0 to be replaced is written. Here, it appears that one cache line block is handled as one data. Even when the cache line block comprises a plurality of data, it is possible to re-write at one time the whole cache line blocks by IWA by expanding parallel bits in match with each data structure of the memory cell set of the corresponding cache line block if the cache line block has an external data bus of the bit width for the plurality of data, and by disposing in parallel data input means and data bus means for giving the data to the write port on the CPU side. Needless to say, it is possible to employ a system as the access control system that divides the write cycle into several cycles and re-writes all the data components inside the cache line block.

In the common data re-write processing on the cache memory system from the CS side, D/AC7, D/AC8 and D/AC9 occur at the steps S2, S3 and S4. IWB is generated at the leading edge of S3, S4 and S5 at the write port on the CS side in accordance with the timing explained so far, and D/AC7, D/AC8 and D/AC9 are written into the cell sets of the corresponding cache memory. Incidentally, IWA (P0) of the write port on the CPU and IWB (C7) of the write port on the CS side are active at the same timing in the drawing, but they do not compete with each other because the memory cell sets as the object are different (AP0 and AC7 have different addresses).

At S3, the read access D/AP2 from the CPU side is again executed. Since CMP on the CPU side renders the coincidence signal EN active, OP2 is immediately read out from the phase at S3 (that may be defined generally in the latter half phase of CLK because the access time exists) in direct response to the address output from CPU. Incidentally, the effective RD address from CPU is displayed below the port output O. At this time, D/AC8 is written to the write port on the CS side, but no conflict occurs because the address values are mutually different.

The write operation from CPU to the external resource occurs at S4 and S6. Because CMP on the CPU side does not generate the coincidence signal, the access is directly made to the external resource by using the local bus and no write operation is made to the cache memory system. In practice, the external access needs time, and the write access to the external resource is executed by utilizing the latter half phases of S4 and S6 and the next clock phases S5 and S7.

The access from the CPU side to the cache memory is continuously executed from S8 to S16. The EN signal of CMP on the CPU side continuously remains active from the center of S8 to the center of S17 and represents that the object address line block exists in the cache memory. Therefore, both read (RD) access and write access (WT) are executed to only the cache memory system.

Among them, S8 to S12 and S14 to S17 are the access from the CPU side to the common system (CS) (the access to the line block cached in the data region on CS). S8, S9 and S15 are the WT access, and others are the RD access. On the other hand, the cache memory system access is continuously executed in S9 to S16 to keep coherence control with information updating (inclusive of updating from other processors) in the common system.

Here, the write access conflict to the same address AC1 in the common system occurs in S10 between the D/AC1 of the write port on the CPU side and D/AC1 of the write port on the CS side. To discriminate them, the latter is hereby expressed as "D/AC1-e". C1 (on the IWA side) and C1-e (on the IWB side) as the write enable signals generated at the same timing at both ports become on WE signal to be practically given to the memory cell (or the cell set) in the form after logic OR is calculated. Therefore, the data to be latched on the memory cell (cell set) side is determined depending on what is the data given to the input I. As already described, a higher priority is assigned for the A port on the CPU side in this embodiment. (A design can be so made as to assign a higher priority for the B port, as already described). Therefore, on the side that generates IWA, that is, at the timing corresponding to S10, after the port to the input on the IA is switched to IA side by using EN from CMP corresponding to C1 (speaking correctly, WEN because the access is the write access) and D/AC1 from CPU is preferentially given to the I input of the memory cell (or the cell set) data latching is made by WE signal.

Eventually, the value corresponding to D/AC1 from CPP (data OC1) is outputted to O of the memory cell (or the cell set) corresponding to the address AC1 at the leading edge of S10. (The data IA passes at the rise of IWA C1 and the data IA is latched to the address AC1 at the fall of IWA at the center of S10). Since CPU makes again the access to the same address AC1 in S10, the written data OC1 is selected and is displayed at the RD output.

At this time, D/AC1-e on the CS side is neglected, but will be later re-written to D/AC1 on the CPU side. Therefore, no problem occurs. In other words, the write access from the CPU side to CS in S8 and S9 is used for transferring the information to practical CS through the local bus and for changing the corresponding address of CS to which each processor gains access through the common bus.

In this embodiment, D/AC0 and D/AC1 as the final data of the stage that is subjected to the arbitration processing from the CS side to the common bus in S12 and S13 are fed back through the external dedicated buses 11 and 12 for the coherence control, and are written into the addresses corresponding to AC0 and AC1 of the cache memory system, respectively, under the state of S13 and S14. In this instance, D/AC1 is over-written. This means that even when D/AC1 is changed in advance, its value is once written at a later timing for the purpose of the coherence control, and matching can be maintained. In consideration of the possibility that the CPU side immediately reads its value as shown in this embodiment (write from CPU at S9 and read from CPU at S10), it is believed effective to change the value in advance.

In S11 and S12, the timing control according to this embodiment represents that the CPU side can immediately read (RD=Oc4) at S12 the data D/ACA written from the CS side at S11. The accesses at S15 and S16 have a similar relation. In the data transfer from CPU to CPU or from the CS side to the CPU side, low latency can be achieved by the synchronization control of the access timing with CLK and the memory cell transmission control. (Low latency can be achieved by 1 clock latency, and both CPU side and CS side do not create mutual waiting). This can be understood from the accesses on the CPU side at S9 and S10 (WT by CPU at S9 and RD by CPU at S10), the accesses on the CS side at S11, S12, S15 and S16 (WT at S11 and S15) and the accesses on the CPU side (RD at S12 and S16).

Finally, the access D/AC7 from the CS side at S16 is the cache hit mistake. Since the EN signal from CMP on the CS side is non-active (Lo), the write signal to the IWB input is not generated (remains Lo), and the write operation to the cache memory system is not executed. Incidentally, in this embodiment, the data information of D/AC7 is transferred to the IB input, it is eventually neglected by design because IWB is non-active.

Figure 25:
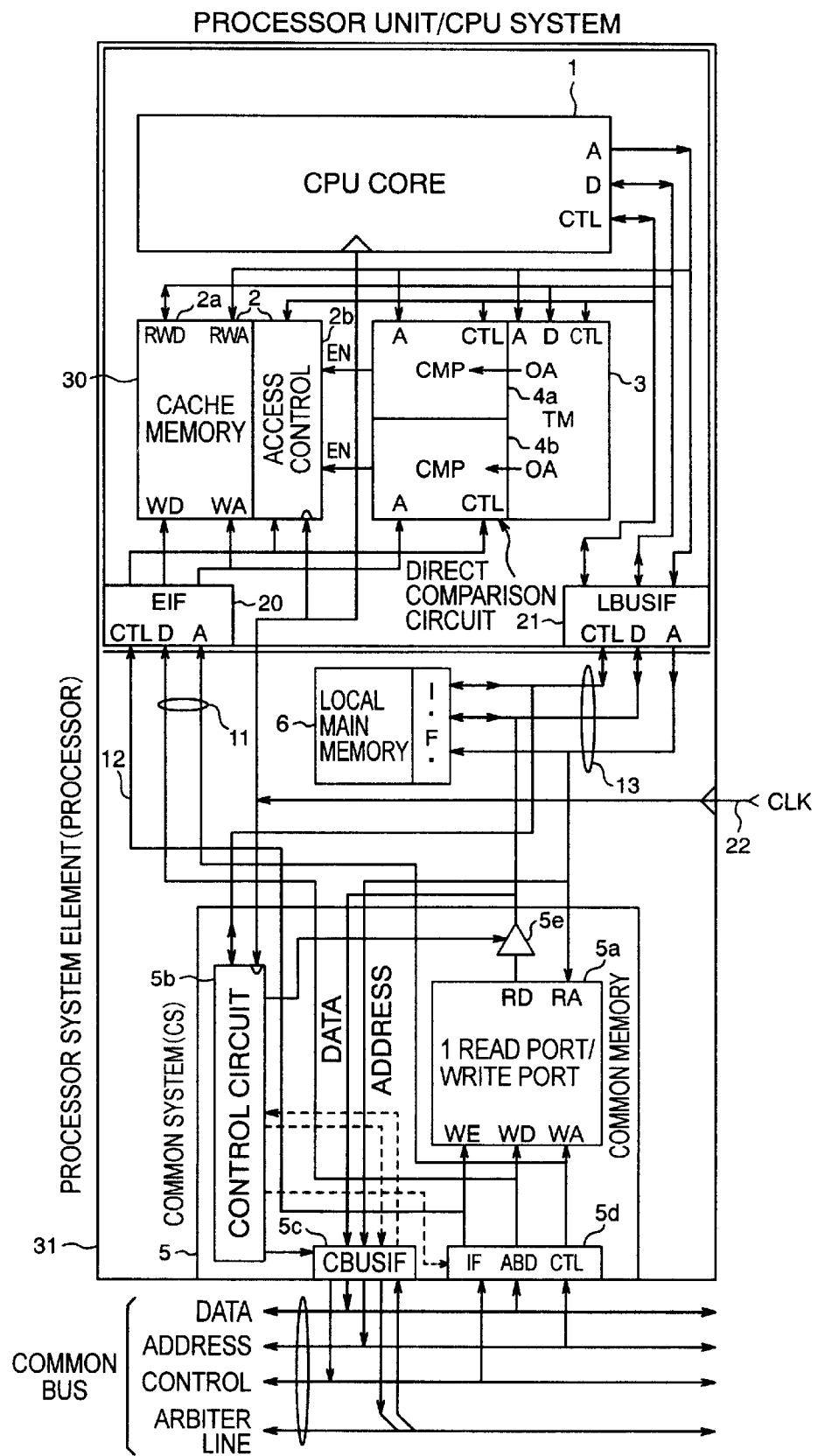
FIG. 25 is a view for explaining a construction of an embodiment of the present invention and its effects.

FIG. 25 shows the overall construction of the present invention. The construction and the effects brought forth by the former will be summarized in the following paragraphs (1) to (3).

(1) A construction (a) uses a 2-port common memory having at least 1RD, 1WT independent ports inside a common system (CS) disposed for each processor system element 31, and separates a write bus and a read bus to and from a common system (accurately, a common memory in this case). In this way, busses 11 and 12 of the common write information (the information for coherence control) from the common system (CS) side, EIF 20 (connected to a dedicated write port B of the cache memory system) for receiving the common write information, a bus (corresponding to the local bus) 13 for executing a cache replace operation (an operation for transferring necessary information to the cache memory) and the operation of LBUSIF21 (finally connected to the write port A of the cache memory system) for receiving the information are completely rendered parallel, and performance in real time system having a high possibility of frequent occurrence of the cache replace operation from CS is drastically improved.

More concretely, the CPU core 1 can read out the object line block data to be replaced to the cache memory from the read port side of the common memory inside CS at the time of cache replace. When other processor system elements (PE) re-write the information of the common memory 5a, the common write operation is altogether executed for the common memory of all PE from the write port side of the common memory 5a through the common bus 18, so that the read operation and the write operation of the common information can be completely rendered parallel.

This system can completely eliminate conflict with the cache replace operation of other PE, and the influences of conflict do not spread. The common write information to the common memory 5a can be transferred to EIF20 through the buses 11 and 12 completely in parallel with the access operation to these common systems. (The common write information needs only be transferred in match with the timing at which the write information on the common bus is written into the common memory; this timing may be the same). Consequently, the information involved with the write operation to the common system of other PE can be transferred always to the CPU system 30. (In this embodiment, the common bus is used only for the CS write access, through-put is drastically improved, and since the access can be always handled by regarding it as the write access, a monitor processing for classifying the accesses is not necessary).

Incidentally, the common write information sent from CS to the CPU system and the information involved with the access operation from the CPU system to CS are transferred and handled in parallel with each other inside the CPU system, too, because the cache memory system has independent ports (A port and B port). The overall construction of the processor described in (a) can restrict the local drop of real time performance to an extremely small level in comparison with the prior art processors.

(2) The construction (a) includes means 4a and 4b for comparing directly and always the physical address information from complicated CBA in one tag memory (TM) with the access address information to the cache memory. Therefore, whether or not the access to the cache memory system is possible (whether the access is cache hit or so-called hit mistake) can be judged at low latency, and the present invention can disclose means capable of completing the substantial access to the cache memory at least at the leading part of the next block.

(3) The construction (a) uses the transmission type and gate latch type cache memory cells in combination with the latch circuit of the pre-stage, eliminates the hazard resulting from mismatching of the timing by synchronizing the write access control signals (WE) from the CPU side and the CS side to the cache memory cells or the cell sets, provides means for switching with priority the input data signals (I) from the CPU side and the CS side to the cache memory cells or the cell sets (priority is assigned for either the CS side or the CPU side in response to WE to any side), and accomplishes the access control 2b capable of logically avoiding data breakdown due particularly to the conflict of the write operations between the ports.

The read access from the CPU side, too, is synchronized with the definition timing of the write data on the memory cell synchronized with the write access timing to the cache memory or with CLK22, so that the passing write data can be directly read out in that state. Low latency and elimination of the conflict are thus accomplished by the access control 2b. Consequently, the CPU side or the CS side need not to wait at the time of the access to the cache memory system and access latency can be shortened, too. Therefore, real time performance can be kept high.

The construction (1) described above, in particular, contains the important effect for constituting the real time parallel processor that can be acquired for the first time by the fusion of the construction of the common system (CS) 5 having the built-in 2-port common memory 5a and the multi-port cache memory system 2 inside the CPU system 30. This is the main system effect to which the present invention is directed. Therefore, the common system (CS) 5 suitable for the present cache memory system will be examined with reference to FIGS. 25 and 26.

The common system (CS) includes the common memory 5a having at least 2 ports of 1RD and 1WT, the common bus input IF circuit 5d for inputting the common write information from the common bus 18 and giving the common data/address/control signals to the write port of the common memory 5a in response to the control signals from the control line on the common bus and if necessary, the control signal from the control circuit 5b of the common system, the common bus IF (CBUSIF) 5 for acquiring the write information from the local bus 13 when the write access (the access for reading or changing the common information) occurs from the CPU unit 30 side to the common system and outputting the write information (address/data/control) from the CPU unit 30 to the acquired common bus in response to the basic write timing signal to the common bus 18, that is generated by the control circuit (inside the control circuit 5b to be described later, for example) in response to the write information, the acquisition request signal of the common bus and the arbitration signal on the common bus (the control signal on the arbiter lines for selecting any one of processor system elements (PE) and giving the use right when these elements (PE) make the write access to the common system), the control circuit 5b for acquiring the access control signal (CTL) from the CPU unit 30 and, if necessary, the arbitration signal from 5c, executing the access control/switch control inside the common system, the write information output switch control (generation of the common bus write cycle), the switch control for the CPU local bus 13, the common information output timing control to EIF and if necessary, generation of the acquisition request signal of the common bus (to be sent to the arbiter circuit), and the read buffer 5e for acquiring the address information from the local bus 13 (to RA) on the read port side of the common memory 5a and outputting the data (from RD) responding to the address information to the data line of the local bus 13 in accordance with the instruction of the control circuit 5b (under the condition that the read access is made to the common memory 5a inside the common system).

A write buffer (write queue memory or register) may be disposed inside CBUIF5c. The common information output to EIF may be generated by reading again the data, that is once written into the common memory 5a, at another suitable timing. In this case, a construction that sends the data in a bulk unit such as the data for the cache line block to EIF may be employed, too. However, it is necessary to provide means for storing temporarily the corresponding address information for EIF and controlling it at the suitable timing described above and another independent read port for reading the common information exclusively for EIF, to the common memory 5a. Expansion of the read port can be easily achieved by juxtaposing the selection circuits 206, for example, in accordance with the multi-port disposition means of the memory set inside the cache memory system.

Figure 27:
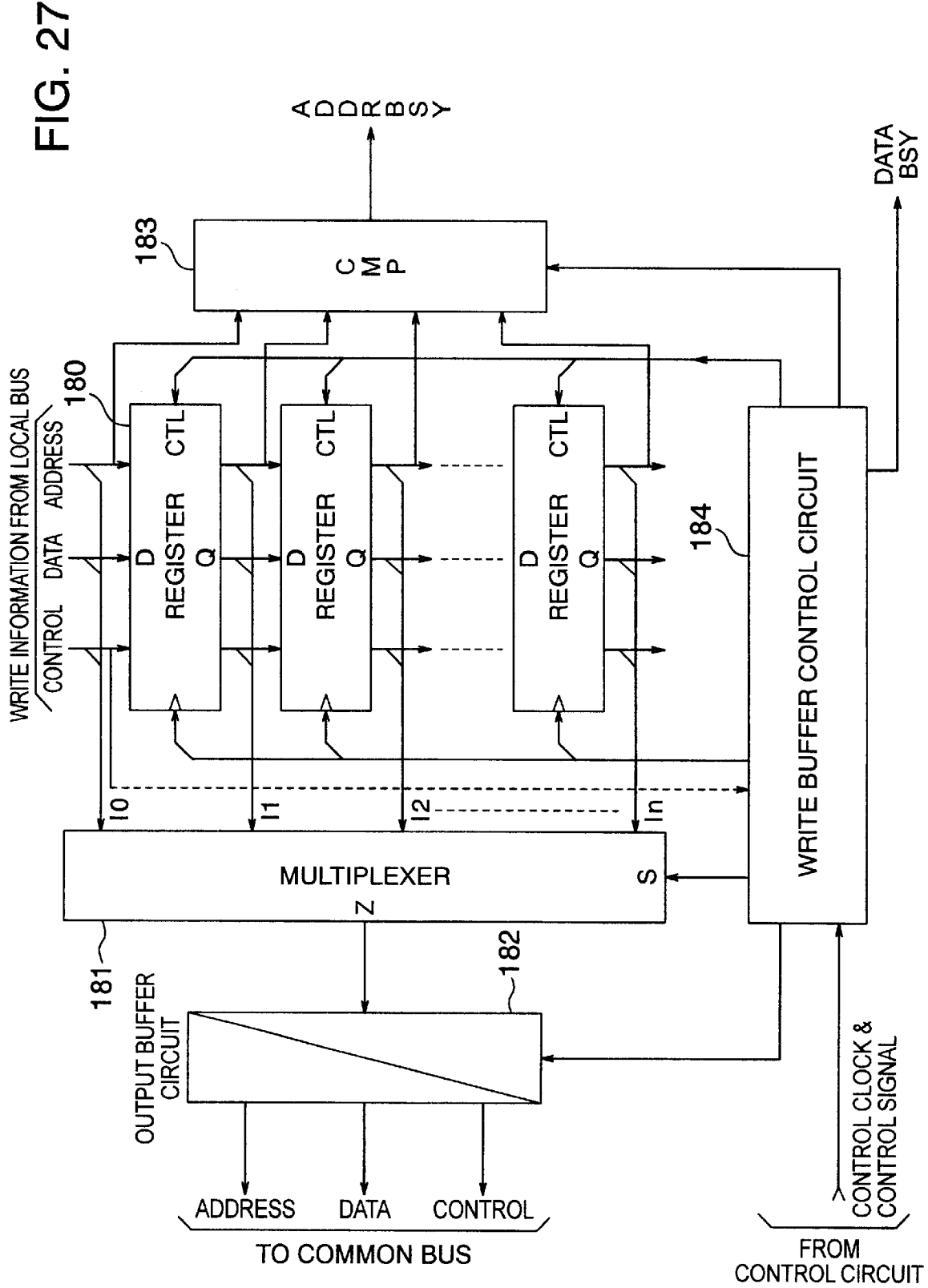
FIG. 27 shows an example of a write buffer inside CBUSI.

FIG. 27 shows a structural example of the write buffer inside CBUSIF. The write buffer includes a queue system comprising a plurality of stages of registers 180, a multiplexer 181 for multiplexing the information of the registers and the information from the local bus in response to a select signal S and selecting and outputting (Z) one of them, an output bus circuit 182 for outputting the output from the multiplexer 181 to the common bus, a comparison circuit (CMP) 184 for acquiring the address information from each register and the effective/invalid information or the control information, comparing it with the address to be now accessed and rendering an address busy signal (ADDRBSY) active when the address information, that is outputted in the past as the common write information and still remains unprocessed and under the waiting state and when the address busy signal address information exists in the write buffer, and a write buffer control circuit 184 for controlling each of these circuit means (180 to 183).

In this embodiment, each register is regarded as a shift register and is serially connected as shown in FIG. 27. The write buffer control circuit 184 controls each circuit so that the multiplexer 182 can select the oldest common information. An invalid flag is put to the used register. Alternatively, the write buffer control circuit 184 counts up and down a counter disposed therein to manage the use depth of the register and to generate a control signal S for selecting the output of the register holding the oldest address information. The data busy signal (DATABSY) is generated under the state where all the registers are used, and a notice is given to the CPU unit. When DATABSY is generated, the CPU unit executes a waiting state processing for keeping the local bus cycle under the waiting state.

On the other hand, when CPU reads out the same address as the common information outputted already, ADDRBSY can be conveniently utilized as the information representing that the common information does not yet exist inside the common memory 5a of CS. Generally, CPU executes the waiting state processing when ADDRBSY is active in the same way as DATABSY.

In this system, an up-count trigger pulse (lock) is generated for an up/down counter inside the write buffer control circuit 184 or for circuit means having an equivalent function, in response to the common system write control signal from the local bus, and a down-count trigger (clock) is generated in response to the timing of transferring the common write information to the output buffer circuit 182 or the common bus 18. (The control signal on the basis of the arbitration information from the control circuit 5b may be utilized, or the information of the arbiter line may be utilized directly). A selector S of the multiplexer 181 may be generated from the output of the counter. The output buffer circuit 182 may have a function of holding the common write information such as a built-in latch circuit in match with the output timing (output period) to the common bus 18.

However, to avoid the conflict between the up-counter and the down-counter, their trigger timing is adjusted in synchronism with the control clock lest they overlap with each other. (For example, the trigger timing is aligned with the rise and the fall of the control clock, respectively).

Another system would be the one that juxtaposes registers 180 and inputs commonly the information from the local bus. In this case, separate counters (inside the write buffer control 184) receive the input trigger (clock) on the local bus side and the output trigger (clock) on the output buffer circuit side, and the processing is executed in the following way by regarding that a) the write buffer is empty when the value of the input counter is the same as the value of the output counter, b) the oldest common information exists at the output counter value of the write buffer when the value of the input counter is different from that of the output counter, and c) the write buffer is fully buried when one previous value of the value of the output counter is the same as the input counter value. When the effective/invalid bits are prepared for each register, the conditions a), b) and c) may be judged as all invalid (=a)) when all the bits are invalid, as all effective (=c)) and any one is effective (=b)).

Incidentally, the control signal of the arbiter line may be generated in such a fashion that a priority is concentratedly assigned for the common bus request signals (that are immediately generated when the write access information to CS is sent from the local bus and the control circuit 5b senses the write access information) from the common system of each PE to select one of them, and the permission signal is returned to corresponding PE. Alternatively, the same arbiter is prepared inside CBUSIF of each CS and a similar arbitration processing is executed in each PE unit in parallel.

The best CPU system (processor portion) 30 when used in combination with the common system (CS) 5 of the present invention will be further examined below.

Figure 26:
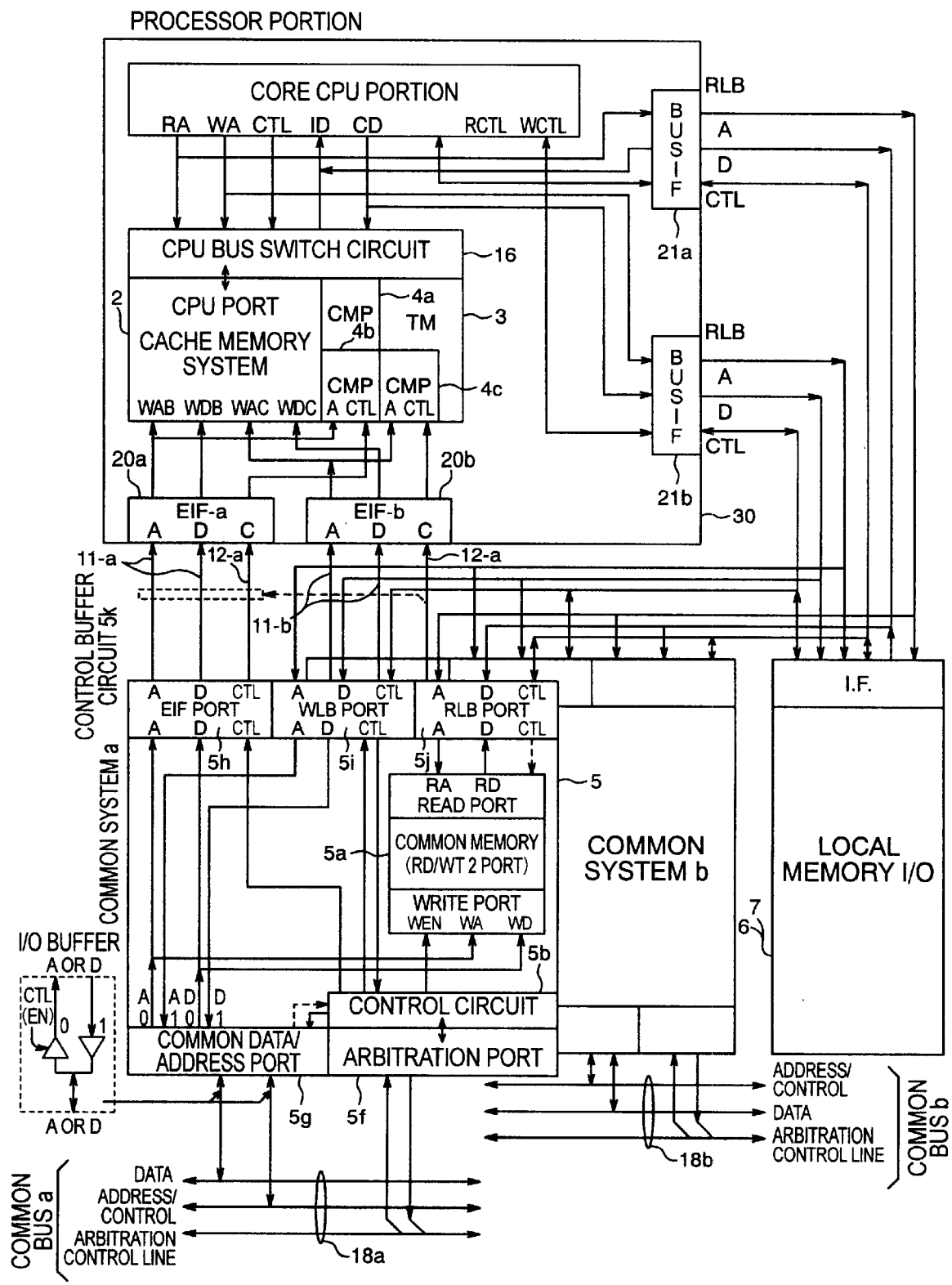
FIG. 26 shows a connection example of a common system utilizing a local bus system in which a write bus and a read bus are separated.

FIG. 26 shows an embodiment of a processor system having a plurality of common buses (18a, 18b) and a plurality of CS5 (common systems a and b) corresponding to the former, respectively.

The construction shown in FIG. 25 includes a plurality of sets of common buses 18 (the common buses a and b in this embodiment), that will render a problem from the aspect of through-put, and prevents the drop of performance resulting from the access conflict on the common bus between PE, particularly the drop of real time performance. When the same number of common buses and common systems corresponding to the common buses as the number of the CPU systems 30 (the number of parallel processors) are prepared, it would be substantially possible from the statistic concept of through-put to prevent the drop of performance resulting from the access conflict. (For, the relation [write access through-put of local bus of CPU]×n sets≦[through-put of common bus]×n set may possibly hold).

In the common system (CS) according to the present invention, the common bus 18 connecting CS is the dedicated bus for the write access. In comparison with the read/write common bus of the prior art example ((1b) in FIG. 1), therefore, through-put of at least 3 to 4 times per set of common busses can be obtained relatively (with the proviso that the local bus is the read/write bus). (An ordinary access ratio is such that the write cycle is about 1 per 3 to 4 read cycles from CPU). Therefore, when cost performance is taken into consideration, it would be appropriate to install about 3 to 4 common busses and common systems per parallel processor.

If through-put performance of the common bus 18 is equal to that of the dedicated buses 11 and 12 for connecting the common system 5 to EIF 20, the CPU unit 30 side requires a plurality of EIF (20a, 20b) so as to correspond to the number of common bus sets (two sets of 18a and 18b in this embodiment).

In this embodiment, two EIF-a and b are provided to the CPU unit 30. Dedicated write or write-only port WAC (write address), WDC (write data) and WEC (write control) of the cache memory system 2 are additionally prepared so as to correspond to these EIF-a and b. Further, a comparison circuit 4c is added to generate the enable output corresponding WEC.

Consequently, the cache memory system 2 changes to a multi-port memory system having at least one RD/WT port (which may comprise one RD port plus one write port) and two write ports. The increased write-only port c can be added by applying the write selector 204 shown in FIG. 2. For example, the gate 204c is changed to a 3-input NAND, the output of a 3-input NAND is further connected to the added input, the first input of 204h is used as IC (as the added data input), the second input is inputted from 204f and the third input, from 204g.

An inverter 204i is added to input the access control signal IWC (the added write enable signal input) generated in response to the output result of the comparison circuit (CMP) 4c. Further, 204d is changed to a 3-input NAND and the output of 204i is connected to the added input of 204d. In this way, a write selector can be constituted with the priority sequence of A port→B port→C port. When IWA to IWC is replaced, the priority sequence can be variously set. Therefore, the priority sequence does not essentially limit the present invention.

As described above, when the same number of write-only ports as the number of EIF is prepared for the cache memory system 2 and the comparison circuits (CMP) are added in response to the former, a plurality of EIF ports and a plurality of common busses corresponding to these EIF ports can be arranged in parallel in a scale construction. EIF-b (206) so added may be connected in the same way as the conventional EIF-a so that the address information (A) and if necessary, the control information (CTL), can be supplied to CMP 4c and the data information (D) and if necessary, the address information (A), can be supplied to the write port C. When EIF is added, too, a similar connection may be made from this EIF to the added write-only port and CMP, and a scalable construction can be achieved. In other words, the present invention can be established in a system having three or more common busses when corresponding EIF and write-only ports to the cache memory systems are added.

When the write-only busses 11 and 12 of the common information have greater through-put than the common bus 18, a plurality of common bus information may be passed through the write-only buses 11 and 12 in accordance with the through-put ratio. It is effective in this case to once receive the EIF information bus by a separate control buffer circuit 5k, to output selected one of EIF information in match with through-put of the write-only busses 11 and 12 and to give it to one EIF.

The control buffer circuit 5k exhibiting the interface function may be provided therein with a temporary storage system such as a buffer memory, FIFO, a queue system, etc, to eliminate the access interference between the input side (CS side) and the output side (EIF side of CPU) and to adjust timing. For example, the control buffer circuit 5k may be provided with a function of excluding the timing conflict resulting from the asynchronous access of the input and the output.

When the input/output timing of EIF between the common system side and the CPU side is synchronized with one clock (this is more ideal and the embodiments of this invention assume synchronization unless otherwise described in particular), a control buffer circuit may be constituted in such a construction in which PLL, or the like, generates a clock having a frequency n times the input frequency on the output side, the information of n common system/common bus are gathered, n information is outputted one by one in each cycle of the clock, and this processing is repeated in n unit.

Particularly when two common system exist, a simple method can be employed that changes over two input information from two CS in such a fashion as to correspond to the state of the former half and the latter half of the clock cycle on the input side, respectively, and outputs the information by cycle stealing to the output side.

The common system (CS) 5 shown in FIG. 25 involves the problem of the bus conflict between the write bus and the read bus from the local bus. When the CPU core 1 can execute in parallel the write access and the read access and the processing for this access execution is paralleled, the problem that its parallel operation performance cannot be exploited will manifest itself at the time of the external access.

In a CPU system 30 in which the read bus (RA, ID) and the write bus (WA, OD) are separated and the read port and the write port are also separated in the port A of the internal cache memory system 2 on the CPU side as shown in FIGS. 1 and 26, the problems are diversified. In this system, there is the case where commands involving a plurality of memory accesses are eventually processed in parallel. For example, the execution unit inside the CPU core immediately processes the command involving the write access and delivers the write information as the result data to the write access unit (inside the CPU core in this embodiment), and the execution unit immediately processes the command involving the next read access. In this case, eventually, the actual write access operation occurs from the write access unit in the next state and competes with the direct read access operation from the execution unit in the next command. Particularly when the clock frequency of the CPU portion is shorter than the minimum access cycle to the memory (when the clock inside the CPU core is set to about twice the external clock, for example), this problem is believed to occur frequently.

The same concept also holds true of the local bus 13 as the access bus to the external resource. Since the access cycle (synchronization) to the external resource is obviously greater (about 4 to 8 times) than the operation cycle (synchronization) of the CPU core, the problem is more critical than inside the CPU system.

It is therefore believed effective to dispose a read bus IF (RLB) 21a and a write bus IE(WLB) for outputting while the read bus and the write bus from the CPU core 1 are kept isolated, and to isolate the read bus and the write bus for the external local bus, too.

At the time of read-out of the local bus from the common memory 5a on the common system CS5 side in FIG. 25, too, the buffer 5e for switching the read bus and connecting it to the local bus electrically isolates the write bus on the local bus, and the access cycles (RD cycle, WT cycle) are not paralleled. Therefore, FIG. 26 employs the construction in which the write path reaching CBUIF 5c is separated to use its separation point as the WL port 5i and the separation point from the read port of the common memory 5a as the RLB port 5j, and to directly connect them to WLB 21b and RLB 21a of the CPU system 30.

Consequently, the read cycle and the write cycle on the local bus are completely paralleled and real time performance can be further improved. Incidentally, one each EIF port 5h connected to EIF is disposed for CS in the same way as described above.

FIG. 26 shows bi-directionally the data and address/control lines from the common bus as a more concrete example. This example is based on the judgment that when CS 5 itself is constituted into LSI, separate connection of the write bus (for common data output) and the read bus (for coherence control) to the common bus 18 is disadvantageous as it invites the increase of the number of busses in view of the load (capacitive load of pins) and the total number of functional pins. In practice, however, the input/output buffer at the input/output port 5g to the common bus forms the bi-directional circuit shown in FIG. 26, and the I input providing the bus from WLB and the O output generating the output to EIF exist separately at the input/output buffer portion. Therefore, this circuit can be regarded eventually as a logic circuit equivalent to CS5 shown in FIG. 25.

Incidentally, CS5 in the present invention includes the arbitration control line, but common bus conflict control may be time division control deciding and using a time slot to be used for each PE. (In this case, the arbiter is not necessary in some cases). Basically, the arbitration system and the arbiter architecture do not limit the present invention.

Next, adoption of LSI for each constituent means will be examined as means for achieving a higher operation speed and for further reducing the cost.

Figure 19A:
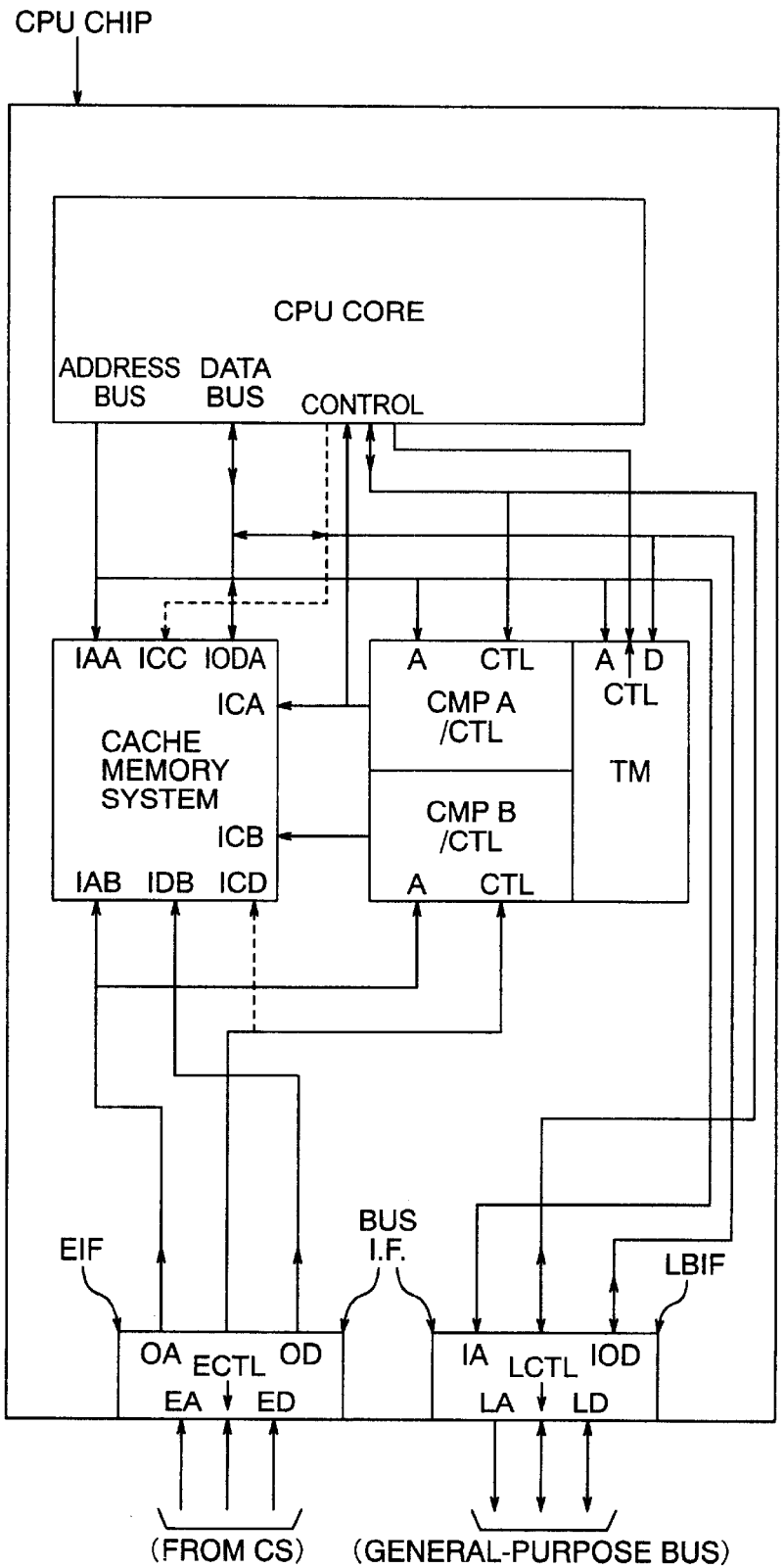
FIGS. 19A and B show structural examples of CPU LSI.
Figure 20A:
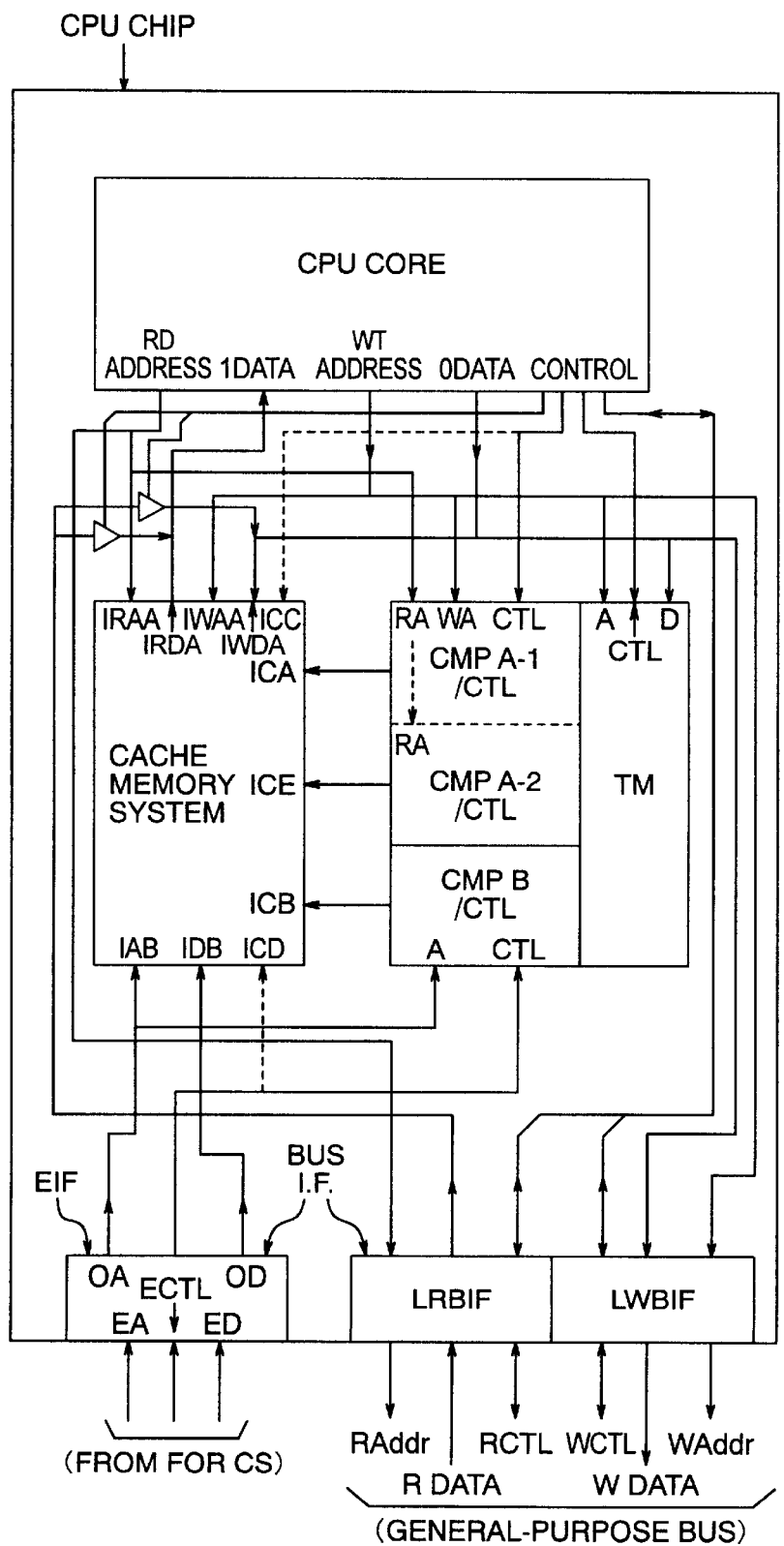
FIGS. 20A and B show another structural examples of CPU LSI.

First, FIGS. 19A and B and FIGS. 20A and B show the basic construction of LSI for the CPU unit 30. FIG. 19A shows the basic structural example shown in FIGS. 1 and 25, and this type is called "type A". This LSI includes at least one set of local bus interface (LBIF) and one set of EIF as the input port for receiving the common write information from the CS side, as independent functional input/output pins. The internal structure is substantially equivalent to the circuit shown in FIG. 25. The construction includes a cache memory system having one write-only write port B for EIF (IAB, IDB, ICB) and one read/write port for a CPU core (IAA, IODA, ICA), a comparison circuit/control circuit (CMPA, CMPB) corresponding to each port A, B and at least one tag memory TM. These circuit members are connected to one another as shown in the drawing.

Figure 19B:
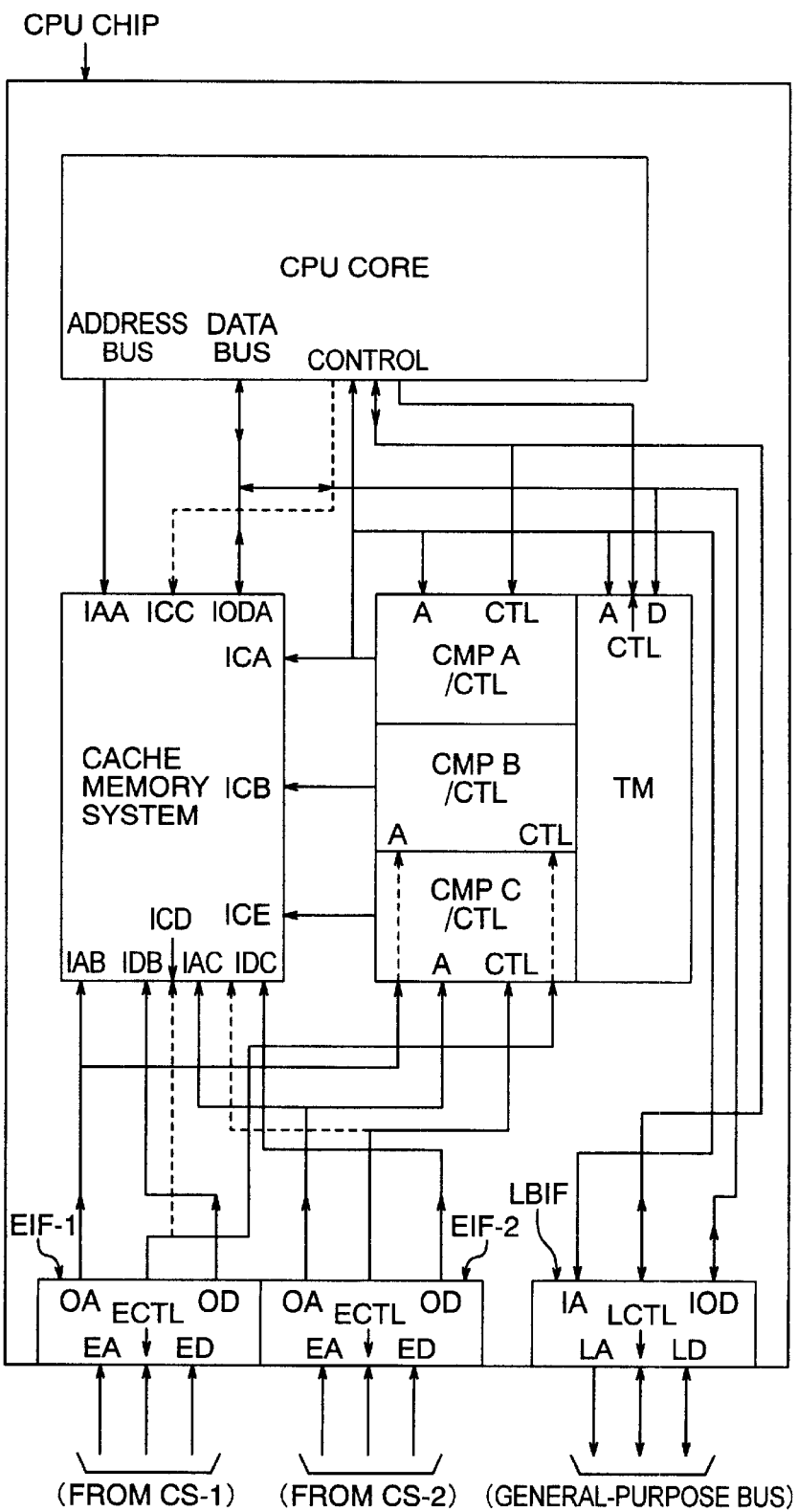

FIG. 19B shows the construction that is based on the type A and further includes two sets of EIF (EIF-1 and EIF-2) as independent functional input/output pins. EIF-2 has the connection explained with reference to FIG. 26. This construction is the one in which the write port C and the comparison circuit C (CMPC) of the cache memory system are (internally) added to the type A.

FIG. 20A shows the construction having independent functional input/output pins by separating the local bus interface portion into the read port (LRBIF) and the write port (LWBIF) on the basis of the type A. The access port A of the cache memory system on the CPU core side, too, is separated into the read bus and the write bus in the same way as in the example shown in FIG. 26. Any CPU bus switch circuit 16 such as the one shown in FIG. 1, for example, is believed necessary. However, it is possible to disperse the buffer switch, etc, to each portion and to control them in response to the access control signal (CTL) from the CPU core.

FIG. 20A shows two sets of buffer switches disposed on the IData bus and the OData bus of the CPU core from LRBIF. Each of these bus switches has the role of switching the read access from outside to the CPU core (for example, parallel transfer of the cache replace data to the CPU core) and the read access from the cache memory, and the role of switching the cache replace data transfer from outside and the write access from the CPU core to the cache memory system. Incidentally, it is possible to use the switch of the multiplexer type indicated by 16a and 16b in FIG. 1.

Figure 20B:
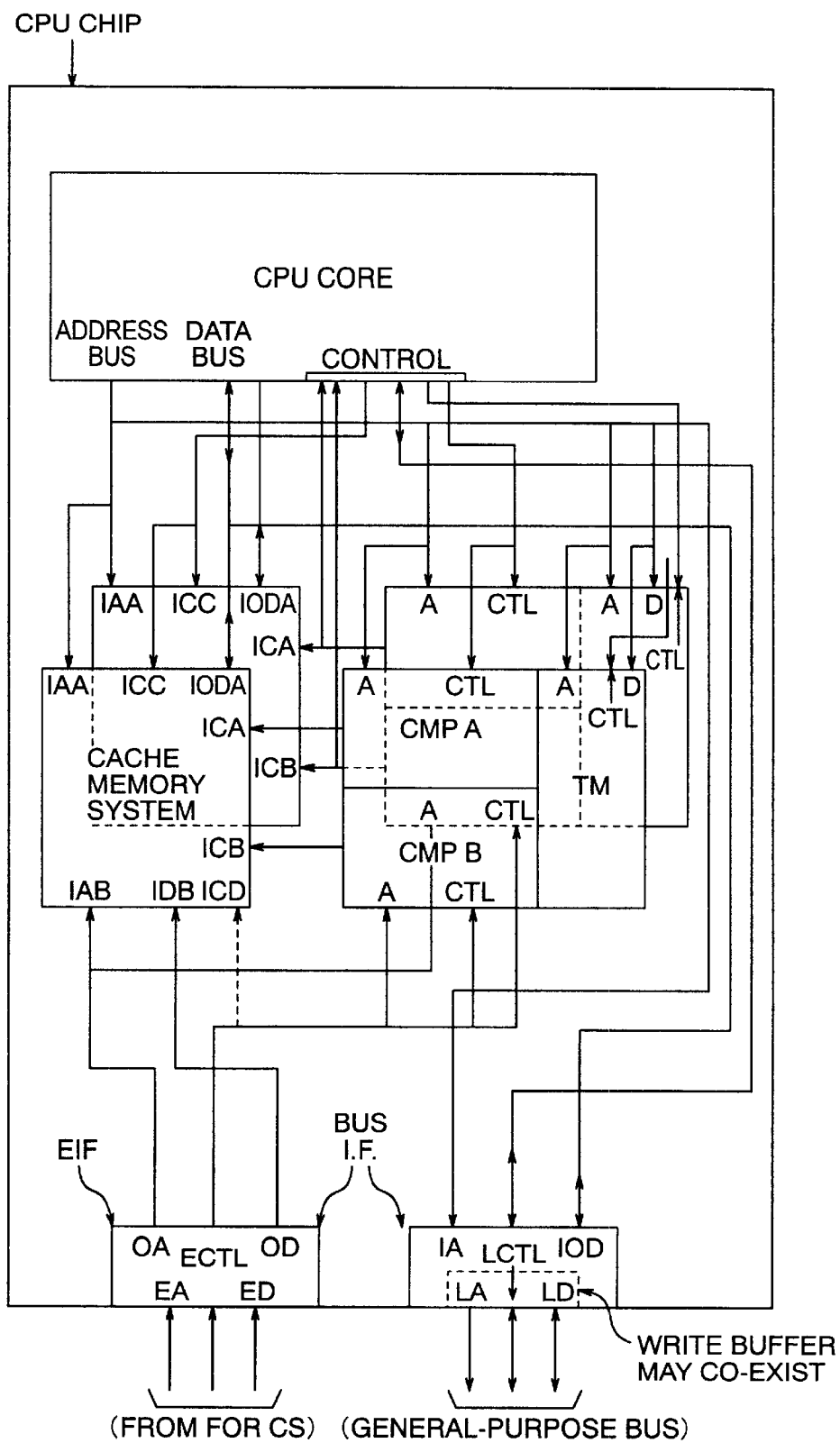

FIG. 20B shows a duplexing example (two-set construction) of the cache memory system, the comparison portion (CMPA, B) and the tag memory portion TM of the type A. The drawing shows a structural example of a two-set associative cache memory system. The input/output function pins are the same as those of the type A. However, it is necessary to execute control by using the control line (CTL) from the CPU core and the decode information of the address line to connect either one of the necessary cache memory systems to the connection switch with the access ports of the two sets of the cache memory systems at the read timing from the cache memory.

The above represents the basic construction of the LSI chip configuration of the CPU system. It is also possible to constitute a CPU LSI chip having input/output function pins for the four independent ports I.F. shown in FIG. 26 by combining variations shown in FIGS. 19A and B and 20A and B.

The LSI configuration of the common system (CS) 5 will also be described briefly. The basic LSI configuration is CS5 in FIG. 1, CS5 in FIG. 25 and CS5 in FIG. 26. Since the common memory 5a has a high integration capacity, it is hereby possible to employ a method that gathers it into another LSI and the portions consisting mainly of other control portions and the port IF portions into a common system LSI having function pins for connecting two ports for the connection between the common memory LSI.

The system construction combining both LSI may be so constituted as to be capable of connecting a plurality of common memory LSI to the common system LSI to further increase the total common memory capacity. For example, when thirty-two large capacity 2-port common memory LSI having input/output of 1-bit unit are juxtaposed and are externally mounted as a common memory having input/output of 32-data unit, thirty-two or more times of capacity can be secured in comparison with the case where they are built in the common system LSI. However, as data transfer latency increases between the common system LSI and the common memory LSI, the access speed is likely to drop. It is therefore preferred to employ the construction in which at least the read port is directly connected to the local bus of the CPU system from the common memory LSI and the switch control signal of the read port to the local bus and the write port are directly connected to the common LSI system.

The common system 5 shown in FIG. 26 is believed most desirable as the construction of versatile input/output functions of the common system LSI expected to provide the highest operation speed. This construction includes the function pin construction in which the read bus and the write bus as the connection bus to the local bus are isolated, and ports for EIF, LWB and LRB and the interface function ports (5g, 5f) to the common bus as the input/output function pins.

When LWB and LRB are connected outside and are used, the construction can cope with the conventional bi-direction local bus of the read/write mixing type. (However, it is necessary to prepare a tri-state output buffer for a bus switch to be connected to the local bus in LRB and to connect LRB to the local bus in response to the read access timing of the local bus upon instruction from the control circuit). A construction that gathers LWB and LRB into one unit inside the LSI chip may also be employed, and this construction corresponds to the common system 5 shown in FIG. 25.

The LSI configuration of the CPU system and the common system may be achieved by the following methods, too.

(a) A construction using LSI as a bare chip may be employed. The bare chip is of the type that includes function signal output pads and can be directly connected to an electronic substrate by wire bonding, or like means.

(b) It is also possible to constitute a hybrid IC by use of the bare chip, LSI of a function unit and discrete components and to constitute the CPU system and the common system into the LSI architecture. The hybrid IC has the function input/output pins or pads in the same way as ordinary LSI and can be connected to the electronic substrate.

(c) LSI having a high integration density such as CPU may be constituted into LSI in each function block unit. The CPU system portion may include a CPU core LSI, a cache memory LSI, a tag memory LSI, an input/output unit LSI (or buffer LSI), and so forth. These LSI may be used as a chip set to constitute the CPU system or a hybrid module LSI. The common system portion may include the afore-mentioned common memory LSI, control LSI and switch buffer LSI of each port.

The means (a) to (c) all contribute to the improvement of the operation speed (or lower latency) due to high integration, and to the reduction of the cost, and conform the object of the present invention.

Finally, variations of the detailed construction will be explained briefly. However, these variations do not in any way limit the present invention.

Figure 16:
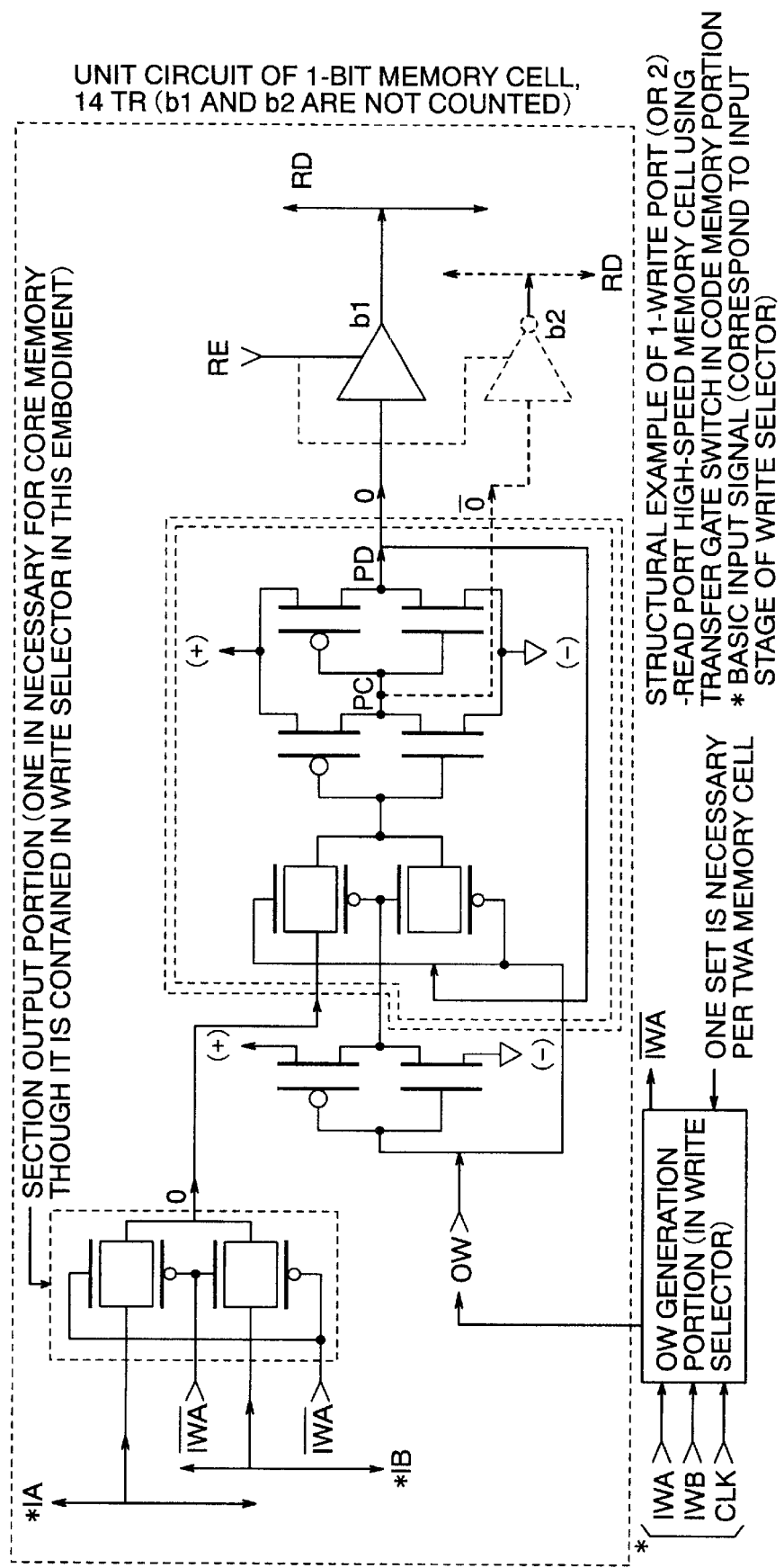
FIG. 16 shows a structural example of transistors of a multi-port memory cell having high utility.
Figure 17B:
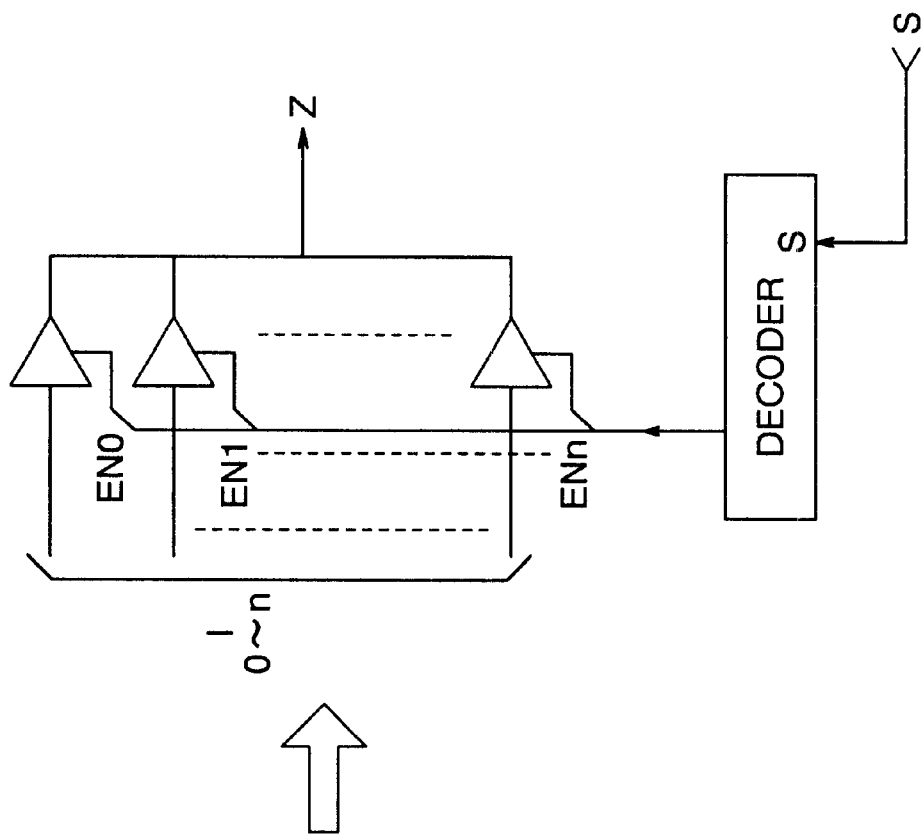
FIGS. 17A and B show structural examples of a multiplexer.
Figure 17A:
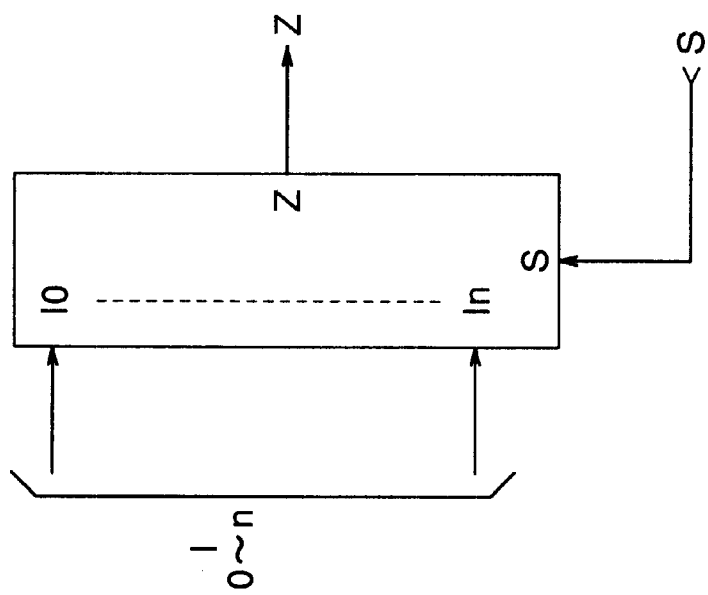

Two systems shown in FIGS. 17A and B are available for the multiplexer for 206 in FIGS. 2 and 3 and 16a and 16b in FIG. 1. The multiplexer system shown in FIG. 17A is a switch comprising the combination of transfer gates and basic gates (NAND and NOR gates) in multiple stages. In contrast, the tri-state buffer system shown in FIG. 17B is directly connected to the bus and connection control is made depending on whether the I input is turned ON (that is, I is outputted as such) or OFF (Z is held at a high impedance).

Figure 11:
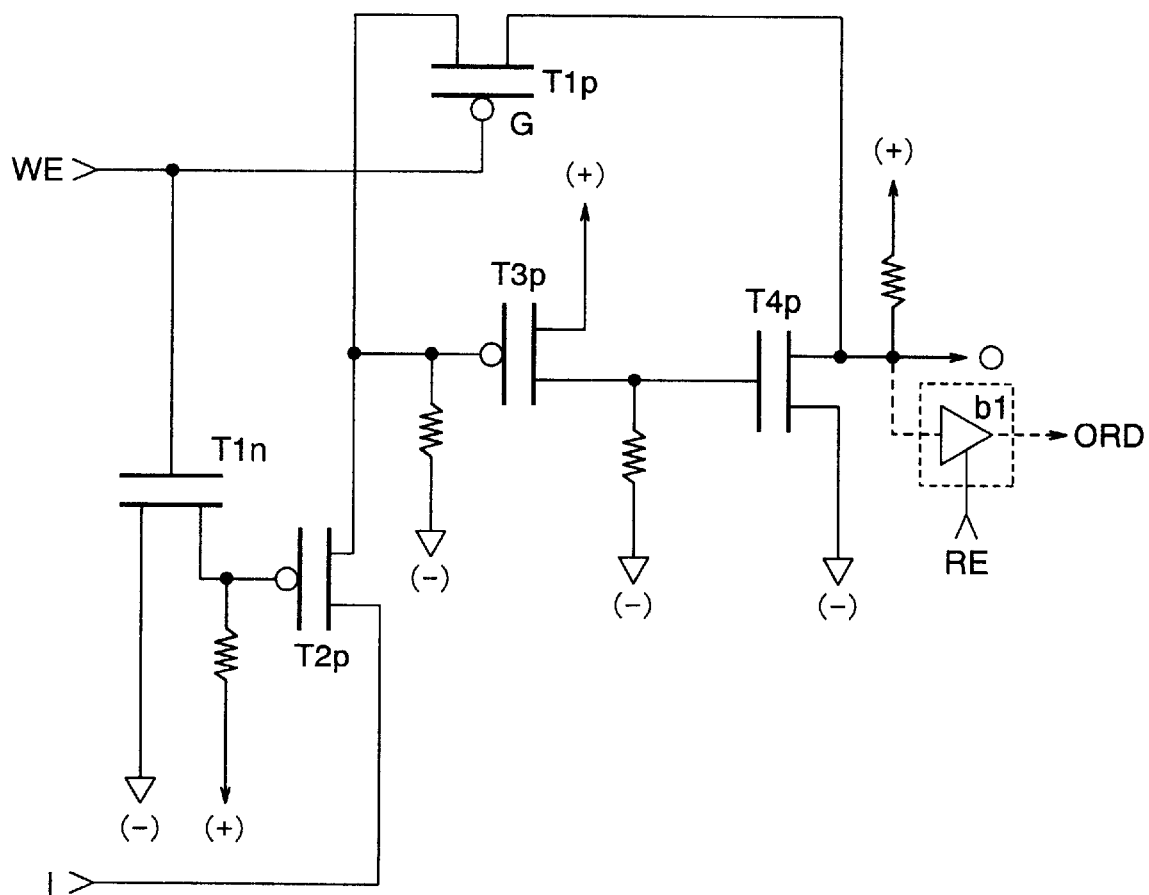
FIG. 11 shows another example of a memory cell.
Figure 12:
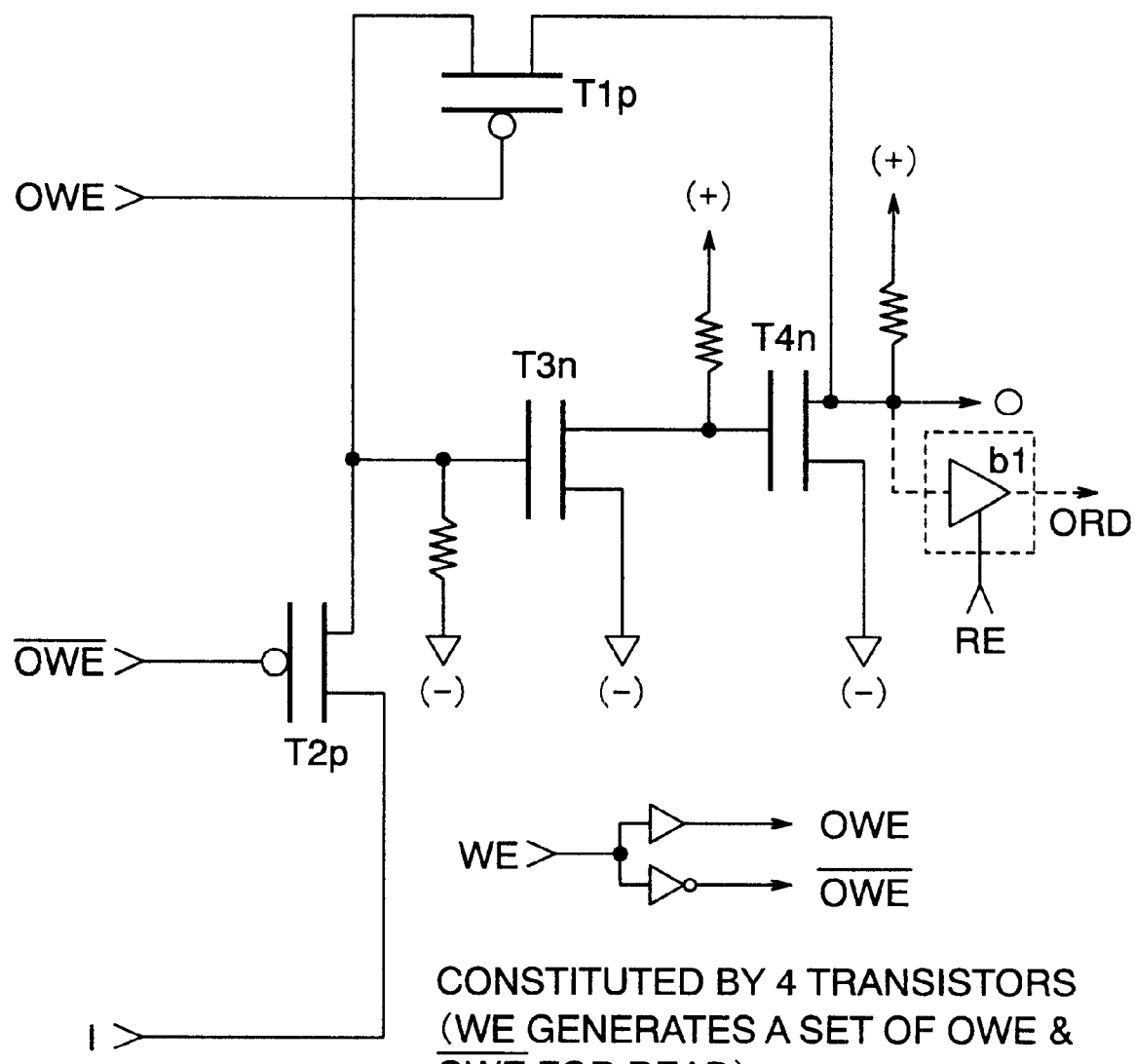
FIG. 12 shows another example of the memory cell.

FIGS. 11 to 14 show another embodiment of the CMOS type memory cell shown in FIG. 2. The memory cell is directed to the high operation speed (delay of 1 to 2 stages of transistors+α by use of the transfer gate switch). To mainly reduce the number of transistors, however, the circuits shown in FIGS. 11 and 12 is more desirable. Incidentally, the circuit shown in FIG. 12 adjusts the timing of the levels of both inversion directions for write enable and reduces the number of transistors much more than in the circuit shown in FIG. 11.

Figure 13:
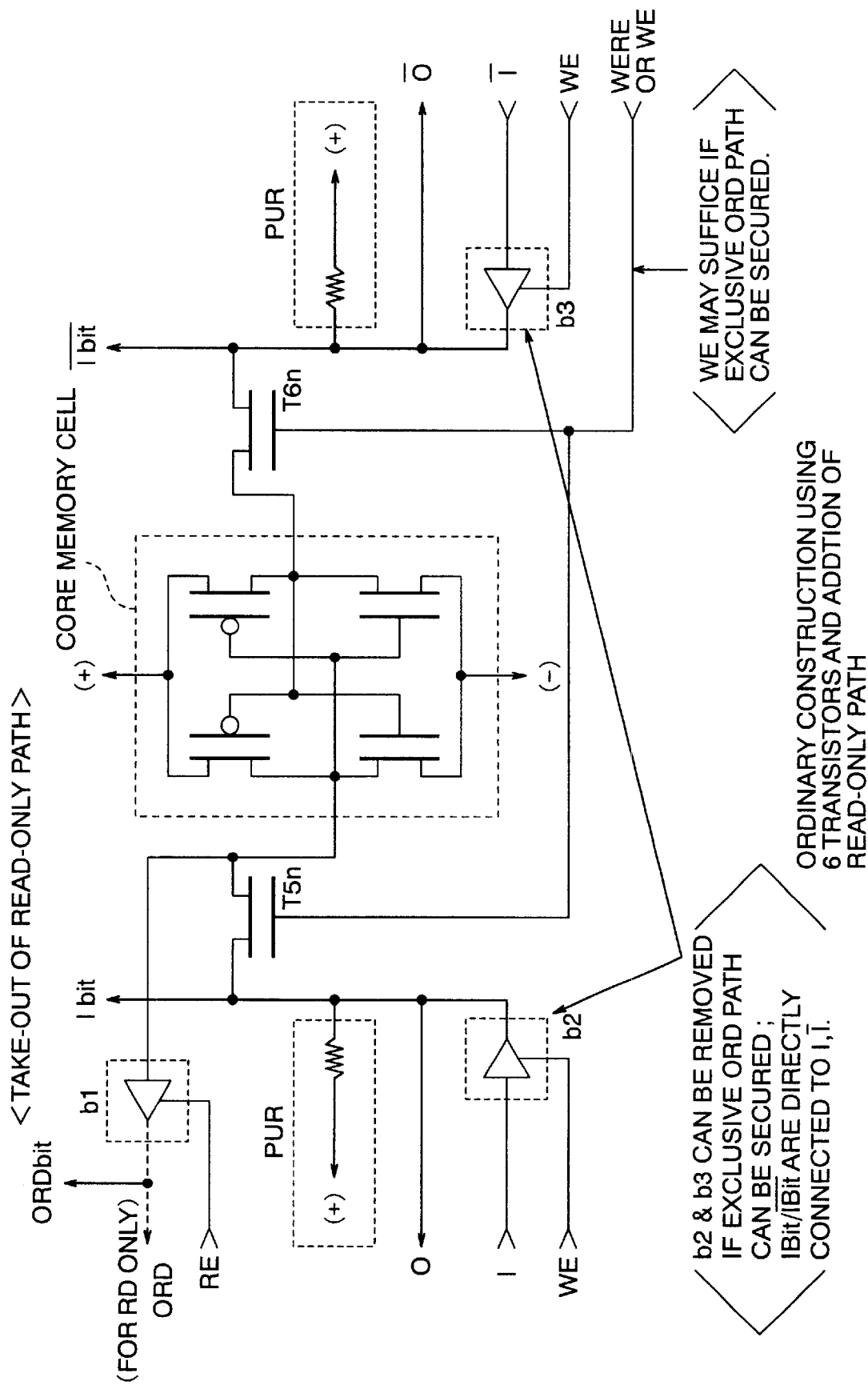
FIG. 13 shows still another example of the memory cell.

FIG. 13 shows a memory cell having a 6-transistor construction that is used ordinarily. An input bus I for write and an output bus O for read are used in common, and a parallel operation cannot be made. A core memory cell at the center comprises two inverters connected by loop connection. Transistors T5$n$ and T6$n$ switch the data from outside to a write potential and read out the data from the cell to outside (WERE is a command signal that is active in both RD and WT). Ibit and /Ibit (inversion logic of Ibit) are generally used as a read/write common bus. However, the read and write parallel operation becomes possible in the same way as the memory cells shown in FIGS. 11, 12 and 2 when a read-only bus is taken out from either one of the inverter outputs through a tri-state buffer b1, and an access speed itself becomes higher. In this case, WE needs be inputted to WERE, and Ibit and /Ibit are used as the write-only bus.

The number of transistors is 6 and may appear greater than in FIGS. 11 and 12. However, because each resistance element in FIGS. 11 and 12 after all comprises the transistor (the number increases by 3) in many cases, the construction of FIG. 13 is optimal.

Figure 14:
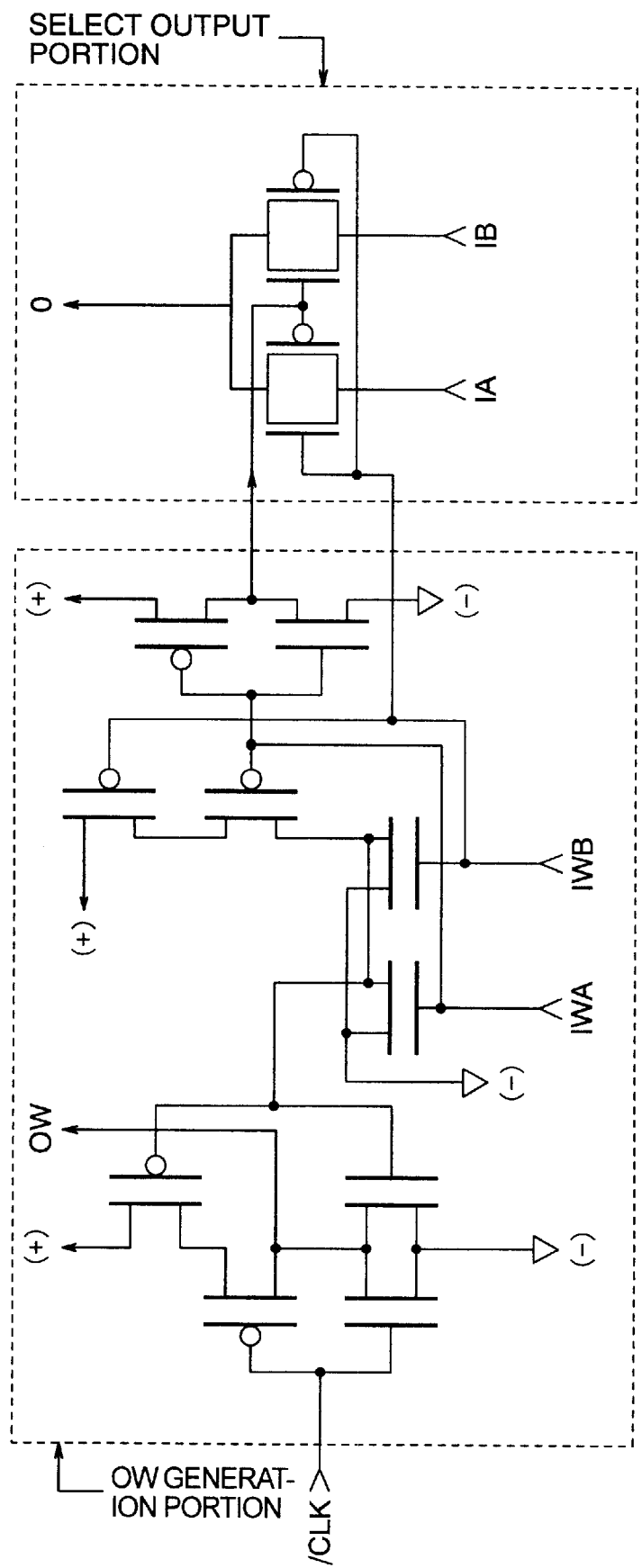
FIG. 14 shows still another example of the memory cell.

FIG. 14 shows a structural example of transistors of a write selector 204. An OW generation portion becomes necessary in a memory cell unit or in a write data unit inside the memory cell set, and an O select/output portion becomes necessary in a bit unit inside each memory cell set. When the memory cell set is constituted in 1 data=32 bits and in one data unit (assuming cell set=1 data), one OW generation portion is necessary for each memory cell set and 32 O select/output portions are necessary for one memory cell set. It is more desirable to compactly constitute the O select/output portion that is necessary in the bit unit by the transfer gate with four transistors as in this embodiment. The OW output portion comprises 10 transistors, and /CLK as the inversion logic of CLK is used as the clock.

Figure 15:
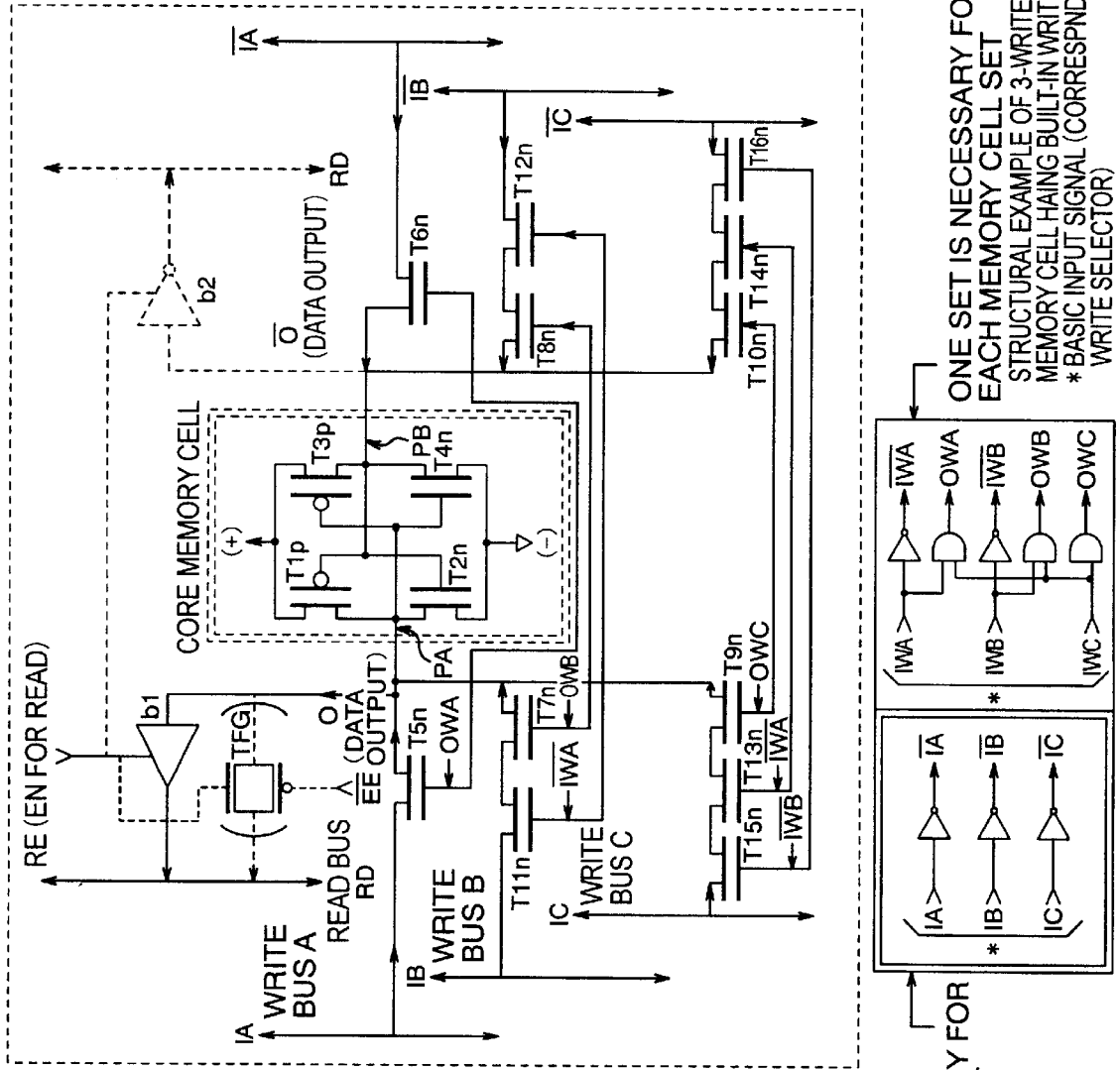
FIG. 15 shows a structural example of transistors of a multi-port memory cell having high utility.

Next, FIG. 15 shows an embodiment of a more practical multi-port memory cell in which circuit portions (mainly switch circuit portions of input data IA, IB and so forth) inside each write selector necessary in a core memory cell unit are constituted as a peripheral circuit of a core memory cell and assembled inside the memory cell on the basis of the memory cell construction of the practical type shown in FIG. 13.

Three data input buses IA, IB and IC (/IA, /IB and /IC are inversion input buses) are prepared for the write port for inputting the data in the write operation. Transistors T5$n$ to T16$n$ (whereby T5$n$ and T6$n$ are for IA, T7$n$, T8$n$, T11$n$ and T12$n$ are for IB, T9$n$, T10$n$ and T13$n$ to T16$n$ are for IC) lead the potential of each input bus to PA, PB contacts of the core memory cell during the write operation, and the information stored in loop inside the core memory cell is compulsively set to the state corresponding to that potential to thereby execute the write processing.

T5$n$ and T6$n$ are main transistors for connecting PA and PB to the write input bus IA by means of the write signal OWA. Similarly, T7$n$ and T8$n$ are main transistors for connecting PA and PB to IB when the write operation on the IA side is non-active. T9$n$ and T10$n$ are main transistors for connecting PA and PB to IC when the write operation on both IA and IB sides is non-active.

As shown in the drawing, T11$n$ to T16$n$ so operate as to suitably cut off the signals from IB and IC by using the inversion signals of IWA and IWB as the write enable signals when these signals have the Lo logic, that is, when IWA and IWB are active.

Incidentally, OWA, OWB and OWC are write trigger signals which are gated by the clock (CLK) and the active period of which is adjusted in match with a predetermined timing of the clock as already described. These signals are controlled in such a fashion as to be generated during the active period of IWA, IWB and IWC.

As described above, the priority of the write operation is the highest for IA, followed then by IB and IC. When such a simple circuit is added in the same logic, a plurality of write ports having the priority can be prepared as can be understood from the explanation given above. When the external access logic is determined in a satisfactory manner (in such a fashion that the access priority is assigned outside at the time of occurrence of the access to the same memory cell to avoid the simultaneous occurrence of the access, for example) so as to prevent the occurrence of the write conflict to the same memory cell. Alternatively, even when such a conflict occurs and the information inside the core memory cell becomes temporarily unstable, it is possible to eliminate T11$n$ to T16$n$ and to directly connect each bus (IA, IB, IC) to T5$n$ to T10$n$ provided that no problem occurs in the operation on the processor side.

On the other hand, the read port side may use a connection system that takes out the information from the contact PA or PB by the tri-state buffer b1 or b2 and outputs the information to the read bus (RD), or directly connects (ON/OFF) the information of PA or PB to the read bus (RD) by using the switch circuit of the transfer gate (comprising TFG and 2Tr). In any case, a plurality of read ports can be easily acquired when the information from PA and PB is taken out in parallel by adding b1 and TFG in parallel.

Incidentally, the ON/OFF control of the read port is executed by read enable RE (with /RE representing its inversion), and the read address decoder (equivalent to the decoder portion shown in FIG. 17) inside the multiplexer circuit 206 generates RE.

According to this system, the circuit includes 16 Tr at the time of 3 write ports and 10 Tr at the time of 2 write ports. Unless the priority is assigned, the numbers of the transistors are 10 Tr and 8 Tr, respectively (exclusive of the number of transistors necessary for the read port gate in either case, but the number increases by 2 per read port when TFG is used). The portion encompassed by dotted lines represents the memory cell portion. Solid line outside the block represents the circuit portion of the write selector one set of which is necessary per memory set.

FIG. 16 shows an example of a multi-port memory cell constituted by adding an O select output portion, one of which is necessary per core memory cell unit inside the write selector circuit shown in FIG. 14, on the basis of the memory cell (corresponding to the core memory cell) shown in FIG. 2. The O selection portion in this embodiment has the two-port construction. It can be understood, however, that a memory cell having a greater number of write ports can be achieved when the transfer gates are added in parallel. The read port outputs the information from the contact of PC and PD to the read bus (RD) through the buffers b1 and b2 as shown in the drawing, but direct connection by TFG is also possible as shown in FIG. 15. In this embodiment, the O selection portion has the 2-port construction. However, it can be understood that a memory cell having a greater number of write ports can be added when the transfer gates are added in parallel. The read port is so arranged as to output the information from the contact of PC and PD to the read bus (RD) through the buffers b1 and b2 as shown in the drawing, but direct connection using TFG is also possible as shown in FIG. 15. Since the construction shown in FIG. 16 does not involve the potential change processing by TFG that is required in FIG. 15, the operation speed is believed higher than in FIG. 15 when the output to the read side is passed as such at the write operation. However, the number of transistors is 14 in the case of the 2 write ports and becomes greater by 4. Incidentally, solid line outside the block represents the circuit portion that becomes necessary in the memory cell unit inside the write selector in the same way as in FIG. 15.

Figure 18A:
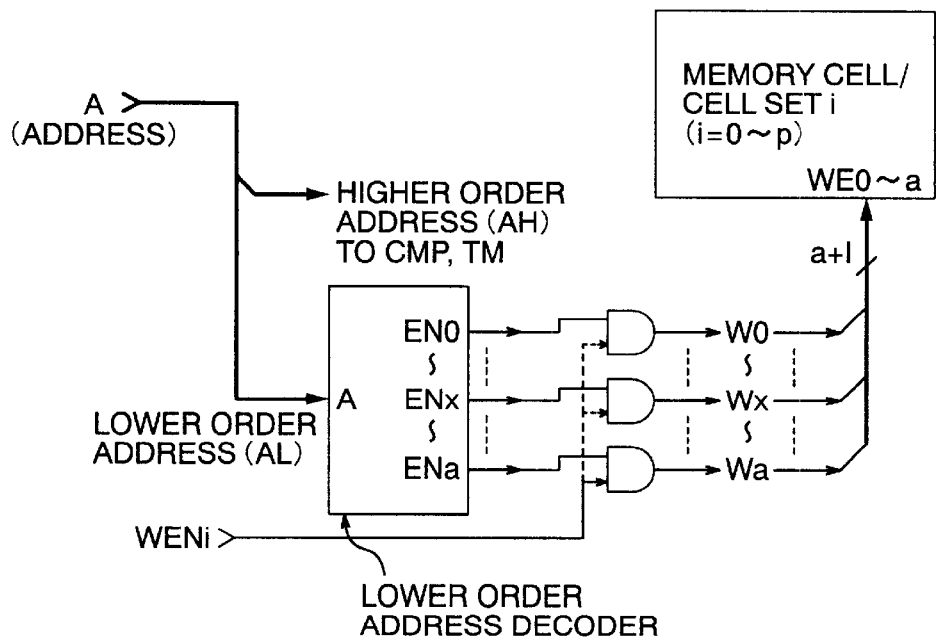
FIGS. 18A and B show basic structural examples of a write address decoder.
Figure 18B:
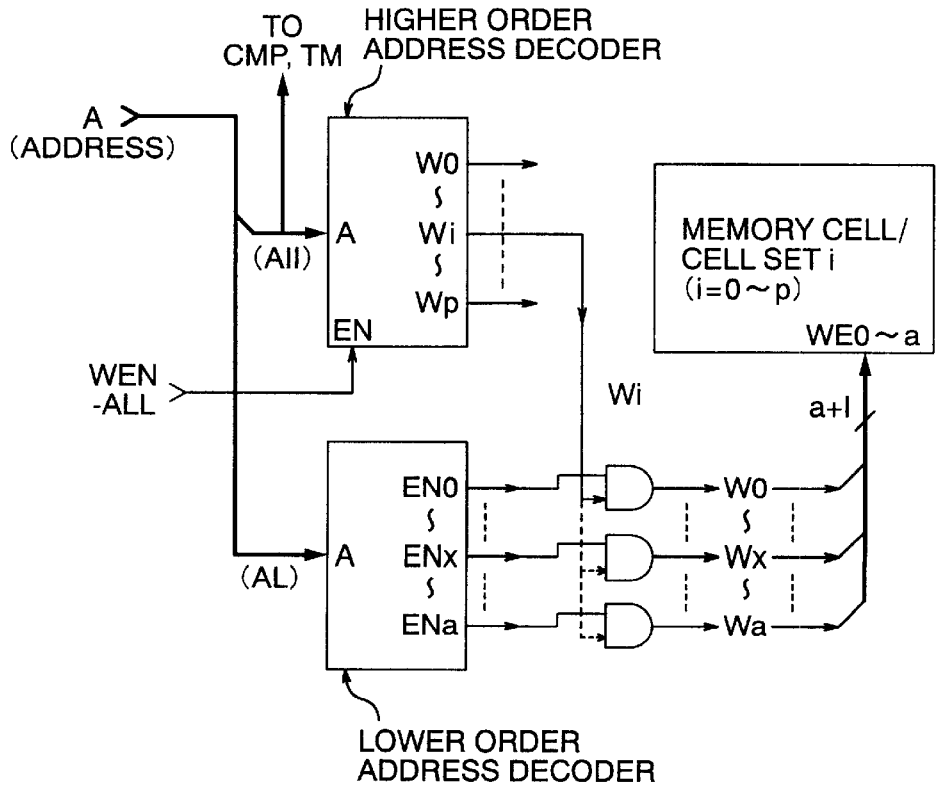

FIGS. 18A and 18B show a concrete basic structural example of the write address decoder used in FIG. 3, etc, and a connection example of the memory cell (or the memory cell set) and CP and TM. FIG. 18A shows a general example of the case when WEENi is used, and FIG. 18B shows a general example of the case when WEN-ALL is used. In FIG. 18A, the memory cell or the memory cell set corresponding to WENi is directly selected, a lower order address decoder selects the minimum data unit handled inside the set (to output ENx) and the logic AND between them generates the write enable (Wx). In FIG. 18B, WEN-ALL represents that the object data exists inside the cache memory system, and the logic AND is calculated with the information i obtained by decoding the higher order address AH (corresponding to the physical address as the comparison object in CMP and TM) by using the higher order address decoder to generate the write enable Wi (corresponding to WENi). The lower order decoder is the same as that of FIG. 18A. AND is calculated between Wi and ENx to generate Wx, and the write operation is executed for the object data cell inside the corresponding memory cell or memory cell set.

Next, an embodiment for achieving a multi-port memory system on the basis of a single port type memory system will be described. Basic memory cells having only one system of read/write/bus in FIG. 13 or the basic memory cells of the 1-read 1-write structure having only the input select portion (O select output portion) of the write selector shown in FIG. 2 are simply combined to constitute a memory cell set. An address decoder for selecting the memory cell set is disposed outside the write selector to simply generate the OW signal by using the output of the address decoder and the write enable alone and to mainly improve efficiency of the memory capacity.

The term "multi-port structure" means to independently dispose a plurality of address inputs and data outputs. A memory system using memory cells not having such a plurality of write busses/read busses invites conflicts of ports on the bus and cannot basically permit the parallel access from each port.

Therefore, when a cycle steel system that divides one main access cycle (main cycle time) into units corresponding to several ports, defines each of the divided cycles as the access cycle of each port, switches the address information and the data information from each port and applies the information to the memory system or takes out the data information is employed, the system can be handled from outside as one multi-port memory system that operates in one main cycle time.

PLL, or the like, is used to divide the cycle. When the cycle is divided into two, for example, the former half of the cycle is used as the read cycle and the latter, as the write cycle. The former half state (phase) of the clock defining the access cycle and its latter half state are allocated to the read and write cycles, respectively, and the multi-port system can thus be accomplished (without using PLL in this case).

In the 1RD, 3WT 4-port memory system using the memory cells shown in FIG. 15, the main cycle time is divided into four by PLL (to generate clocks having a frequency of 4 times). The first cycle is allocated to the read operation and the second, third and fourth cycles are allocated to the write operations corresponding to the write busses IA, IB and IC, respectively. Incidentally, only the read bus may be disposed independently as shown in FIG. 15. In this case, the main cycle is divided into three, these cycles are allocated to only three write operations, and these operations are executed in parallel with the read access cycle. In consequence, the main cycle time can be shortened. (The four access cycles are reduced to the three access cycles and latency within one main access cycle can be shortened with the result that the main cycle time can be shortened to ¾).

However, these systems are pseudo multi-port systems formed by gathering a plurality of access cycles into one cycle, and the overall cycle time and access time themselves are obviously longer than those of the parallel access port system. Therefore, sufficient performance can be acquired only when equipment on the access side (such as CPU and CS) operates in a sufficiently slow cycle time than the memory access time (main cycle time). (The drop of throughput and the increase of latency occur).

For example, when the common system (CS) 5 is constituted as one unit into LSI, the internal common memory 5a is connected outside to the processor portion and the common bus (such as on the electronic substrate). Therefore, there are many cases where a lower speed access time than the cache memory system 2 often built in the processor portion may suffice. (This cycle is the access cycle to the outside when viewed from the processor portion as the access side and from the common bus side, and the access speed becomes unavoidably lower than the access cycle to the inside). Therefore, the possibility is high that necessary performance can be acquired even by using the pseudo multi-port memory of this embodiment. Since T7$n$ to T16$n$ shown in FIG. 15 are not used, however, the memory cell can be constituted into a smaller size, and the write selector itself need not be complicated. Therefore, performance becomes maximal from the aspect of memory efficiency (capacity efficiency).

Figure 28:
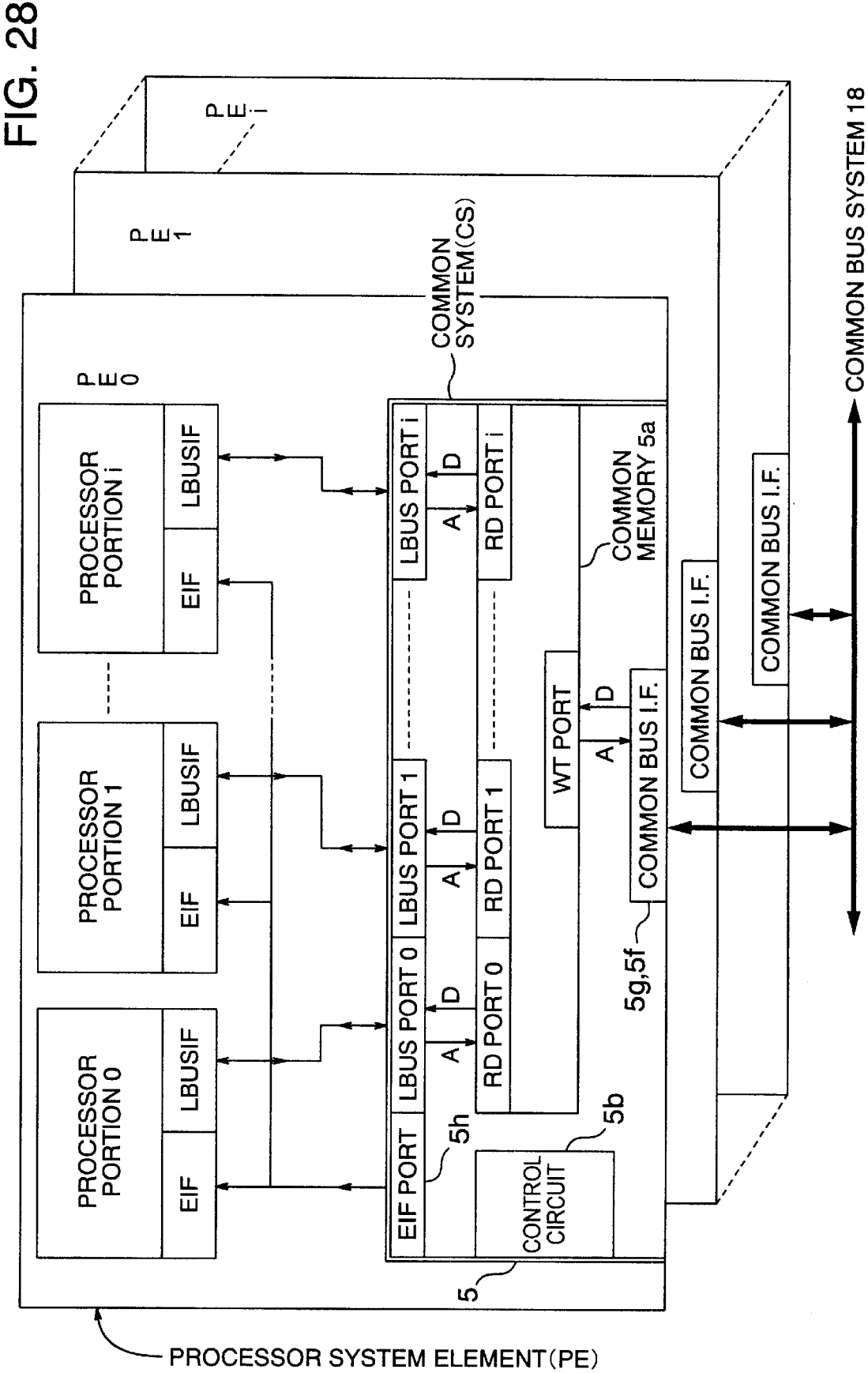
FIG. 28 shows a structural example of a multiprocessor using a shared system having a built-in common memory having a plurality of read ports.

As another variation of the common system (CS), FIG. 28 shows an embodiment of a multi-processor system having the form which includes a common memory 5a having multi-port read ports inside CS, a plurality of processor portions inside a processor system element (PE) and in which a plurality of PE is coupled by a common bus system 18. In this embodiment, i+1 processor portions are provided inside PE and j+1 sets of them are coupled to constitute (i+1)×(j+1)=1 processor portion. This construction achieves the basically equivalent function to the construction wherein one PE is directly connected by the bus system 18 in the embodiments of the present invention shown in FIGS. 1, 25A and 26. Therefore, this construction is based on the basic concept of the present invention.

Structurally speaking, this construction is brought forth by merely adding the lead ports corresponding to PE1 to PEi to the common memory 5a inside CS. The addition of the read ports can be easily materialized by preparing in parallel the same number of tri-state buffers (b1, b2) and the multiplexer circuit (206) shown in FIGS. 2, 3, 15 and 16 as the number of read ports for the read outputs from the memory cells or the memory cell sets.

Even though the basic concept is the same, the method that prepares a plurality of such read ports provides many practical effects and can eventually attain the drastic improvement in total performance of the multiplexer system. In other words, a) the number of PE is reduced to mitigate the burden of the common bus system, and the speed of the common bus is increased as much to thereby improve performance; b) the number of PE can be increased in the matrix form and the total processing capacity can be drastically improved; and c) the total capacity of the common system can be drastically decreased relative to the number of the processor portions, and this is advantageous in both cost and compactness.

These advantages exhibit the maximum effects when caching control of the common information supported by coherence control using EIF according to the present invention described above is utilized in combination with common information control by the broadcast system using CS shown in FIG. 28. Performance can be drastically improved than ever when only CS shown in FIG. 28 is utilized but coherence control is not executed (that is, the common information is not cached).

When EIF is used, the information from the EIF port of CS may well be given in common to EIF of each processor portion. Control may be executed also by preparing an independent WT port in the common memory 5a (in such a fashion as to correspond to each processor portion inside PE in an extreme case), enclosing the write information from each processor portion inside PE inside CS by use of WT port and writing it into the common memory. (Priority control must be generally executed with the write access from the common bus side to the same address, and it is more effective to dispose a separate write port, a separate common bus and a separate common bus IF and to connect them to keep CS coherence among PE).

As to arbitration (arbitration processing) of the write accesses to the common system, it is possible to employ a method that collectively arbitrate all the processor portions contained in each PE (this method can be said equivalent to the method of the present invention described so far), and a method that executes in parallel an arbitration processing (priority sequence) among PE to acquire the common bus 18 in parallel with the priority processing of each processor portion inside PE, and allows the processor portion having the highest priority inside PE and finally acquiring the common bus to gain access (write access) to the common memory 5a.

When the method described above that disposes the separate write port and the separate common bus is employed, the write port and the common bus used for gaining the write access to the common system are allocated and used in accordance with the access attribute responding to the address information. (For example, separate write ports are used for the even-numbered address and the odd-numbered address). In consequence, the number of the processor portions to be arbitrated in the common bus unit can be decreased and the number of processors connected to one common bus can be decreased).

Figure 23:
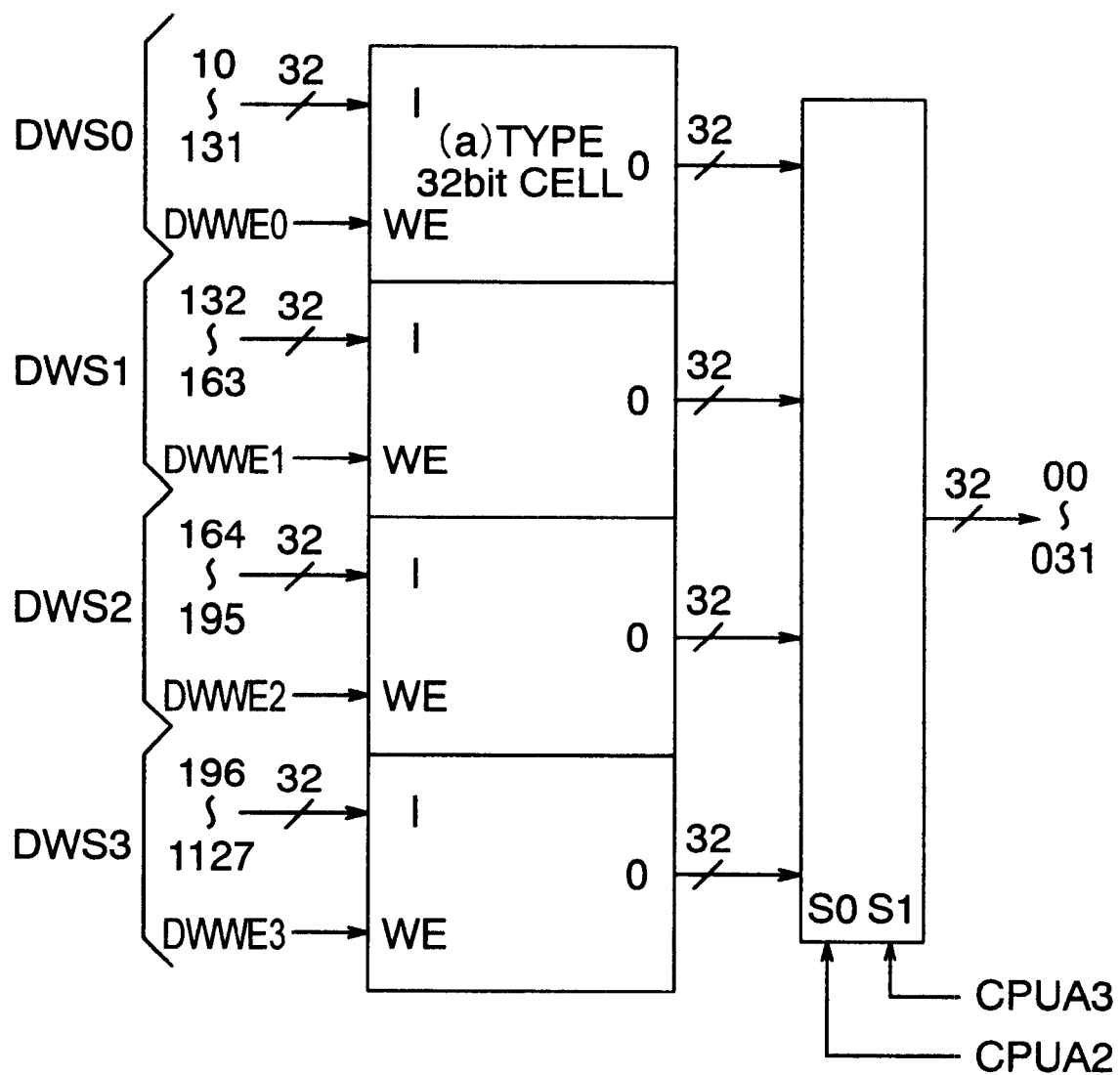
FIG. 23 shows another structural example of a cache memory line block.

FIGS. 21 to 23 show structural examples of the cache memory line block and FIG. 24 shows the construction of the decoder that becomes necessary. FIG. 21 shows a structure for executing re-writing the data in word unit with 32 bits=1 word. The memory cell set 204 shown in FIG. 3 assumes the structure in FIG. 21. FIG. 22 shows an improvement structure that can re-write the data in a byte unit (byte set BS).

In FIG. 21, re-write can be instructed by use of one write enable WE but in FIG. 22, BWE0 to 3 representing which byte set is active become necessary. BWE in this case is acquired by calculating AND between the byte enable BE (a signal representing which byte supplied from the access side is enable) and WE.

FIG. 23 shows an example where four structures shown in FIG. 21 is gathered to constitute one line block by 16 bytes in total. (Each cache line block inside the cache memory system is constituted in a 16-byte unit, and re-write is executed in the line block unit when cache replace is made. The data unit that is re-writable in the ordinary access is 32 bit=1 word (DWS)).

The structure includes a multiplexer that selects any of DWS by using the lower order addresses A2 and A3 from CPU to read out the data and outputs it as 32-data. When it is regarded as one memory cell set, the structure can be applied to the structure shown in FIG. 3.

When the structure shown in FIG. 23 is used as a memory cell set for the cache memory, the cache line fill processing in the cache replace operation becomes a processing that replaces all the 16-byte data inside the cache line block as the object by the data (16 bytes) for the line block acquired afresh from the resource. Each write enable of DWWE0 to 3, too, may well be generated by calculating AND between four decode results obtained by decoding the lower order address A2, 3 of the access device on the write side and WE, respectively.

FIG. 24 shows an example where a part of the generation function of BWE and DWWE is acquired into the write selector and executed. It is preferred to constitute the circuits necessary in each memory cell unit inside the write selector. Also, the circuits, that are necessary in the memory cell set unit, memory byte set (BS) unit, the double word set (DWS) unit or the memory system unit, are preferably provided as much as possible for each set or unit.

Various embodiments of the present invention described above can acquire the following effects.

(a) The present invention can provide a multi-port cache memory system capable of making in parallel an access from the CPU side and a write access from the common system side for coherence control, and a common system including a 2-port common memory capable of making in parallel a write access from the common bus side and a read access from the CPU side. When using these systems in fusion, the present invention can simultaneously eliminate a cache memory system access conflict between the CPU side and the CS side and can make in parallel a cache replace access from the common system to the CPU side and a write access from the common system to the cache memory system. The present invention can thus improve real time performance.

(b) Higher cost performance can be obtained when a CPU system including a write-only port and a read/write port for an external access that are isolated from one another as function input/output pins is constituted into LSI architecture in the construction (a). Higher performance can be achieved when a CPU system including a plurality of write-only ports capable of coping with a plurality of common busses, and isolated read ports and write ports capable of eliminating the conflict between a read cycle and a write cycle in the local bus, as function input/output pins, is constituted into LSI architecture.

(c) Latency of a cache memory system access inside a CPU system can be shortened and real time performance can be improved because tag memory comparison means of a direct comparison system and multi-port cache memory access control means for executing a priority processing of a data input stage in synchronism with one clock are provided.

What is claimed is:

1. A processor connected to at least one processor through a common bus, for executing cache control, comprising:

a CPU;

a cache memory;

a tag memory connected to said cache memory, for holding address information of cache data;

a resource for holding data common to said at least one processor;

a write port provided to said resource and connected to said common bus; and a comparator for comparing address information of said tag memory with an access address from said CPU and outputting coincidence information to said cache memory, wherein a local bus for gaining access to said resource from said at least one processor is connected to a read port provided to said resource, wherein said cache memory has a write/read port connected to an internal bus from said CPU and a write port for accepting the common data from said at least one processor through an external bus connected to said common bus, and wherein said comparator includes:

a first comparator connected to said tag memory, for comparing the access address from said CPU with the address information of said tag memory and giving an enable signal for activating said write/read port of said cache memory, and a second comparator connected to said tag memory, for comparing the access address from said at least one processor with the address information of said tag memory, and giving an enable signal for activating said write port of said cache memory.

2. A processor according to claim 1, wherein said first and second comparators are allowed to operate in parallel using the same clock.

3. A LSI, having a processor connected to at least one processor through a common bus, for executing cache control, comprising:

a CPU;

a cache memory;

a tag memory connected to said cache memory, for holding address information of cache data;

a resource for holding data common to said at least one processor;

a write port connected to said common bus;

a comparator for comparing address information of said tag memory with an access address from said CPU and outputting coincidence information to said cache memory; and a local bus port for a local bus, for gaining access from said at least one processor to said resource, wherein said cache memory has a write/read port connected to an internal bus from said CPU and a write port for accepting the common data from said at least one processor through an external bus connected to said common bus, and wherein said comparator includes:

a first comparator connected to said tag memory, for comparing the access address from said CPU with the address information of said tag memory and giving an enable signal for activating said write/read port of said cache memory; and a second comparator connected to said tag memory, for comparing the access address from said at least one processor with the address information of said tag memory, and giving an enable signal for activating said write port of said cache memory.

4. An LSI according to claim 3, wherein said first and second comparators are allowed to operate in parallel using the same clock.

5. A processor system comprising:

a CPU;

internal data busses including an internal data bus, an address bus and a bus control signal, and connected to said CPU;

a cache memory having at least three independent ports of a first write port, a second write port and a first read port;

a tag memory for holding address information corresponding to data held by said cache memory;

a comparator for comparing the address information held by said tag memory with address information generated during an access operation from said CPU, and generating first coincidence information;

cache memory read access means for reading out corresponding data of said cache memory from said first read port when said first coincidence information is generated during the read access from said CPU, and giving said data to said CPU through said internal bus;

cache memory write access means for latching write information from said CPU on said internal bus to said cache memory through said first write port when said first coincidence information is generated during the write access from said CPU;

external access means for executing a data replace operation from said resource to said cache memory when said first coincidence information is not generated during the access operation of said CPU;

a common system having an independent third write port and an independent second read port;

local bus means for connecting said common system as a first resource to said external access means through said second read port;

a common bus connected to said common system;

common information output means for outputting common information from said local bus means to said common bus;

common information write means for connecting said common bus to said third write port of said common system and writing common information on said common bus to said common system;

common write information transfer means for transferring common write data and address information to said cache memory system in response to a timing at which said common information write means gains write access to said common system;

a second comparator for comparing address information contained in common write information with address information held by said tag memory, and generating second coincidence information; and cache memory common write access means for writing said common write data to an address corresponding to said common write address information on said cache memory through said second write port when said second coincidence information is generated.

6. A processor system in a data processor including:

a CPU;

a cache memory system including at least access means for holding data processed by said CPU and gaining access from said CPU to said data;

a common system;

an external bus for connecting said common system; and a common bus system for connecting an external processor and said common system;

wherein said cache memory system includes:

a tag memory capable of storing address information relating to data held when said cache memory system holds said data read by said CPU from said common system;

a data holding memory constituted by a multi-port memory cell having an external access port having separate address designation means and data write means and capable of independently executing at least a data write access from said external processor to said cache memory system in parallel with an access from said CPU to said cache memory system;

a common bus for transferring common data information and common address information to said external access port when said external processor re-writes the information of said common system thereof; and coherence control means for comparing said common address information with the address information inside said tag memory, and re-writing information of the corresponding memory cell inside said cache memory system to said common data information through said external access port when the comparison result proves coincident.

7. A system having CPU LSI chip in a processor including:

a CPU;

a cache memory unit for storing a part of data handled by said CPU, capable of higher speed access than a main memory system; and a tag memory unit for storing address information about data on said cache memory unit;

wherein said cache memory unit includes:

a CPU access port for executing a read access and a write access from said CPU;

first coincidence information output means for acquiring address information about common information with other processors constituting a multi-processor system, comparing said address information with information inside said tag memory unit and outputting their coincidence information;

second coincidence information output means for comparing information about the address generated at the time of access from said CPU with the information inside said tag memory unit, and outputting their coincidence information;

CPU access control means for controlling the access to said cache memory system from said CPU through said CPU access port based on said second coincidence information; and access common information control means for providing a common access port independently of said CPU access port to said cache memory system, giving address information corresponding to changed common information at the time of re-write operation by said other processor to said common access port, and writing said changed common information to a corresponding address on said cache memory system through said common access port in parallel with the CPU address based on said first coincidence information.

\* \* \* \* \*